(12) United States Patent
Nasiopoulos et al.

(10) Patent No.: US 11,100,888 B2
(45) Date of Patent: Aug. 24, 2021

(54) METHODS AND APPARATUSES FOR TONE MAPPING AND INVERSE TONE MAPPING

(71) Applicant: THE UNIVERSITY OF BRITISH COLUMBIA, Vancouver (CA)

(72) Inventors: Panos Nasiopoulos, Vancouver (CA); Stylianos Ploumis, Vancouver (CA); Mahsa Talebpourazad, Vancouver (CA); Ronan Boitard, Vancouver (CA); Pedram Mohammadi, Vancouver (CA)

(73) Assignee: THE UNIVERSITY OF BRITISH COLUMBIA, Vancouver (CA)

( * ) Notice: Subject to any disclaimer, the term of this patent is extended or adjusted under 35 U.S.C. 154(b) by 0 days.

(21) Appl. No.: 16/627,205

(22) PCT Filed: Jun. 27, 2018

(86) PCT No.: PCT/CA2018/050797
§ 371 (c)(1),
(2) Date: Dec. 27, 2019

(87) PCT Pub. No.: WO2019/000097
PCT Pub. Date: Jan. 3, 2019

(65) Prior Publication Data
US 2020/0126509 A1    Apr. 23, 2020

Related U.S. Application Data

(60) Provisional application No. 62/525,910, filed on Jun. 28, 2017, provisional application No. 62/665,959, filed on May 2, 2018.

(51) Int. Cl.
G09G 5/02      (2006.01)
G09G 5/10      (2006.01)

(52) U.S. Cl.
CPC .............. G09G 5/02 (2013.01); G09G 5/10 (2013.01)

(58) Field of Classification Search
CPC ........ G09G 5/02; G09G 5/10; G09G 2340/06; G09G 2340/0428; G09G 2320/0673;
(Continued)

(56) References Cited

U.S. PATENT DOCUMENTS 6,804,409 B2   10/2004   Sobol et al.
6,807,299 B2   10/2004   Sobol
(Continued)

FOREIGN PATENT DOCUMENTS

FR           3045903 A1       6/2017
WO       2016/192937 A1      12/2016

OTHER PUBLICATIONS

Ploumis et al., "Perception-Based Histogram Equalization for Tone Mapping Applications". 2016 Digital Media Industry & Academic Forum (DMIAF), Jul. 2016 (Jul. 2016), pp. 11-16. (Year: 2016).*
(Continued)

*Primary Examiner* — Sardis F Azongha
(74) *Attorney, Agent, or Firm* — Kilpatrick Townsend & Stockton LLP

(57) ABSTRACT

A method of producing at least one output image signal representing, at least, a plurality of output luminance values in an output range of luminance values is disclosed. The method involves: identifying a mapping function based at least in part on a perceptually scaled distribution of a plurality of input luminance values in an input range of luminance values different from the output range of luminance values; transforming the plurality of input luminance values into respective perceptually scaled output luminance values according to the mapping function; transforming the perceptually scaled output luminance values into respective
(Continued)

ones of the plurality of output luminance values; and producing the at least one output signal representing, at least, the plurality of output luminance values. Computer-readable media and apparatuses are also disclosed.

24 Claims, 26 Drawing Sheets

(58) Field of Classification Search
CPC .. H04N 19/186; H04N 19/142; H04N 19/124; H04N 19/117
See application file for complete search history.

(56) References Cited

U.S. PATENT DOCUMENTS

| | | | |
|---|---|---|---|
| 7,046,858 B2 | 5/2006 | Sobol | |
| 7,639,893 B2 | 12/2009 | Duan et al. | |
| 8,050,511 B2 | 11/2011 | Daly et al. | |
| 8,144,985 B2 | 3/2012 | Ciurea et al. | |
| 8,233,738 B2 | 7/2012 | Rempel et al. | |
| 8,289,412 B2 | 10/2012 | Banterle et al. | |
| 8,314,847 B2 | 11/2012 | Brunner | |
| 8,346,002 B2 | 1/2013 | Wei et al. | |
| 8,831,345 B2* | 9/2014 | Toda | G06T 5/008 382/168 |
| 9,076,224 B1 | 7/2015 | Shah et al. | |
| 9,883,112 B1 | 1/2018 | Igor' Valer'Evich | |
| 10,326,971 B2 | 6/2019 | Bist et al. | |
| 10,506,232 B2* | 12/2019 | Minoo | H04N 19/70 |
| 2002/0154323 A1 | 10/2002 | Sobol et al. | |
| 2007/0014470 A1 | 1/2007 | Sloan | |
| 2010/0128332 A1 | 5/2010 | Wakazono et al. | |
| 2011/0235720 A1* | 9/2011 | Banterle | H04N 19/34 375/240.25 |
| 2015/0078661 A1 | 3/2015 | Granados et al. | |
| 2015/0221280 A1 | 8/2015 | Van Der Vleuten | |
| 2016/0316207 A1* | 10/2016 | Minoo | H04N 19/44 |
| 2016/0364848 A1 | 12/2016 | Douady-Pleven et al. | |
| 2017/0026646 A1 | 1/2017 | Minoo et al. | |
| 2017/0048520 A1 | 2/2017 | Seifi et al. | |
| 2017/0085879 A1 | 3/2017 | Minoo et al. | |
| 2017/0186141 A1 | 6/2017 | Ha et al. | |
| 2017/0330312 A1* | 11/2017 | Nam | G06T 5/009 |
| 2017/0330529 A1 | 11/2017 | Van Mourik et al. | |
| 2018/0152686 A1 | 5/2018 | Wozniak et al. | |
| 2018/0167597 A1 | 6/2018 | Seifi et al. | |
| 2018/0218481 A1 | 8/2018 | Evans et al. | |

OTHER PUBLICATIONS

International Search Report and Written Opinion dated Aug. 30, 2018 for PCT/CA2018/050797, 8 pages.
Akyüz et al., "Do HDR Displays Support LDR Content? A Psychophysical Evaluation", ACM Transactions on Graphics, vol. 26, No. 3, Article 38, pp. 38-1-38-7, Jul. 2007.
Banterle et al., "Expanding Low Dynamic Range Videos for High Dynamic Range Applications", 9 pages, Apr. 2008.
Barten, "Contrast Sensitivity of the Human Eye and Its Effects on Image Quality", Knegsel: HV Press, Technische Universiteit Eindhoven, 226 pages, 1999.
Bist et al., "Tone expansion using lighting style aesthetics", Computers & Graphics, vol. 62, pp. 77-86, Dec. 15, 2016.
Blackwell, "Contrast Thresholds of the Human Eye", Journal of the Optical Society of America, vol. 36, No. 11, pp. 624-643, Nov. 1946.
Boitard et al., "Demystifying High-Dynamic-Range Technology: A new evolution in digital media", IEEE Consumer Electronics Magazine, vol. 4, No. 4, pp. 72-86, Oct. 2015.
Boitard et al., "Survey of Temporal Brightness Artifacts in Video Tone Mapping", HDRi2014—Second International Conference and SME Workshop on HDR imaging, 2014, 6 pages.
Čadík et al., "Evaluation of HDR tone mapping methods using essential perceptual attributes", Computers & Graphics, vol. 32, No. 3, pp. 330-349, Jun. 2008.
Didyk et al., "Enhancement of Bright Video Features for HDR Displays", Eurographics Symposium on Rendering, vol. 27, No. 4, pp. 1265-1274, Jun. 2008.
Drago et al., "Adaptive Logarithmic Mapping for Displaying High Contrast Scenes", Computer Graphics Forum, vol. 22, No. 3, 9 pages, Sep. 2003.
Duan et al., "Tone-mapping High Dynamic Range Images by Novel Histogram Adjustment", Pattern Recognition, vol. 43, No. 5, pp. 1847-1862, May 2010.
Durand et al., "Fast Bilateral Filtering for the Display of High-Dynamic-Range Images", Association for Computing Machinery, Inc., Transactions on Graphics, 99 257-266 , Jul. 2002.
Huo et al., "Physiological inverse tone mapping based on retina response", Vis. Comput., vol. 30, pp. 507-517, Sep. 13, 2014.
Kovaleski et al., "High-Quality Brightness Enhancement Functions for Real-Time Reverse Tone Mapping", The Visual Computer, vol. 25, pp. 539-547, Mar. 2009.
Kovaleski et al., "High-Quality Reverse Tone Mapping for a Wide Range of Exposures" in 27th SIBGRAPI Conference on Graphics, Patterns and Images, 9 pages, Aug. 2014.
Koz et al., "Optimized tone mapping with perceptually uniform luminance values for backward-compatible high dynamic range video compression", 2012 Visual Communications and Image Processing, pp. 1-6, Nov. 2012.
Kunkel et al., "HDR and wide gamut appearance-based color encoding and its quantification", 2013 Picture Coding Symposium (PCS), 4 pages, Dec. 2013.
Larson et al., "A Visibility Matching Tone Reproduction Operator for High Dynamic Range Scenes", Ernesto Orlando Lawrence Berkeley National Laboratory, Jan. 1997.
Larson et al., "A Visibility Matching Tone Reproduction Operator for High Dynamic Range Scenes", IEEE Transactions on Visualization and Computer Graphics, vol. 3, No. 4, pp. 291-306, 1997.
Le Gall et al., "High Dynamic Range with HEVC Main10", Joint Collaborative Team on Video Coding (JCT-VC) of ITU-T SG 16 WP 3 and ISO/IEC JTC 1/SC 29/WG 11, 6 pages, Jun. 2015.
Ledda, "Evaluation of tone mapping operators using a High Dynamic Range display", ACM Transactions on Graphics, pp. 640-648, Jul. 2005.
Mantiuk et al., "Display adaptive tone mapping", ACM Transactions on Graphics, vol. 27, No. 3, p. 1-10, 2008.
Masia et al., "Evaluation of Reverse Tone Mapping Through Varying Exposure Conditions" in ACM Transactions on Graphics, 9 pages, Dec. 2009.
Meylan et al., "The Reproduction of Specular Highlights on High Dynamic Range Displays", Final Program and Proceedings—IS and T/SID Color Imaging Conference, 6 pages, 2006.
Meylan et al., "Tone Mapping for High Dynamic Range Displays", Proceedings vol. 6492, Human Vision and Electronic Imaging XII, 649210, 12 pages, 2007.
Miller et al., "Perceptual Signal Coding for More Efficient Usage of Bit Codes". 2012, SMPTE Annual Technical Conference & Exhibition, pp. 1-39, 2012.
Miller et al., "Perceptual Signal Coding for More Efficient Usage of Bit Codes", SMPTE Motion Imaging Journal, vol. 122, No. 4, pp. 52-59, May 2013.
Pattanaik et al., "A Multiscale Model of Adaptation and Spatial Vision for Realistic Image Display", SIGGRAPH '98: Proceedings of the 25th annual conference on Computer graphics and interactive techniques, pp. 287-298, Jul. 1998.
Pattanaik et al., "Adaptive Gain Control for High Dynamic Range Image Display", SCCG '02: Proceedings of the 18th Spring Conference on Computer Graphics, pp. 83-87, Apr. 2002.
Pattanaik et al., "Time-Dependent Visual Adaptation for Fast Realistic Image Display", SIGGRAPH '00: Proceedings of the 27th annual conference on Computer graphics and interactive techniques, pp. 47-54, Jul. 2000.
Ploumis et al., "A Flickering Reduction Scheme for Tone Mapped HDR Video," 2018 International Conference on Computing, Networking and Communications, Mar. 2018, pp. 73-76.

(56) References Cited

OTHER PUBLICATIONS

Recommendation ITU-R BT.1886, "Reference electro-optical transfer function for flat panel displays used in HDTV studio production", Mar. 2011.
Reinhard et al., "Photographic Tone Reproduction for Digital Images", ACM Transactions on Graphics, pp. 267-276, May 2002.
Wang et al., "Pseudo-Multiple-Exposure-Based Tone Fusion With Local Region Adjustment", IEEE Transactions on Multimedia, vol. 17, No. 4, pp. 470-484, Apr. 2015.
Yoshida et al., "Perceptual Evaluation of Tone Mapping Operators with Real-World Scenes", Proceedings vol. 5666, Human Vision and Electronic Imaging X, 2005.

* cited by examiner

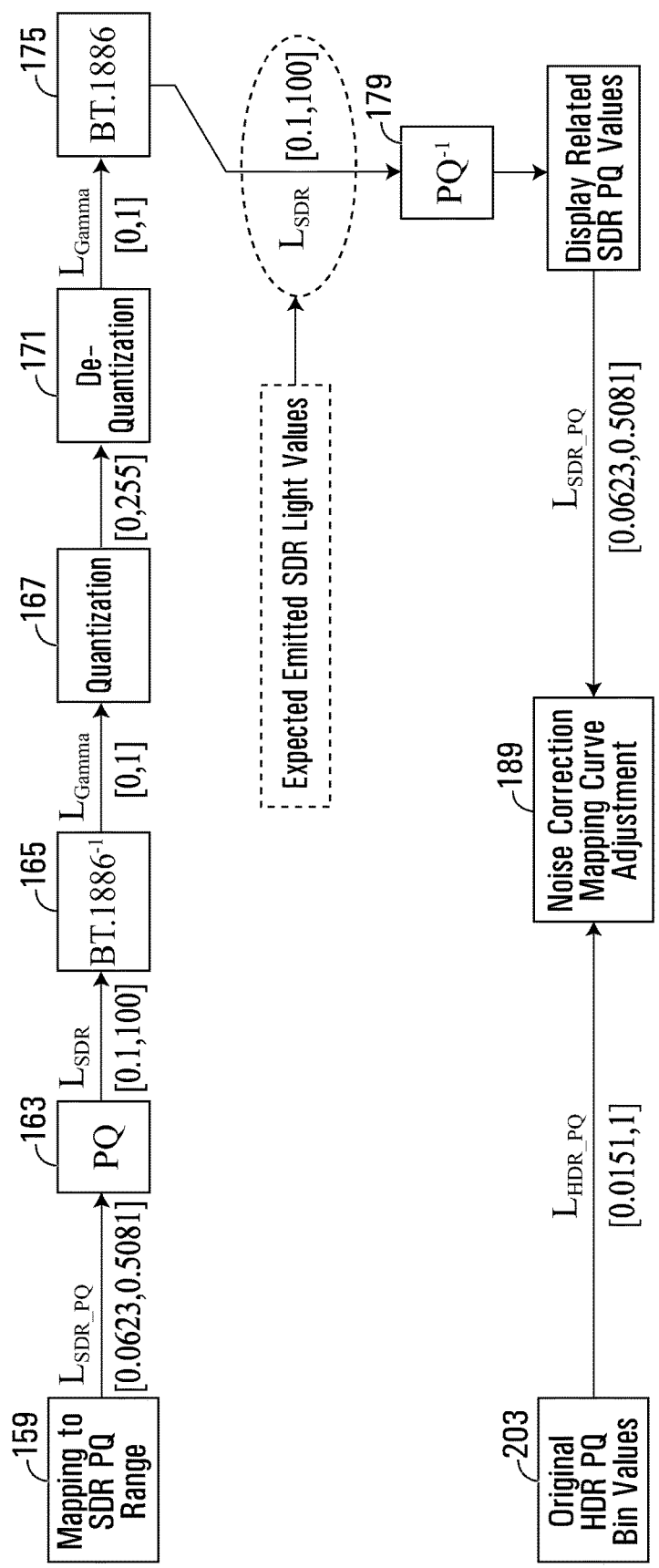
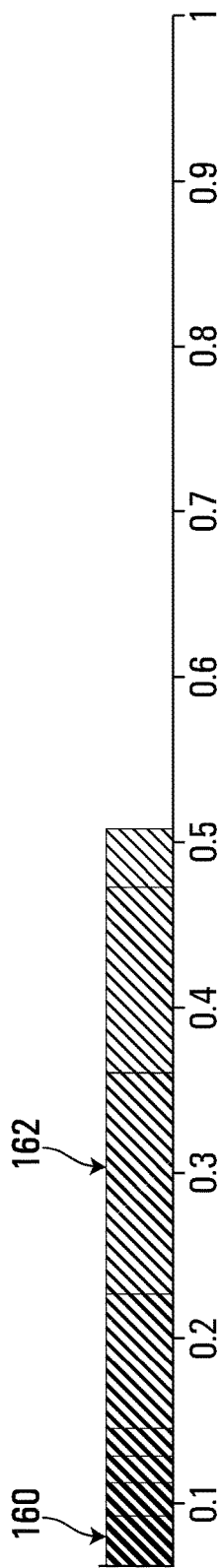
FIG. 7
FIG. 8

METHODS AND APPARATUSES FOR TONE MAPPING AND INVERSE TONE MAPPING

CROSS-REFERENCE TO RELATED APPLICATIONS

This application claims the benefit of, and priority to, U.S. provisional patent application No. 62/525,910 filed on Jun. 28, 2017 and U.S. provisional patent application No. 62/665,959 filed on May 2, 2018. The entire contents of U.S. provisional patent application Nos. 62/525,910 and 62/665,959 are incorporated by reference herein.

FIELD

This disclosure relates generally to tone mapping and inverse tone mapping.

RELATED ART

In general, a display device may receive one or more input signals and may display images, such as successive frames of video, for example, according to the one or more input signals. Different display devices are capable of displaying images in different ranges. For example, a standard dynamic range ("SDR") may include luminance and color ranges that are less than luminance and color ranges of a high dynamic range ("HDR"). For example, HDR luminance values may range over about six orders of magnitude, whereas SDR luminance values may range over about three orders of magnitude.

In some cases, a display device may be capable of a luminance range that is smaller than a luminance range of one or more input signals received by the display device. In such cases, tone mapping may transform luminance values in the larger range of luminance values of the one or more input signals to respective luminance values in the smaller range of luminance values that may be displayed on the display device.

In other cases, a display device may be capable of a luminance range that is larger than a luminance range of one or more input signals received by the display device. In such cases, inverse tone mapping may transform luminance values in the smaller range of input luminance values of the one or more input signals to respective luminance values in the larger range that may be displayed on the display device.

However, some known tone mapping and inverse tone mapping techniques may be inefficient. Further, some known tone mapping and inverse tone mapping techniques may introduce or aggravate visual artifacts such as visual noise, ghosting effects, or brightness or color inconsistencies, and may therefore transform luminance values for display on a display device in a way that produces a low quality of experience for a viewer of images displayed on the display device.

SUMMARY

According to one embodiment, there is disclosed a method of producing at least one output image signal representing, at least, a plurality of output luminance values in an output range of luminance values, the method comprising: identifying a mapping function based at least in part on a perceptually scaled distribution of a plurality of input luminance values in an input range of luminance values different from the output range of luminance values; transforming the plurality of input luminance values into respective perceptually scaled output luminance values according to the mapping function; transforming the perceptually scaled output luminance values into respective ones of the plurality of output luminance values; and producing the at least one output signal representing, at least, the plurality of output luminance values.

In some embodiments, the method further comprises transforming the plurality of input luminance values into respective perceptually scaled input luminance values. In some embodiments, the perceptually scaled distribution of the plurality of input luminance values is a distribution of the perceptually scaled input luminance values.

In some embodiments, transforming the plurality of input luminance values into the respective perceptually scaled input luminance values comprises applying a perceptual quantizer to at least some of the plurality of input luminance values.

In some embodiments, transforming the plurality of input luminance values into the respective perceptually scaled input luminance values comprises applying a non-logarithmic transform function to at least some of the plurality of input luminance values.

In some embodiments, transforming the plurality of input luminance values into the respective perceptually scaled input luminance values comprises applying a non-gamma transform function to at least some of the plurality of input luminance values.

In some embodiments, the input range of luminance values is larger than the output range of luminance values.

In some embodiments, identifying the mapping function comprises identifying a function having slopes in respective segments of the perceptually scaled distribution of the plurality of input luminance values. In some embodiments, the slopes in the respective segments are in response to respective proportions of the plurality of input luminance values that are in the respective segments.

In some embodiments, identifying the mapping function comprises identifying a cumulative distribution function of the perceptually scaled distribution of the plurality of input luminance values.

In some embodiments, identifying the cumulative distribution function of the perceptually scaled distribution of the plurality of input luminance values comprises identifying the cumulative distribution function of a perceptually scaled histogram of the plurality of input luminance values.

In some embodiments, identifying the mapping function comprises adjusting an initial mapping function. In some embodiments, the initial mapping function is the cumulative distribution function.

In some embodiments, adjusting the initial mapping function comprises adjusting the initial mapping function in response to simulated luminance values as displayed on a display device in response to simulated output luminance values transformed from the plurality of input luminance values according to the mapping function.

In some embodiments, adjusting the initial mapping function in response to the simulated luminance values comprises adjusting the initial mapping function in response to display-relative perceptually scaled output luminance values transformed from the simulated output luminance values.

In some embodiments, adjusting the initial mapping function comprises adjusting a first at least one portion of the initial mapping function in which the initial mapping function maps a range of perceptually scaled input luminance values to a range of perceptually scaled output luminance values that is larger than the range of perceptually scaled input luminance values.

In some embodiments, adjusting the first at least one portion of the initial mapping function comprises adjusting the first at least one portion of the initial mapping function so that the first at least one portion of the initial mapping function as adjusted maps the range of perceptually scaled input luminance values to an adjusted range of perceptually scaled output luminance values that is no larger than the range of perceptually scaled input luminance values.

In some embodiments, adjusting the initial mapping function comprises adjusting a second at least one portion of the initial mapping function in which the initial mapping function maps a range of perceptually scaled input luminance values to a range of perceptually scaled output luminance values that is smaller than the range of perceptually scaled input luminance values.

In some embodiments: if an average brightness of the perceptually scaled input luminance values is below a first threshold, adjusting the second at least one portion of the initial mapping function comprises adjusting at least one portion of the initial mapping function that is brighter than at least one segment of the distribution of the perceptually scaled input luminance values having the greatest number of perceptually scaled input luminance values; if the average brightness of the perceptually scaled input luminance values is above the first threshold and below a second threshold, adjusting the second at least one portion of the initial mapping function comprises adjusting at least one portion of the initial mapping function that maps a range of perceptually scaled input luminance values having a greater number of perceptually scaled input luminance values than at least one other range of perceptually scaled input luminance values; and if the average brightness of the perceptually scaled input luminance values is above the second threshold, adjusting the second at least one portion of the initial mapping function comprises adjusting at least one portion of the initial mapping function that is darker than the at least one segment of the distribution of the perceptually scaled input luminance values having the greatest number of perceptually scaled input luminance values.

In some embodiments, the plurality of input luminance values and the plurality of output luminance values are luminance values of a first at least one frame of video.

In some embodiments, the method further comprises estimating a likelihood that the first at least one frame of video represents a scene change from a second at least one frame of video preceding the first at least one frame of video.

In some embodiments, estimating the likelihood that the first at least one frame of video represents a scene change from the second at least one frame of video comprises determining an average brightness variation from the second at least one frame of video to the first at least one frame of video.

In some embodiments, identifying the mapping function comprises, if the likelihood that the first at least one frame of video represents a scene change from the second at least one frame of video is below a threshold, low-pass filtering the mapping function.

In some embodiments, identifying the mapping function comprises: if the likelihood that the first at least one frame of video represents a scene change from the second at least one frame of video is below a first threshold, low-pass filtering the mapping function according to a first filter; and if the likelihood that the first at least one frame of video represents a scene change from the second at least one frame of video is at least the first threshold and below a second threshold higher than the first threshold, low-pass filtering the mapping function according to a second filter different from the first filter.

In some embodiments, the first filter has a first filter order, the second filter has a second filter order, and the second filter order is less than the first filter order.

In some embodiments, the first filter has a first cutoff frequency, the second filter has a second cutoff frequency, and the second cutoff frequency is larger than the first cutoff frequency.

In some embodiments, the input range of luminance values is smaller than the output range of luminance values.

In some embodiments, identifying the mapping function comprises identifying the mapping function according to a plurality of brightness segments of the perceptually scaled distribution of a plurality of input luminance values.

In some embodiments, the mapping function differs in each of the plurality of brightness segments of the perceptually scaled distribution of a plurality of input luminance values.

In some embodiments, the mapping function comprises a piece-wise linear function having a respective slope in each of the plurality of brightness segments of the perceptually scaled distribution of a plurality of input luminance values.

In some embodiments, the mapping function comprises a polynomial function.

In some embodiments, the mapping function comprises an exponential function.

In some embodiments, identifying the mapping function comprises maximizing a perceptually scaled contrast difference between the plurality of input luminance values and the plurality of output luminance values.

In some embodiments, identifying the mapping function comprises maximizing a perceptually scaled brightness difference between the plurality of input luminance values and the plurality of output luminance values.

In some embodiments, identifying the mapping function comprises maximizing a weighted sum of a perceptually scaled contrast difference between the plurality of input luminance values and the plurality of output luminance values and a perceptually scaled brightness difference between the plurality of input luminance values and the plurality of output luminance values.

In some embodiments, producing the at least one output signal comprises identifying color values for the at least one output signal.

In some embodiments, identifying the color values for the at least one output signal comprises identifying the color values for the at least one output signal in a physical-intensity domain.

In some embodiments, identifying the color values for the at least one output signal comprises identifying the color values for the at least one output signal in a perceptual domain.

According to another embodiment, there is disclosed at least one computer-readable medium comprising codes stored thereon that, when executed by at least one processor, cause the at least one processor to implement the method.

According to another embodiment, there is disclosed an apparatus for producing at least one output image signal representing, at least, a plurality of output luminance values in an output range of luminance values, the apparatus comprising at least one processor circuit operable to implement the method.

According to another embodiment, there is disclosed an apparatus for producing at least one output image signal representing, at least, a plurality of output luminance values in an output range of luminance values, the apparatus comprising: a means for identifying a mapping function based at least in part on a perceptually scaled distribution of a plurality of input luminance values in an input range of luminance values different from the output range of luminance values; a means for transforming the plurality of input luminance values into respective perceptually scaled output luminance values according to the mapping function; a means for transforming the perceptually scaled output luminance values into respective ones of the plurality of output luminance values; and a means for producing the at least one output signal representing, at least, the plurality of output luminance values.

Other aspects and features will become apparent to those ordinarily skilled in the art upon review of the following description of illustrative embodiments in conjunction with the accompanying figures.

BRIEF DESCRIPTION OF THE DRAWINGS

FIG. 7 illustrates a process for adjustment of the initial mapping function of FIG. 6 according to the tone mapping program codes of FIG. 4.

FIG. 8 illustrates initial perceptually scaled output luminance values transformed from the perceptually scaled distribution of the plurality of input luminance values of FIG. 5 according to the initial mapping function of FIG. 6.

DETAILED DESCRIPTION

Figure 1:
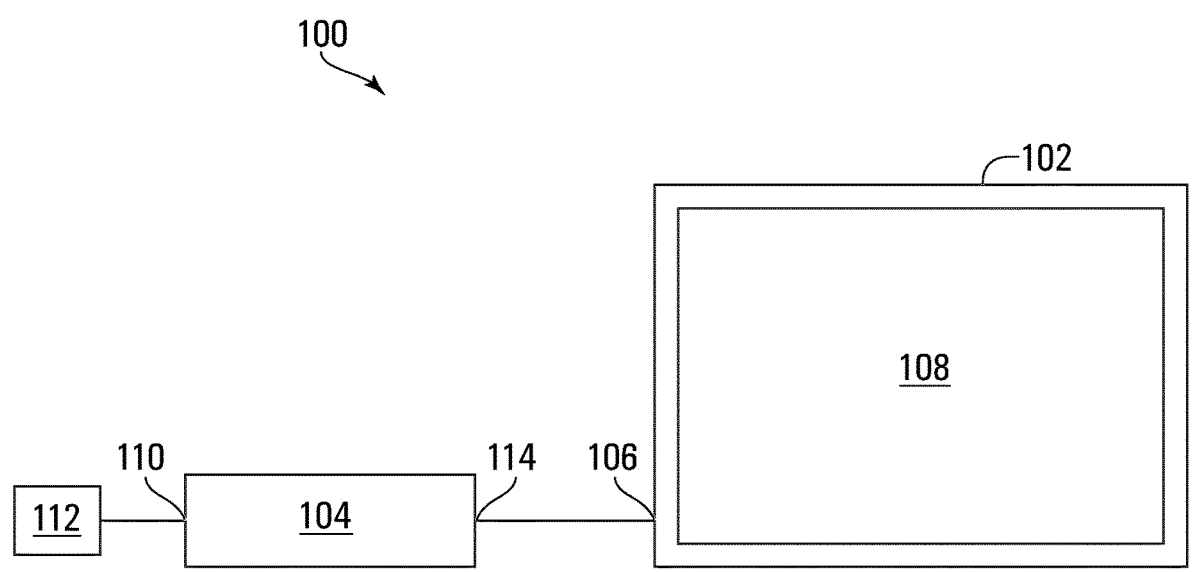
FIG. 1 illustrates a display system according to one embodiment.

Referring to FIG. 1, a display system according to one embodiment is shown generally at 100 and includes a display device 102 and a set-top box 104. In the embodiment shown, the display device 102 is a television including an input signal interface 106 and a display screen 108. In general, the display device 102 is configured to cause the display screen 108 to display images according to input signals received at the input signal interface 106. However, alternative embodiments may vary. For example, alternative embodiments may include one or more display devices that may differ from the display device 102 and that may include a projector, for example. Further, although the display device 102 and the set-top box 104 are separate devices in the embodiment shown, alternative embodiments may vary. For example, in alternative embodiments, the display device 102 and the set-top box 104 may be integrated into one device, or alternative embodiments may include one, two, or more than two devices that may function as described herein.

The set-top box 104 includes an input signal interface 110 that may receive one or more input signals from a signal source 112 from a television programming broadcasting or distribution service, for example. Further, the set-top box 104 includes an output signal interface 114 that may produce one or more output signals and transmit the one or more output signals to the input signal interface 106. In the embodiment shown, the one or more signals may be transmitted through one or more wires from the signal source 112 to the input signal interface 110 and from the output signal interface 114 to the input signal interface 106. However, alternative embodiments may differ. For example, in some embodiments, the signal source 112 may transmit the one or more output signals wirelessly (by radio signals, by satellite, or otherwise). Also, in some embodiments, the output signal interface 114 may transmit signals wirelessly to the input signal interface 106.

Figure 2:
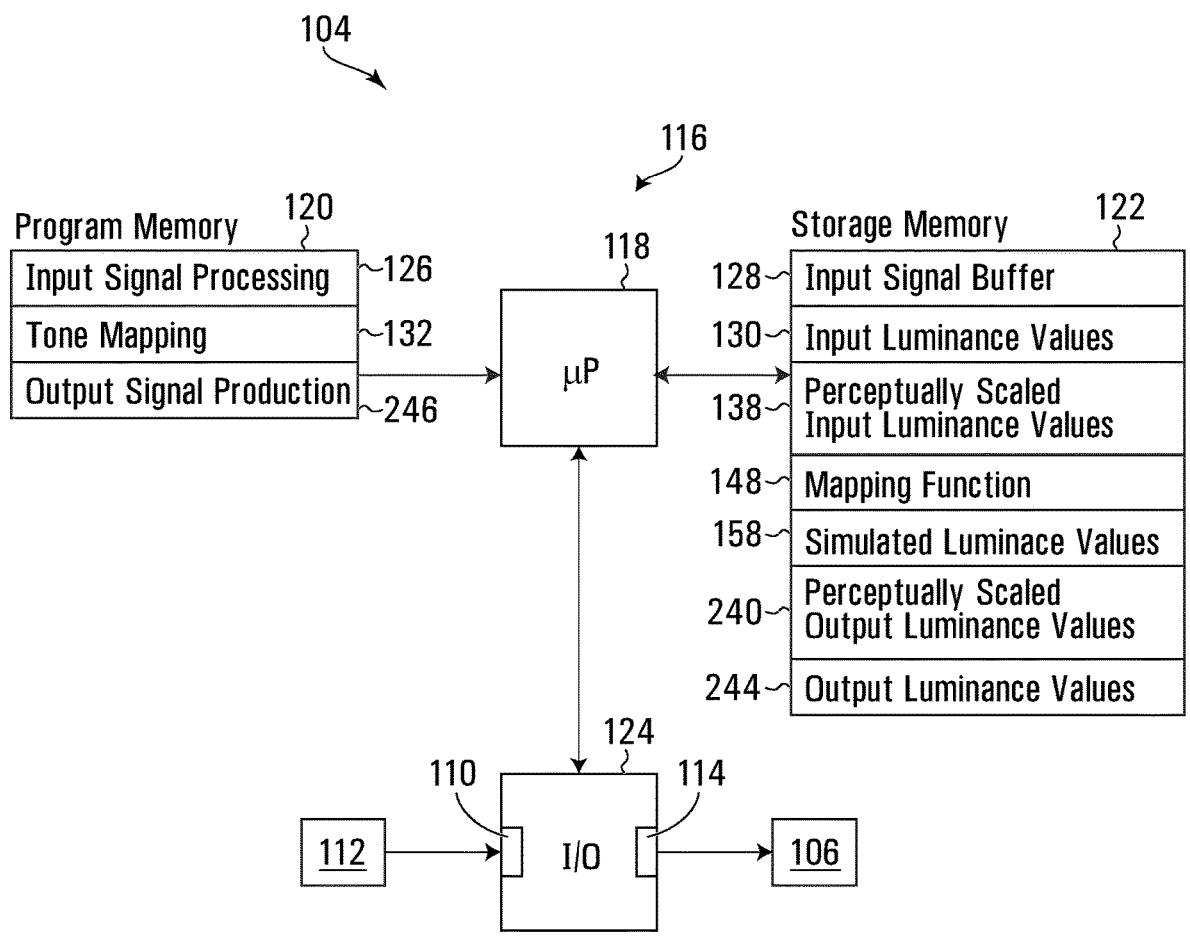
FIG. 2 illustrates a processor circuit of a set-top box of the display system of FIG. 1.

Referring to FIG. 2, the set-top box 104 includes a processor circuit shown generally at 116. The processor circuit 116 includes a microprocessor 118. The processor circuit 116 also includes a program memory 120, a storage memory 122, and an input/output ("I/O") interface 124, all in communication with the microprocessor 118. In general, the program memory 120 stores program codes that, when executed by the microprocessor 118, cause the processor circuit 116 to implement functions of the set-top box 104 as described herein, for example. Further, in general, the storage memory 122 includes stores for storing storage codes as described herein for example. The program memory 120 and the storage memory 122 may be implemented in one or more of the same or different computer-readable storage media, which in various embodiments may include one or more of a read-only memory ("ROM"), a random access memory ("RAM"), a hard disc drive ("HDD"), other computer-readable or computer-writable storage media, or a combination of one or more thereof, for example.

The I/O module 124 includes the input signal interface 110 and the output signal interface 114 and, in general, may include various signal interfaces, analog-to-digital converters ("ADCs"), receivers, transmitters, and/or other circuitry to receive, produce, and transmit signals as described herein, for example.

The processor circuit 116 is an example only, and set-top boxes according to other embodiments may vary. For example, in alternative embodiments, the set-top box 104 may include different hardware, different software, or both different hardware and different software. Further, alternative embodiments may include more than one microprocessor or one or more alternatives to the processor circuit 116. For example, alternative embodiments may include discrete logic circuits, a field-programmable gate array ("FPGA"), a graphics processor, or an application-specific integrated circuit ("ASIC"), or combinations of one or more thereof. In such alternative embodiments, functions of the program codes in the program memory 120 may be implemented in such circuitry or in other circuitry, for example.

In the embodiment shown, the signal source 112 transmits one or more video signals representing video frames in HDR, but the display device 102 is only capable of displaying video on the display screen 108 in SDR. Among other differences, HDR includes a larger range of luminance values than SDR. Therefore, functions of the set-top box 104 in the embodiment shown include tone mapping so that the one or more output signals produced by the output signal interface 114 and transmitted to the input signal interface 106 represent, at least, output luminance values in an output range of luminance values that is smaller than an input range of luminance values represented by the one or more input signals received at the input signal interface 110 from the signal source 112.

Figure 3:
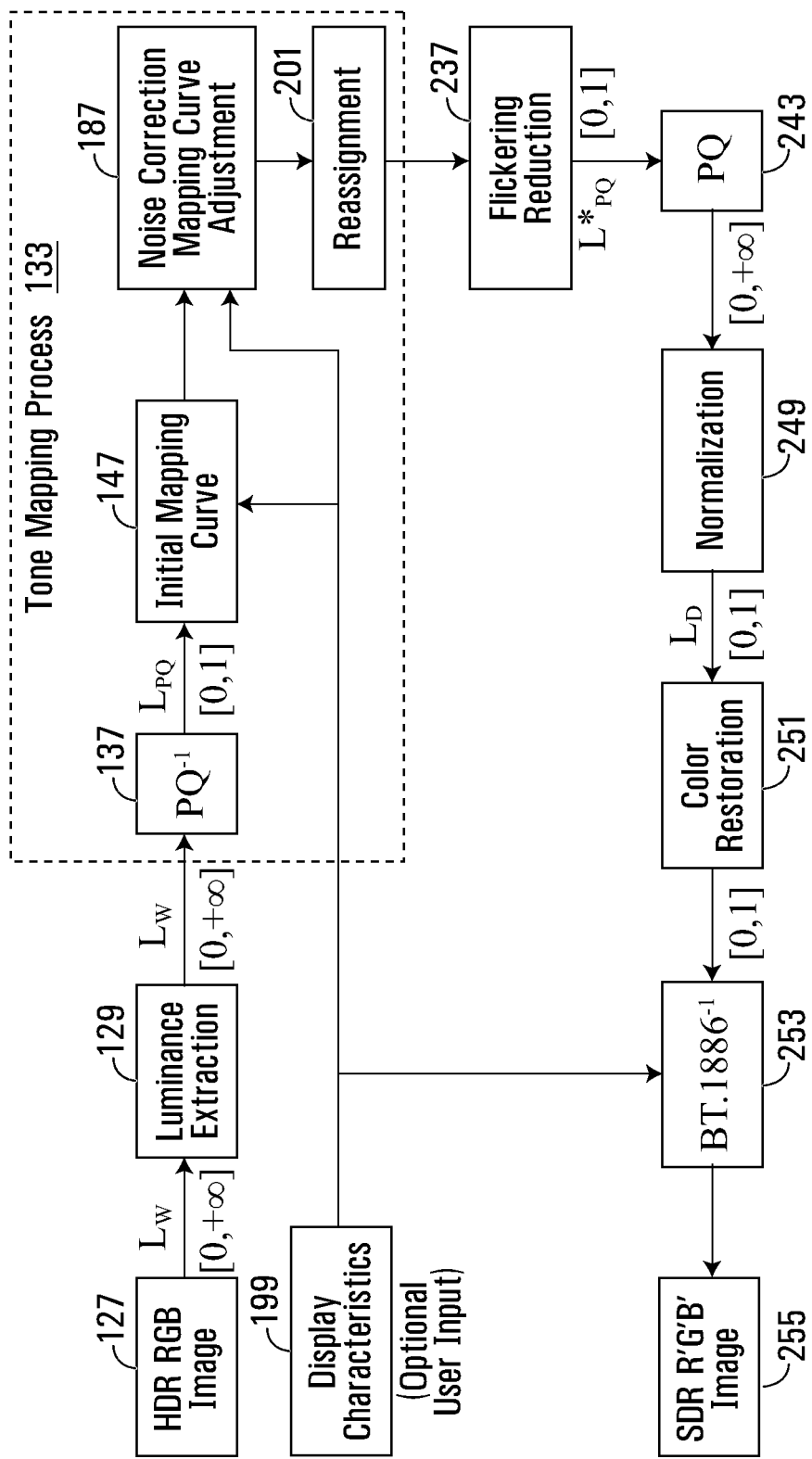
FIG. 3 illustrates operation of the processor circuit of FIG. 2.

FIG. 3 is an illustration of operation of the processor circuit 116, although alternative embodiments may differ.

As shown in FIG. 2, the program memory 120 may include input signal processing program codes 126 that, when executed by the microprocessor 118, cause the processor circuit 116 to receive, at the input signal interface 110, the one or more input signals from the signal source 112. In general, the input signal processing program codes 126 cause the processor circuit 116 to manage an input signal buffer 128 in the storage memory 122 to buffer data representing pixels of sequential frames of video represented by the one or more input signals received at the input signal interface 110 from the signal source 112. An example of such a frame of video is shown at 127 in FIG. 3. In the example of FIG. 3, the frame of video 127 is a frame of HDR video in a red-green-blue ("RGB") color space, although alternative embodiments may differ. For example, in alternative embodiments, the frame of video 127 may not necessarily be HDR, may include a different color space (such as a "YUV" luminance-chrominance color space or an "ICtCp" color space, for example), or both.

Further, the input signal processing program codes 126 cause the processor circuit 116 to identify (as shown at 129 in FIG. 3) and to store, in an input luminance values store 130 in the storage memory 122, input luminance values of pixels of frames of the video in response to the one or more input signals received at the input signal interface 110 from the signal source 112. As indicated above, in the embodiment shown, the input luminance values in the input luminance values store 130 are in an input range of luminance values of HDR. The input range of luminance values range from 0.005 candelas per square meter ("nits") to 10,000 nits in the embodiment shown, although alternative embodiments may differ.

The one or more input signals received at the input signal interface 110 from the signal source 112 do not necessarily encode the input luminance values in the input luminance values store 130 directly. Rather, the input luminance values in the input luminance values store 130 may be represented in the one or more input signals received at the input signal interface 110 from the signal source 112 by other encoding, such as encoding of intensities of additive colors such as red, green, and blue or of intensities in other color spaces, for example, and the input luminance values in the input luminance values store 130 may be determined from such intensities of such additive colors. Therefore, the one or more input signals received at the input signal interface 110 from the signal source 112 may represent the input luminance values in the input luminance values store 130 without necessarily encoding the input luminance values directly.

Further, the input luminance values in the input luminance values store 130 are not necessarily identical to input luminance values represented by the one or more input signals received at the input signal interface 110 from the signal source 112. For example, input luminance values represented by the one or more input signals received at the input signal interface 110 from the signal source 112 may be filtered or otherwise processed, and the input luminance values in the input luminance values store 130 may reflect such filtering or other processing.

The input luminance values in the input luminance values store 130 may represent physical intensities of light and may therefore be described as physically linear. For example, two different input luminance values in the input luminance values store 130 may represent respective different physical intensities of light, so that a proportionate difference between the two different input luminance values in the input luminance values store 130 may be the same as a proportionate difference between the respective physical intensities of light. However, the human visual system does not perceive light in proportion to physical intensity of the light. In general, if the human visual system perceives a difference between two relatively dark physical intensities of light to be the same as a difference between two relatively bright physical intensities of light, then the difference between the two relatively dark physical intensities of light is typically smaller than the difference between the two relatively bright physical intensities of light.

Figure 4:
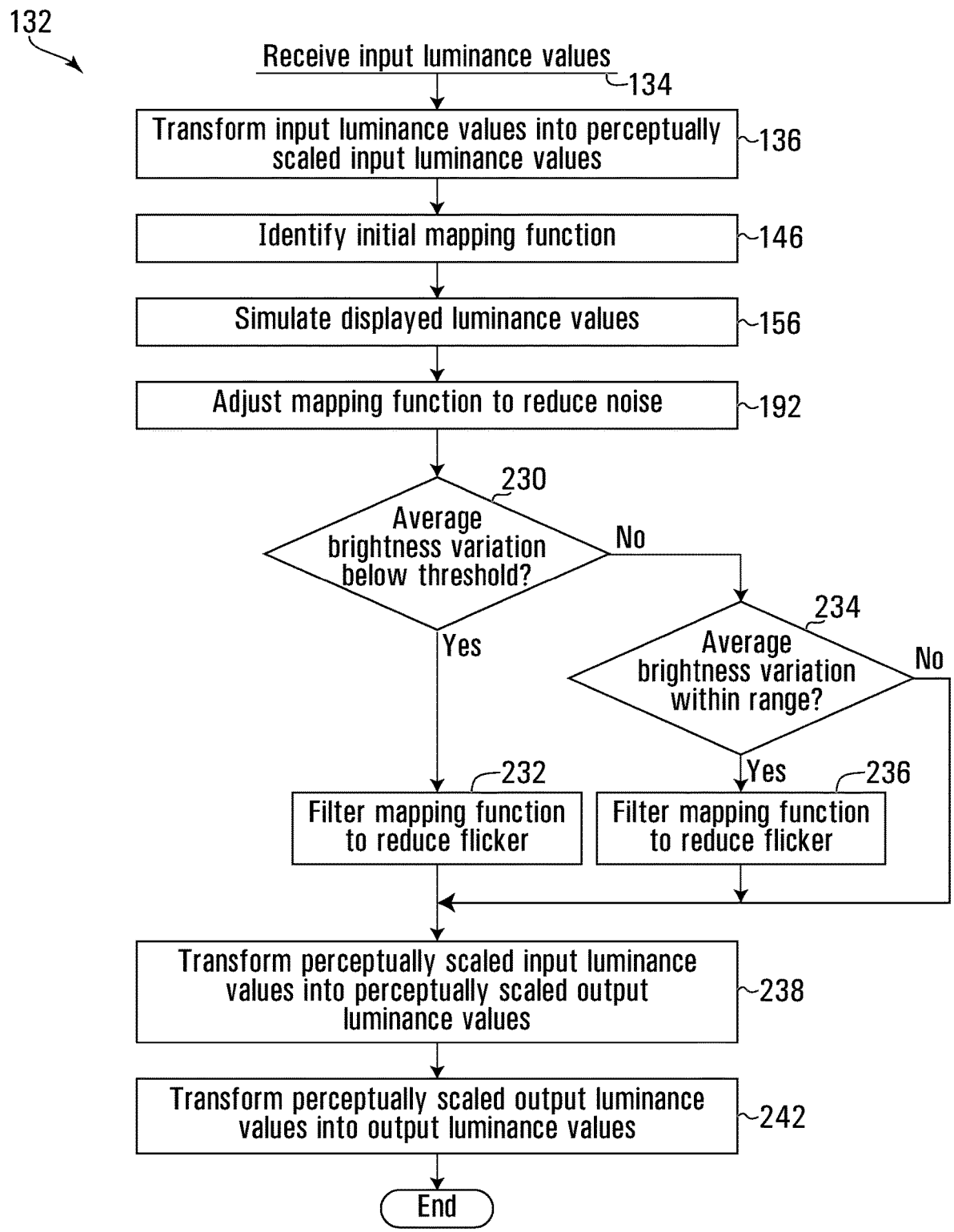
FIG. 4 illustrates tone mapping program codes in a program memory in the processor circuit of FIG. 2.

As also shown in FIG. 2, the program memory 120 may also include tone mapping program codes 132. Referring to FIG. 4, the tone mapping program codes 132 are illustrated schematically and generally include blocks of code that, when executed by the microprocessor 118, cause the processor circuit 116 to transform (as shown at 133 in FIG. 3) the input luminance values in the input luminance values store 130 into respective output luminance values in an output range of luminance values different from the input range of luminance values. As indicated above, in the embodiment shown, the output luminance values are in an output range of luminance values of SDR, which is smaller than the input range of luminance values, although alternative embodiments may differ.

In the embodiment shown, the tone mapping program codes 132 may be executed once for a respective single frame of video represented by the one or more input signals received at the input signal interface 110 from the signal source 112. However, alternative embodiments may differ. For example, in some embodiments, the tone mapping program codes 132 may be executed once for more than one frame, such as a plurality of successive frames, for example.

The tone mapping program codes 132 begin at 134 in response to receiving the input luminance values from the input luminance values store 130 of pixels of the frame (or frames) of video. The tone mapping program codes 132 may continue at block 136, which includes codes that, when executed by the microprocessor 118, cause the processor circuit 116 to transform (as shown at 137 in FIG. 3) the input luminance values from the input luminance values store 130 into respective perceptually scaled input luminance values, and to store the perceptually scaled input luminance values in a perceptually scaled input luminance values store 138 (shown in FIG. 2) in the storage memory 122.

In the embodiment shown, the codes at block 136 include codes of an inverse perceptual quantizer ("PQ") transform function as described in S. Miller, M. Nezamabadi, and S. Daly, "Perceptual Signal Coding for More Efficient Usage of Bit Codes," *SMPTE Motion Imaging Journal*, vol. 122, no. 4, pp. 52-59, 2013. Such an inverse PQ transform function transforms the input luminance values from the input luminance values store 130 into respective values that are proportional to perceived brightness by a human observer. Therefore, the perceptually scaled input luminance values in the perceptually scaled input luminance values store 138 may be described as perceptually linear, in that two different perceptually scaled input luminance values in the perceptually scaled input luminance values store 138 may represent respective different levels of perceived brightness by a human observer, so that a proportionate difference between the two different perceptually scaled input luminance values in the perceptually scaled input luminance values store 138 may be the same as a proportionate difference between the respective levels of perceived brightness by a human observer. However, alternative embodiments may differ and may, for example, transform input luminance values into respective perceptually scaled input luminance values in one or more other ways. For example, in some embodiments, transforming input luminance values into respective perceptually scaled input luminance values may involve one or more other non-logarithmic and non-gamma perceptual transform functions. Further, in some embodiments, transforming input luminance values into respective perceptually scaled input luminance values may involve hybrid perceptual transform functions that may combine different types of functions such as a PQ transform or inverse transform function, a logarithmic function, an exponential function, a polynomial function, a gamma transform or inverse transform function, or a combination of two or more thereof. Therefore, reference herein to applying one type of transform function to at least some of a plurality of input luminance values may include applying the one type of transform function and at least one other type of transform function to the plurality of input luminance values.

Figure 5:
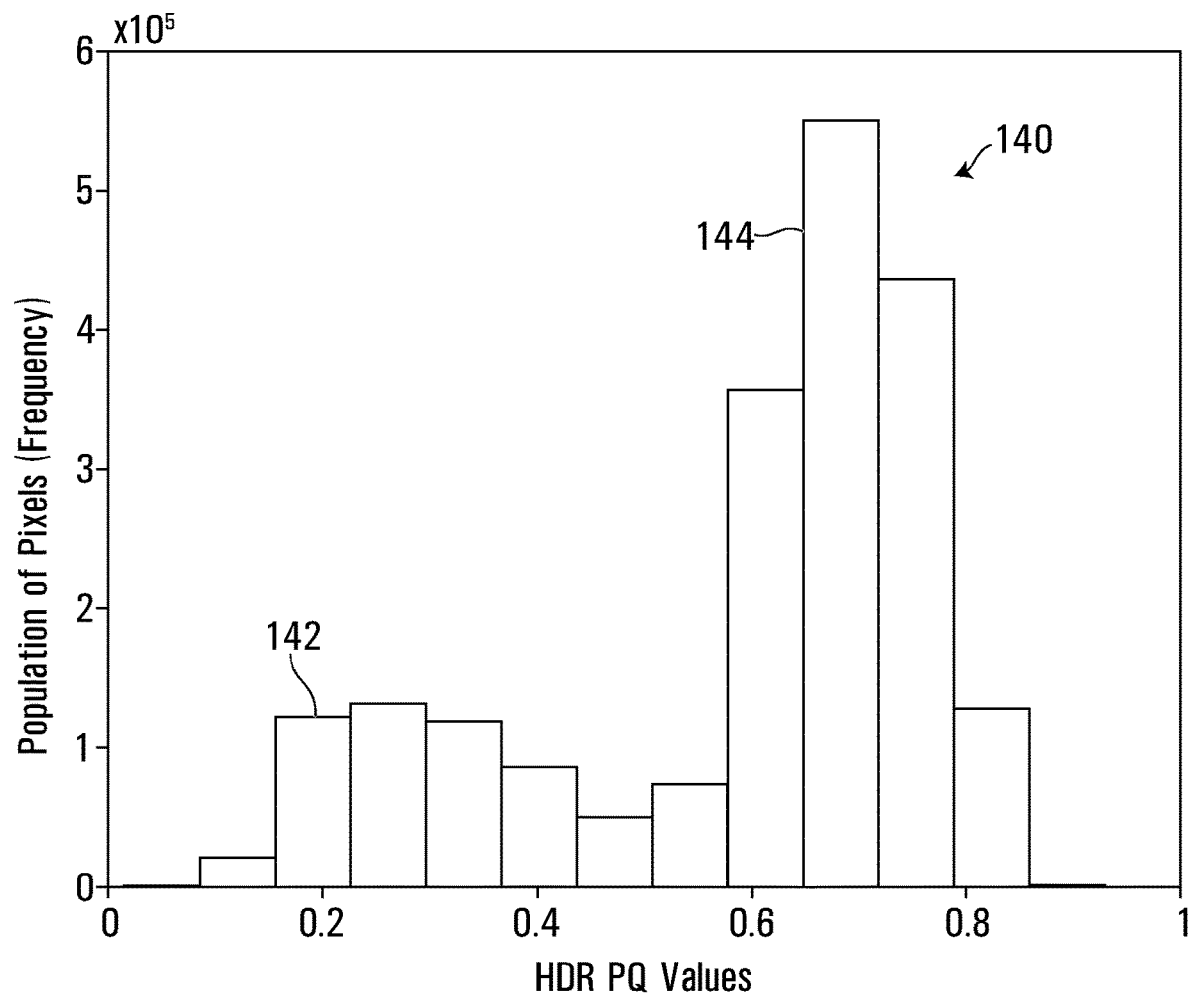
FIG. 5 illustrates a perceptually scaled distribution of a plurality of input luminance values according to one embodiment.

In one example, a histogram (or, more generally, a distribution) of the perceptually scaled input luminance values of the frame (or frames) in the perceptually scaled input luminance values store 138 is shown generally at 140 in FIG. 5. As indicated above, in the embodiment shown, the input range of luminance values range from 0.005 nits to 10,000 nits, and the range from 0.005 nits to 10,000 nits is perceptually scaled to a range of perceptually scaled input luminance values from about 0.0151 to 1, although alternative embodiments may differ. Therefore, as shown in FIG. 5, the perceptually scaled input luminance values in the perceptually scaled input luminance values store 138 may range from about 0.0151 to 1.

In the embodiment shown, perceptually scaled luminance values are in a PQ domain, but alternative embodiments may differ. For example, alternative embodiments may identify perceptually scaled output luminance values by transforms that are not necessarily PQ, so the range of perceptually scaled output luminance values may also vary for different transforms, for example.

As also shown in FIG. 5, the histogram 140 represents segmentation of the perceptually scaled input luminance values in the perceptually scaled input luminance values store 138 into 14 segments, each associated with a respective range of perceptually scaled input luminance values, although alternative embodiments may segment perceptually scaled input luminance values into more or fewer segments. Further, in the embodiment shown, the 14 ranges all have the same size of range of perceptually scaled input luminance values, but in alternative embodiments the ranges may not necessarily all have the same sizes of range.

In each of the segments of the perceptually scaled input luminance values, the histogram 140 includes a bar representing a number of pixels in the frame (or frames) having a perceptually scaled input luminance value in the associated range of perceptually scaled input luminance values. For example, a bar 142 indicates a relatively small number of pixels in the frame (or frames) having a perceptually scaled input luminance value between about 0.1558 and about 0.2261. As another example, a bar 144 indicates a relatively large number of pixels in the frame (or frames) having a perceptually scaled input luminance value between about 0.6482 and about 0.7186.

For convenience, a segment of the perceptually scaled input luminance values having a relatively small bar (such as the bar 142) may be referred to as a small segment because a relatively small number of pixels in the frame (or frames) have perceptually scaled input luminance values in the range associated with such a segment. Likewise, for convenience, a segment of the perceptually scaled input luminance values having a relatively large bar (such as the bar 144) may be referred to as a large segment because a relatively large number of pixels in the frame (or frames) have perceptually scaled input luminance values in the range associated with such a segment.

Referring back to FIG. 4, after block 136, the tone mapping program codes 132 may continue at block 146, which includes codes that, when executed by the microprocessor 118, cause the processor circuit 116 to identify an initial mapping function (as shown at 147 in FIG. 3) and to store codes defining the initial mapping function in a mapping function store 148 (shown in FIG. 2) in the storage memory 122. In general, a mapping function may define a transformation of input luminance values to output luminance values. In the embodiment shown, mapping functions defined by codes in the mapping function store 148 define a transformation of perceptually scaled input luminance values in the perceptually scaled input luminance values store 138 into respective perceptually scaled output luminance values. By defining transformations of perceptually scaled luminance values, mapping functions in the embodiment shown may be defined in ranges that are more likely to be relevant to the human visual system than mapping functions that do not define transformations of perceptually scaled luminance values.

In the embodiment shown, the output luminance values are in an output range of luminance values of SDR, which range from 0.1 nits to 100 nits and which have a range of perceptually scaled output luminance values from about 0.0623 to about 0.5081. However, alternative embodiments may differ.

Also, in the embodiment shown, the initial mapping function is a cumulative distribution function (shown at 150 in FIG. 6) of the histogram 140 (or, more generally, a cumulative distribution function of a perceptually scaled distribution of the input luminance values of the frame (or frames) represented by the one or more input signals received at the input signal interface 110 from the signal source 110 and stored in the input luminance values store 130, or a cumulative distribution function of a distribution of the perceptually scaled input luminance values of the frame (or frames) in the perceptually scaled input luminance values store 138). In other words, the initial mapping function 150 in the embodiment shown is a piece-wise linear function that is continuous, that is monotonically increasing or monotonically non-decreasing, and that has a respective portion having a respective slope in each of the segments of the perceptually scaled input luminance values in the perceptually scaled input luminance values store 138 as described above, and in each segment of the perceptually scaled input luminance values, the respective portion of the initial mapping function 150 has a respective slope that is proportionate to the proportion of pixels in the frame (or frames) having a perceptually scaled input luminance value in the range of perceptually scaled input luminance values associated with the segment.

However, the initial mapping function in alternative embodiments may differ. For example, the initial mapping function in alternative embodiments may not be a piece-wise linear function, may not be continuous, or both. Further, the initial mapping function 150 may be a different function that may not necessarily be a cumulative distribution function but that may have slopes in respective segments of the perceptually scaled input luminance values in the perceptually scaled input luminance values store 138, and the slopes in such respective segments may be proportionate or otherwise in response to the proportion of pixels in the frame (or frames) having a perceptually scaled input luminance value in the range of perceptually scaled input luminance values associated with the segment.

In general, because the slope of a portion of the initial mapping function 150 in a respective segment of the perceptually scaled input luminance values store 138 is proportional to the proportion of pixels in the frame (or frames) having a perceptually scaled input luminance value in the range of perceptually scaled input luminance values associated with the segment, the initial mapping function 150 maps the segments of the perceptually scaled input luminance values store 138 to respective ranges of perceptually scaled output luminance values that are proportionate in size to the proportion of pixels in the frame (or frames) having a perceptually scaled input luminance value in the range of perceptually scaled input luminance values from which the perceptually scaled output luminance values were transformed. In other words, the initial mapping function 150 transforms relatively large segments of perceptually scaled input luminance values to relatively large ranges of perceptually scaled output luminance values, and therefore may prioritize ranges of perceptually scaled output luminance values that are transformed from ranges of input luminance values that are particularly important to the human visual system in a particular frame (or frames). The initial mapping function 150 is therefore responsive to a perceptually scaled distribution of the input luminance values in the input luminance values store 130.

For example, as indicated above, the bar 142 indicates a relatively small number of pixels having a perceptually scaled input luminance value between about 0.1558 and about 0.2261, and a slope of a portion 152 of the initial mapping function 150 in the range of perceptually scaled input luminance values between about 0.1558 and about 0.2261 is relatively small. Therefore, the portion 152 transforms perceptually scaled input luminance values between about 0.1558 and about 0.2261 to a relatively small range of perceptually scaled output luminance values. As another example, the bar 144 indicates a relatively large number of pixels having a perceptually scaled input luminance value between about 0.6482 and about 0.7186, and a slope of a portion 154 of the initial mapping function 150 in the range of perceptually scaled input luminance values between about 0.6482 and about 0.7186 is relatively large. Therefore, the portion 154 transforms perceptually scaled input luminance values between about 0.6482 and about 0.7186 to a relatively large range of perceptually scaled output luminance values.

In some embodiments, the slope of a portion of the initial mapping function 150 in a segment of the perceptually scaled input luminance values store 138 may be zero if the proportion of pixels in the frame (or frames) having a perceptually scaled input luminance value in the range of perceptually scaled input luminance values associated with the segment is below a threshold, such as 0.005% in the embodiment shown or a different threshold in other embodiments. As a result, in such embodiments, pixels in such a segment of the perceptually scaled input luminance values store 138 are all mapped to the same perceptually scaled output luminance value.

Because the initial mapping function 150 is a cumulative distribution function, the initial mapping function 150 is also monotonically increasing or monotonically non-decreasing. Further, the initial mapping function 150 may be referred to as a global tone mapping function because the initial mapping function 150 may be applied to all pixels in a frame (or frames), and not to any specific spatially limited regions of the pixels in one or more frames. However, alternative embodiments may differ, and mapping functions in alternative embodiments need not be global tone mapping functions but could, for example, apply local tone mapping functions to some but not all of the pixels in one or more frames.

The histogram 140 is a visual representation for illustration only, and embodiments such as those described herein do not necessarily produce any histograms or other visual representations. Rather, in various embodiments, the codes at block 146 may cause the processor circuit 116 to identify an initial mapping function such as a cumulative distribution function of a perceptually scaled distribution of the input luminance values of the frame (or frames) or as a cumulative distribution function of a distribution of the perceptually scaled input luminance values of the frame (or frames), for example. In alternative embodiments, a perceptually scaled distribution of the input luminance values may be determined in other ways.

In general, different display devices may encode and decode signals in different ways, such as gamma encoding and decoding, for example. One example of a gamma encoding and decoding standard is known as BT.1886, although other gamma encoding and decoding standards may differ. In some embodiments, luminance values (for example, SDR luminance values ranging from 0.1 nits to 100 nits) may be transformed into respective inverse-gamma-generated luminance values (according to BT.1886 gamma decoding or inverse BT.1886 gamma encoding, for example), and the inverse-gamma-generated luminance values may range from 0 to 1, for example. The inverse-gamma-generated luminance values may be quantized (by transforming the inverse-gamma-generated luminance values into respective discrete integer values for digital encoding, for example), and the quantized inverse-gamma-generated luminance values may range from 0 to 255 (if the display device has a bit depth of eight bits) or from 0 to 1023 (if the display device has a bit depth of ten bits), for example.

The quantized inverse-gamma-generated luminance values may then be encoded in at least one signal, and the at least one signal may be transmitted to a display device.

The display device may receive the at least one signal encoded with the quantized inverse-gamma-generated luminance values, and the display device may dequantize the quantized inverse-gamma-generated luminance values (by the inverse of the quantization transform, for example) into dequantized inverse-gamma-generated luminance values, which may range from 0 to 1, for example. The display device may then apply gamma encoding to transform the dequantized inverse-gamma-generated luminance values into respective displayed luminance values, which depend on a dynamic range of the display device. For example, the dynamic range of the display device may be from 0.1 nits to 100 nits, or may be a different range.

As a result of such gamma decoding, quantization, dequantization, and gamma encoding, luminance values actually displayed on a display device may depend on the display device and may more particularly depend on the bit depth of the display device, on gamma encoding or other encoding or decoding of the display device, on a dynamic range of the display device, on one or more other characteristics of display device, or on a combination of one or more thereof.

In the embodiment shown, the initial mapping function 150 may be adjusted as described below, and such adjustment may be more accurate when made in response to a simulation of how luminance values will actually be displayed. Such simulated or expected displayed luminance values may be transformed into respective estimated display-relative perceptually scaled output luminance values, and in the embodiment shown, adjustments to the initial mapping function 150 may be made in respect of display-relative perceptually scaled output luminance values that are estimated from simulated or expected displayed luminance values. Adjusting the initial mapping function 150 in respect of such display-relative perceptually scaled output luminance values may account for the simulation of how luminance values will actually be displayed, including any visual distortion that such gamma decoding, quantization, dequantization, and gamma encoding may introduce.

In the embodiment shown, the display device 102 employs BT.1886 gamma encoding and decoding. However, alternative embodiments may include different gamma encoding and decoding, may simulate displayed luminance values in other ways.

FIG. 7 illustrates a process for adjustment of the initial mapping function 150 according to the tone mapping program codes 132.

Referring back to FIG. 4, after block 146, the tone mapping program codes 132 may continue at block 156, which includes codes that, when executed by the microprocessor 118, cause the processor circuit 116 to simulate displayed luminance values as displayed by the display device 102 according to the initial mapping function 150 defined by codes in the mapping function store 148, to estimate display-relative perceptually scaled output luminance values from the simulated displayed luminance values, and to store the simulated or estimated display-relative perceptually scaled output luminance values in a simulated luminance values store 158 (shown in FIG. 2) in the storage memory 122.

The codes at block 156 may begin by transforming (as shown at 159 in FIG. 7) the perceptually scaled input luminance values in the perceptually scaled input luminance values store 138 into respective initial perceptually scaled output luminance values according to the initial mapping function 150 defined by codes in the mapping function store 148. As indicated above, in the embodiment shown, the perceptually scaled output luminance values range from about 0.0623 to about 0.5081, but in alternative embodiments, the dynamic range of a display device (and thus the range of perceptually scaled output luminance values) may vary.

In the embodiment shown, FIG. 8 illustrates how the perceptually scaled input luminance values in the perceptually scaled input luminance values store 138 may be mapped into initial perceptually scaled output luminance values according to the initial mapping function 150 defined by codes in the mapping function store 148. For example, the portion 152 of the initial mapping function 150 maps perceptually scaled input luminance values in a range between about 0.1558 and about 0.2261 to a range shown generally at 160 of initial perceptually scaled output luminance values. As another example, the portion 154 of the initial mapping function 150 maps perceptually scaled input luminance values in a range between about 0.6482 and about 0.7186 to a range shown generally at 162 of initial perceptually scaled output luminance values.

Figure 9:
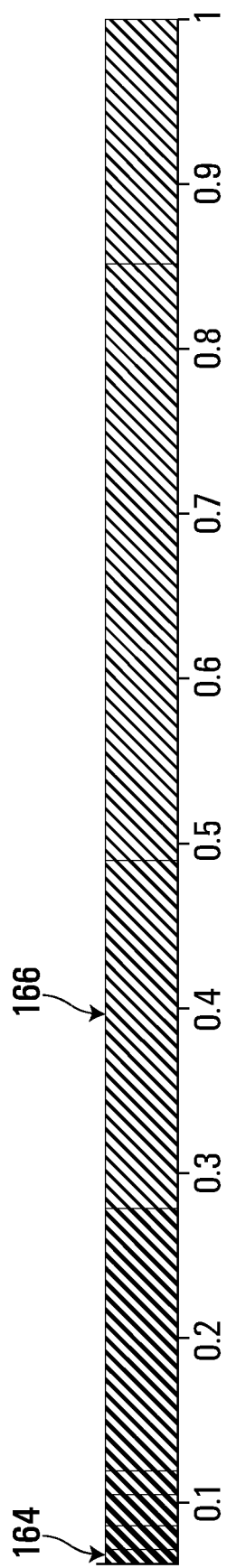
FIG. 9 illustrates inverse-gamma-generated luminance values transformed from the initial perceptually scaled output luminance values of FIG. 8.

The initial perceptually scaled output luminance values shown in FIG. 8 may then be transformed (as shown at 163 in FIG. 7) into respective initial physically scaled output luminance values (for example, by applying a PQ transform function into SDR luminance values ranging from 0.1 nits to 100 nits). The initial physically scaled output luminance values which may then be transformed (as shown at 165 in FIG. 7) into respective inverse-gamma-generated luminance values (according to inverse BT.1886 encoding in the embodiment shown, or according to one or more other standards in other embodiments), which range from 0 to 1 in the embodiment shown, as shown in FIG. 9, but which may differ in other embodiments. For example, the initial perceptually scaled output luminance values in the range 160 may be transformed to inverse-gamma-generated luminance values in a range shown generally at 164, and the initial perceptually scaled output luminance values in the range 162 may be transformed to inverse-gamma-generated luminance values in a range shown generally at 166.

Figure 10:
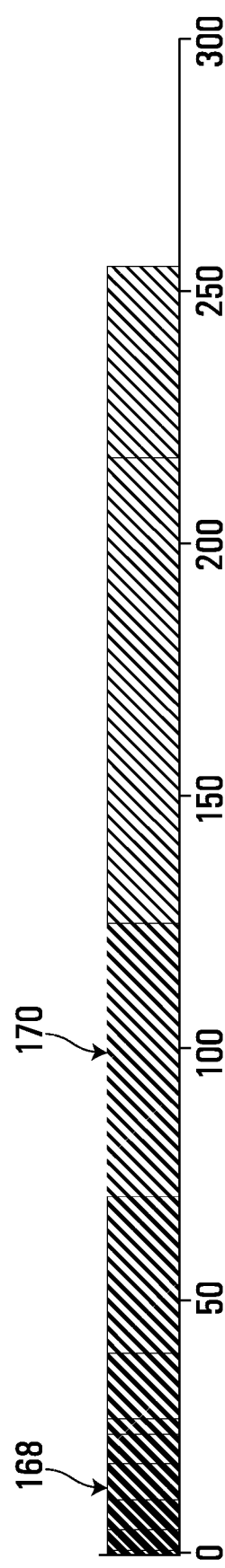
FIG. 10 illustrates quantized inverse-gamma luminance values transformed from the inverse-gamma-generated luminance values of FIG. 9.

The inverse-gamma-generated luminance values shown in FIG. 9 may then be transformed (as shown at 167 in FIG. 7) into respective quantized inverse-gamma luminance values, which range from 0 to 255 in the embodiment shown, as shown in FIG. 10, but which may differ in other embodiments. For example, the inverse-gamma-generated luminance values in the range 164 may be transformed to quantized inverse-gamma luminance values in a range shown generally at 168, and the inverse-gamma-generated luminance values in the range 166 may be transformed to quantized inverse-gamma luminance values in a range shown generally at 170.

Figure 11:
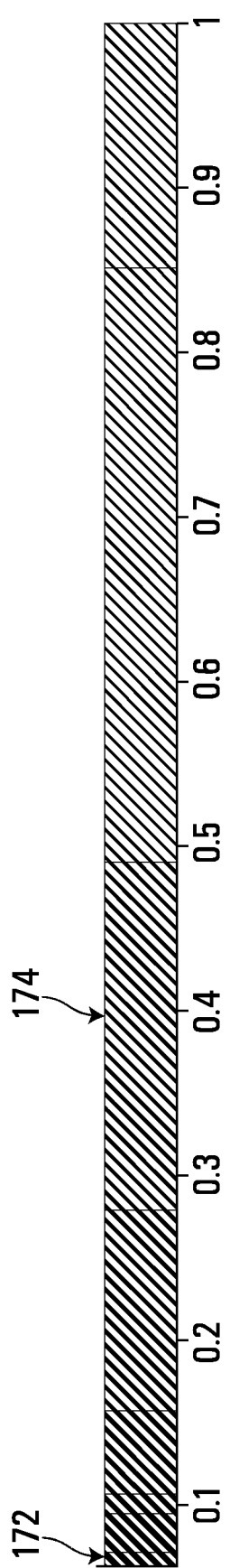
FIG. 11 illustrates dequantized inverse-gamma luminance values transformed from the quantized inverse-gamma luminance values of FIG. 10.

The quantized inverse-gamma luminance values shown in FIG. 10 may then be transformed (as shown at 171 in FIG. 7) into respective dequantized inverse-gamma luminance values, which range from 0 to 1 in the embodiment shown, as shown in FIG. 11, but which may differ in other embodiments. For example, the quantized inverse-gamma luminance values in the range 168 may be transformed to dequantized inverse-gamma luminance values in a range shown generally at 172, and the quantized inverse-gamma luminance values in the range 170 may be transformed to dequantized inverse-gamma luminance values in a range shown generally at 174.

Figure 12:
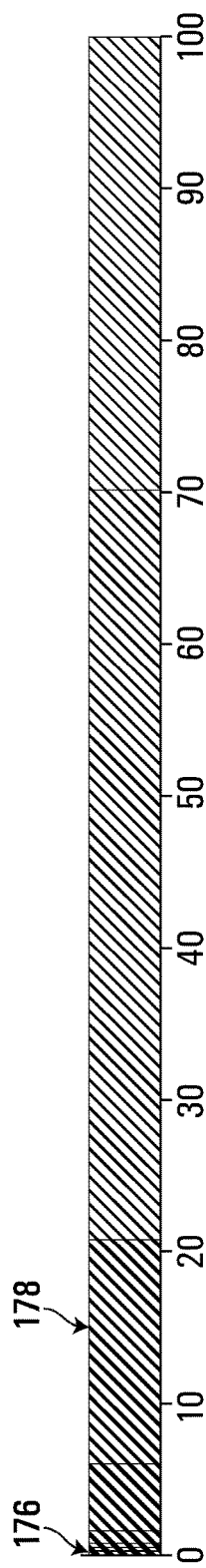
FIG. 12 illustrates simulated or expected displayed luminance values transformed from the dequantized inverse-gamma luminance values of FIG. 11.

The dequantized inverse-gamma luminance values shown in FIG. 11 may then be transformed (as shown at 175 in FIG. 7) into respective simulated or expected displayed luminance values (according to BT.1886 encoding in the embodiment shown, or according to one or more other standards in other embodiments), which range from 0.1 nits to 100 nits in the embodiment shown, as shown in FIG. 12 (although in alternative embodiments, display devices may have different dynamic ranges). For example, the dequantized inverse-gamma luminance values in the range 172 may be transformed to simulated or expected displayed luminance values in a range shown generally at 176, and the dequantized inverse-gamma luminance values in the range 174 may be transformed to simulated or expected displayed luminance values in a range shown generally at 178.

The simulated or expected displayed luminance values shown in FIG. 12 may then be transformed (as shown at 179 in FIG. 7) into respective display-relative perceptually scaled output luminance values (according to an inverse PQ transform function as described above, for example) as shown in FIG. 13. For example, the expected emitted light values in the range 176 may be transformed to display-relative perceptually scaled output luminance values in a range shown generally at 180, and the expected emitted light values in the range 178 may be transformed to display-relative perceptually scaled output luminance values in a range shown generally at 182.

Figure 13:
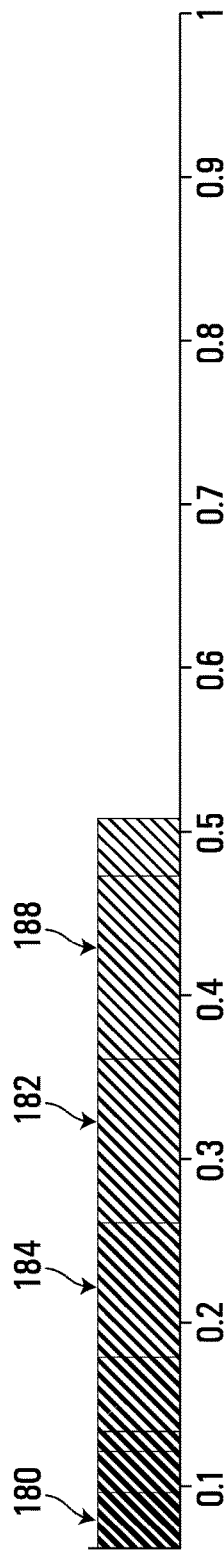
FIG. 13 illustrates display-relative perceptually scaled output luminance values transformed from the simulated or expected displayed luminance values of FIG. 12.

The display-relative perceptually scaled output luminance values shown in FIG. 13 differ from the initial perceptually scaled output luminance values shown in FIG. 8 as a result of simulated gamma decoding, quantization, dequantization, and gamma encoding as described above. As indicated above, in the embodiment shown, adjustments to the initial mapping function 150 may be made in respect of such display-relative perceptually scaled output luminance values. However, alternative embodiments may omit simulation of how luminance values will actually be displayed, and in such embodiments, adjustments to the initial mapping function 150 may be made in respect of initial perceptually scaled output luminance values as described above, for example.

Figure 14:
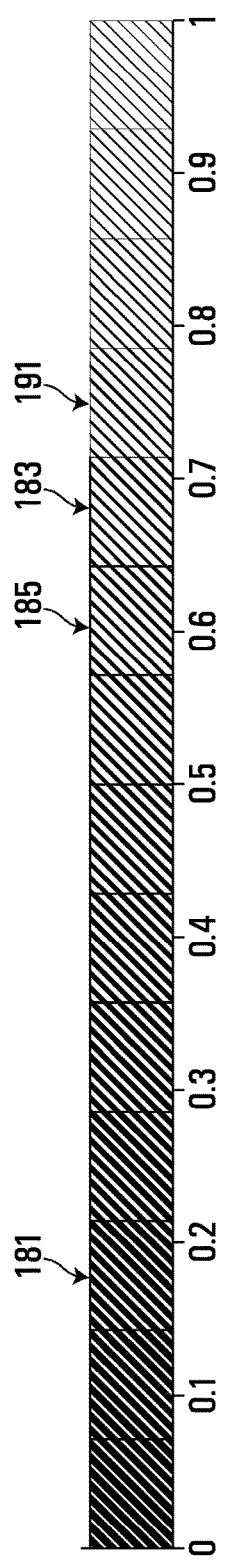
FIG. 14 illustrates ranges of perceptually scaled input luminance values perceptually scaled from the plurality of input luminance values of FIG. 5.

FIG. 14 illustrates ranges of the perceptually scaled input luminance values in the perceptually scaled input luminance values store 138. For example, the range of perceptually scaled input luminance values between about 0.1558 and about 0.2261 is shown generally at 181, and as described above, the display-relative perceptually scaled output luminance values in the range 180 were transformed from the perceptually scaled input luminance values in the range 181. As another example, the range of perceptually scaled input luminance values between about 0.6482 and about 0.7186 is shown generally at 183, and as described above, the display-relative perceptually scaled output luminance values in the range 182 were transformed from the perceptually scaled input luminance values in the range 183.

In the embodiment shown, the range 182 of display-relative perceptually scaled output luminance values is larger than the range 183 of perceptually scaled input luminance values of the portion 154 of the initial mapping function 150. As a result, the initial mapping function 150 transforms luminance values of pixels having perceptually scaled luminance values in the range 183 of the portion 154 of the initial mapping function 150 into a larger range of display-relative perceptually scaled output luminance values, which can create noise in an image generated according to the initial mapping function 150.

Also, in the embodiment shown, a range shown generally at 184 of display-relative perceptually scaled output luminance values is larger than a range (shown generally at 185 in FIG. 14) of perceptually scaled input luminance values of a portion 186 of the initial mapping function 150 from which display-relative perceptually scaled output luminance values in the range 184 were transformed. Also, in the embodiment shown, a range shown generally at 188 of display-relative perceptually scaled output luminance values is larger than a range (shown generally at 191 in FIG. 14) of perceptually scaled input luminance values of a portion 190 of the initial mapping function 150 from which display-relative perceptually scaled output luminance values in the range 188 were transformed. Therefore, noise may also be introduced in pixels having display-relative perceptually scaled output luminance values in the ranges 184 and 188.

The initial mapping function 150 may be adjusted (as shown at 187 in FIG. 3 and at 189 in FIG. 7) to reduce or avoid noise that may be introduced from the initial mapping function 150. Referring back to FIG. 4, after block 156, the tone mapping program codes 132 may continue at block 192, which includes codes that, when executed by the microprocessor 118, cause the processor circuit 116 to adjust the initial mapping function 150 and to store codes defining an adjusted mapping function in the mapping function store 148.

The codes at block 156 may begin by reducing the slopes of any portions of the initial mapping function 150 (the portions 154, 186, and 190 in the embodiment shown) that transform perceptually scaled input luminance values into ranges of display-relative perceptually scaled output luminance values (the ranges 182, 184, and 188 in the embodiment shown) that are larger than the ranges of the perceptually scaled input luminance values from which the display-relative perceptually scaled output luminance values were transformed until the ranges of display-relative perceptually scaled output luminance values are no larger than (and, in some embodiments, the same size as) the ranges of the perceptually scaled input luminance values from which the display-relative perceptually scaled output luminance values were transformed.

Figure 15:
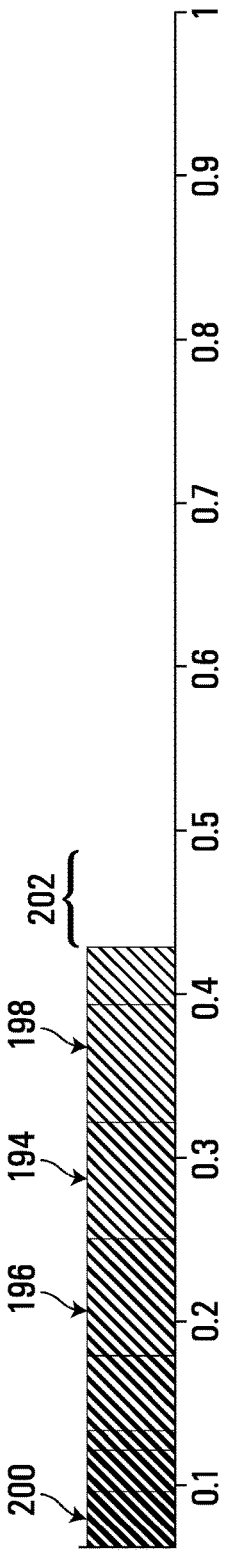
FIG. 15 illustrates display-relative perceptually scaled output luminance values transformed from the simulated or expected displayed luminance values of FIG. 12 according to the initial mapping function of FIG. 6 adjusted to reduce noise.

Therefore, in the embodiment shown, the slopes of the portions 154, 186, and 190 of the initial mapping function 150 may be reduced until, as shown in FIG. 15, the portion 154 maps perceptually scaled input luminance values to a range of display-relative perceptually scaled output luminance values shown generally at 194 that is no larger than (and that is, in some embodiments, the same size as) the range of perceptually scaled input luminance values of the portion 154 and that is therefore smaller than the range 182, the portion 186 maps perceptually scaled input luminance values to a range of display-relative perceptually scaled output luminance values shown generally at 196 that is no larger than (and that is, in some embodiments, the same size as) the range of perceptually scaled input luminance values of the portion 186 and that is therefore smaller than the range 184, and the portion 190 maps perceptually scaled input luminance values to a range of display-relative perceptually scaled output luminance values shown generally at 198 that is no larger than (and that is, in some embodiments, the same size as) the range of perceptually scaled input luminance values of the portion 190 and that is therefore smaller than the range 188.

Figure 16:
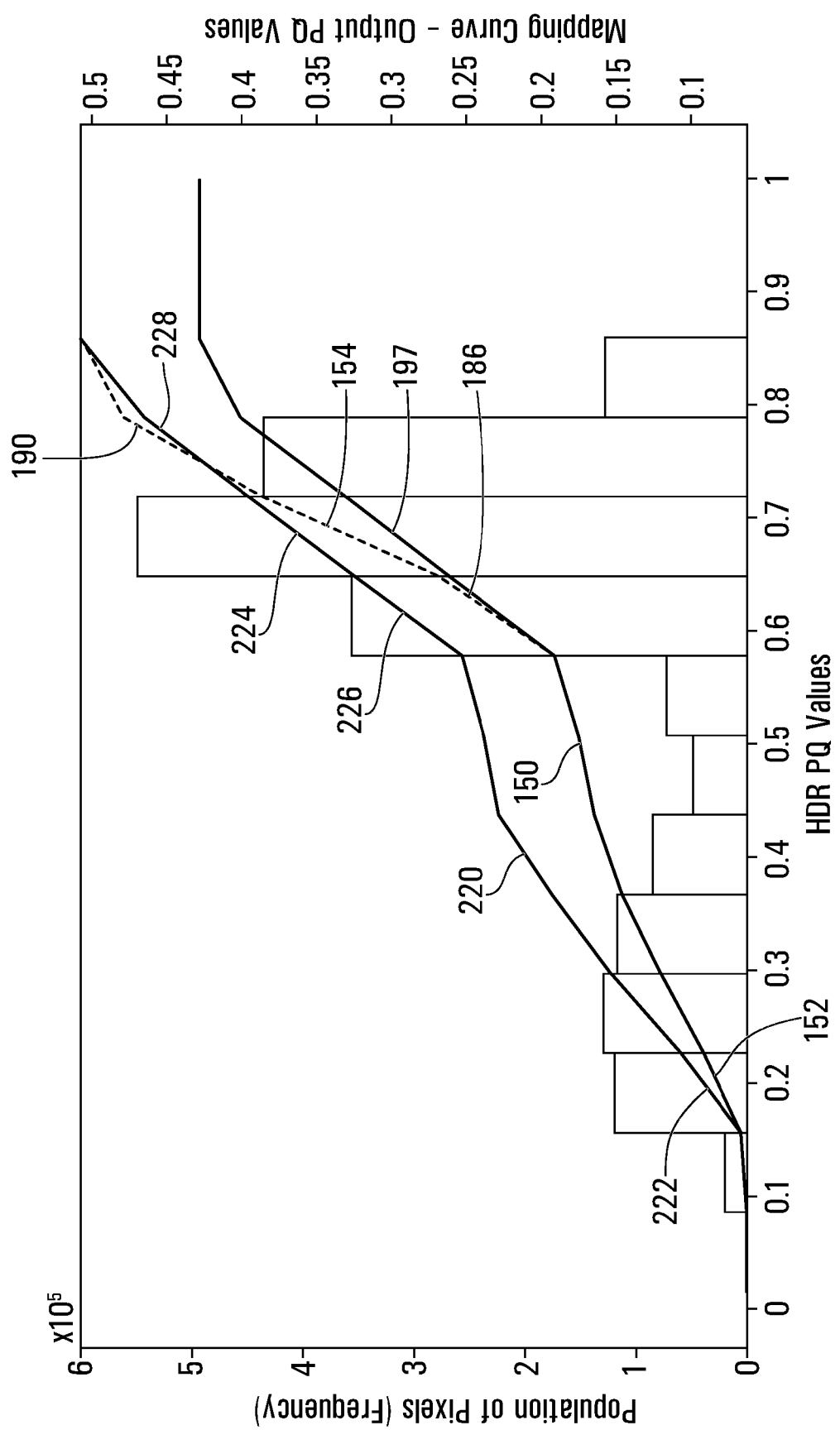
FIG. 16 illustrates an adjusted mapping function adjusted from the initial mapping function of FIG. 6 to reduce noise and a further-adjusted mapping function adjusted from the adjusted mapping function to expand the overall range of the display-relative perceptually scaled output luminance values.

Reducing slopes of portions of the initial mapping function 150 as described above adjusts the initial mapping function to an adjusted or intermediate mapping function shown at 197 in FIG. 16. At this stage, in the embodiment shown, the slope of the portion 152 of the initial mapping function 150 is unchanged in the adjusted mapping function, so the portion 152 maps perceptually scaled input luminance values to a range of display-relative perceptually scaled output luminance values shown generally at 200 that is the same size as the range 160.

In general, adjusting the initial mapping function 150 by reducing slopes of portions of the initial mapping function 150 as described above may be described as adjustments to the initial mapping function 150 to reduce noise. Further, in the embodiment shown, such adjustments to the initial mapping function 150 to reduce noise are made in response to simulated or expected display-relative perceptually scaled output luminance values (including any visual distortion that such gamma decoding, quantization, dequantization, and gamma encoding may introduce) and may therefore be responsive to characteristics of the display device 102 (as shown at 199 in FIG. 3) such as bit depth of the display device 102, gamma encoding or other encoding or decoding of the display device 102, on dynamic range of the display device 102, on one or more other characteristics of display device, or on a combination of one or more thereof.

Figure 6:
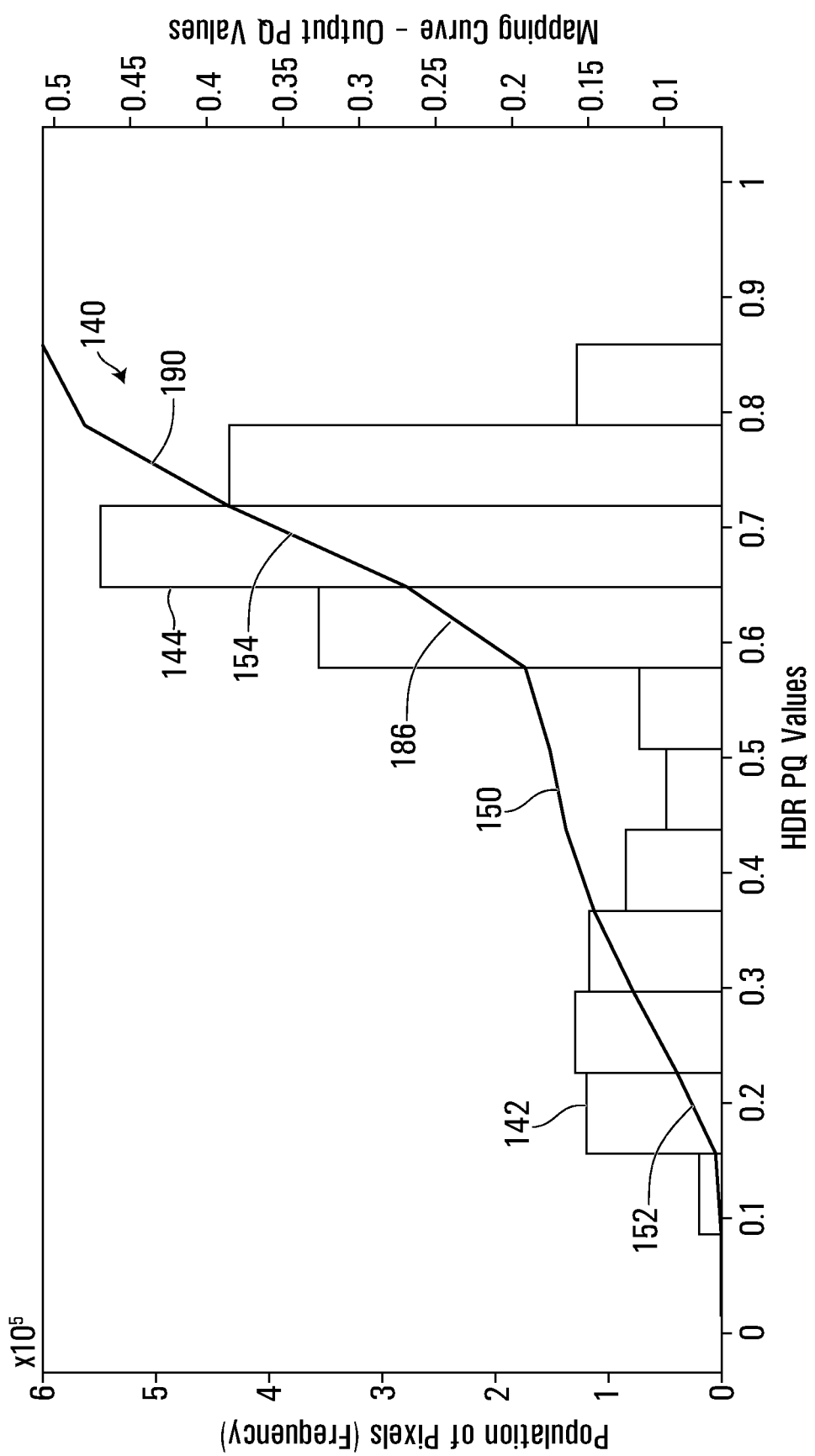
FIG. 6 illustrates an initial mapping function according to the perceptually scaled distribution of the plurality of input luminance values of FIG. 5.

As indicated above, the output range of luminance values in the embodiment shown has a range of perceptually scaled output luminance values from about 0.0623 to about 0.5081, but reducing slopes as described above has left a range 202 of display-relative perceptually scaled output luminance values unused. Therefore, in any portions of the adjusted mapping function that transform perceptually scaled input luminance values into ranges of display-relative perceptually scaled output luminance values (as shown in FIG. 15) that are smaller than the ranges of the perceptually scaled input luminance values (as shown in FIG. 6 and in FIG. 14) from which the display-relative perceptually scaled output luminance values were transformed, slopes in portions of the adjusted mapping function may be increased until the unused range 202 is reduced or eliminated. In general, such increases of slopes of portions of the initial mapping function 150 may be referred to as adjustments of the initial mapping function 150 to expand the overall range of the display-relative perceptually scaled output luminance values.

For convenience, when a portion of the adjusted mapping function maps a segment of the perceptually scaled input luminance values to range of display-relative perceptually scaled output luminance values (as shown in FIG. 15) that is smaller than the range of the perceptually scaled input luminance values (as shown in FIG. 6 and in FIG. 14) from which the display-relative perceptually scaled output luminance values were transformed, the segment of the perceptually scaled input luminance values may be referred to as underrepresented.

In the embodiment shown, slopes in portions of the adjusted mapping function in underrepresented segments of the perceptually scaled input luminance values may be increased (as shown at 201 in FIG. 3) depending on an average brightness of the frame (or frames). In the embodiment shown, the average brightness of the frame (or frames) may be calculated as a geometric mean, namely as $$\left(\prod_{i=1}^{N} x_i\right)^{1/N} = \sqrt[N]{x_1 x_2 x_3 \ldots x_N} \quad \text{(Eq. 1)}$$

where N is the number of pixels in the frame (or frames) and $x_i$ is the brightness (for example according to the perceptually scaled input luminance values in the perceptually scaled input luminance values store 138, as shown at 203 in FIG. 7) of the $i^{th}$ pixel in the frame (or frames). A geometric mean may be less prone to outliers than other statistical metrics. However, in other embodiments, average brightness of the frame (or frames) may be determined differently.

As indicated above, for convenience, a segment of the perceptually scaled input luminance values having a relatively small bar (such as the bar 142) may be referred to as a small segment because a relatively small number of pixels in the frame (or frames) have perceptually scaled input luminance values in the range associated with such a segment, whereas a segment of the perceptually scaled input luminance values having a relatively large bar (such as the bar 144) may be referred to as a large segment because a relatively large number of pixels in the frame (or frames) have perceptually scaled input luminance values in the range associated with such a segment.

In some embodiments, if the geometric mean brightness of the frame (or frames) is below 14.76% of a dynamic range of the frame or frames (or, more generally, when an average brightness of the perceptually scaled input luminance values is below a first threshold, which may differ in other embodiments), then the frame (or frames) may be treated as a dark frame (or as dark frames). When the frame is treated as a dark frame (or when the frames are treated as dark frames), one or more slopes in one or more portions of the adjusted mapping function may be increased in one or more of the largest underrepresented segments of the perceptually scaled input luminance values that are brighter than (that is, to the right-hand side in FIG. 5 and in FIG. 6) the largest segments of the perceptually scaled input luminance values. Reassigning display-relative perceptually scaled output luminance values in a dark frame (or frames) to portions of the adjusted mapping function in the largest underrepresented segments of the perceptually scaled input luminance values that are brighter than the largest segments of the perceptually scaled input luminance values may maintain overall brightness and contrast of the frame (or frames) and may therefore preserve artistic intent in such dark frames.

In other words, in some embodiments, if an average brightness of the perceptually scaled input luminance values in the perceptually scaled input luminance values store 138 is below a first threshold, then the adjusted mapping function may be further adjusted by increasing the respective slope or slopes of at least one portion of the adjusted mapping function for at least one underrepresented segment of the of the distribution of the perceptually scaled input luminance values that is brighter than one or more of the largest segments of the distribution of the perceptually scaled input luminance values.

Further, in some embodiments, if the geometric mean brightness of the frame (or frames) is above 14.76% and no larger than 74.04% of the dynamic range of the frame or frames (or, more generally, when an average brightness of the perceptually scaled input luminance values is above a first threshold and below a second threshold, one or both of which may differ in other embodiments), then the frame (or frames) may be treated as an intermediate frame (or as intermediate frames). When the frame is treated as an intermediate frame (or when the frames are treated as intermediate frames), one or more slopes in one or more portions of the adjusted mapping function may be increased in one or more of the largest underrepresented segments of the perceptually scaled input luminance values.

In other words, in some embodiments, if the average brightness of the perceptually scaled input luminance values in the perceptually scaled input luminance values store 138 is above a first threshold and below a second threshold, then the adjusted mapping function may be further adjusted by increasing the respective slope or slopes of at least one portion of the adjusted mapping function for at least one underrepresented segment of the of the distribution of the perceptually scaled input luminance values that maps at least one respective range of perceptually scaled input luminance values having a greater number of perceptually scaled input luminance values than at least one other range of perceptually scaled input luminance values.

Further, in some embodiments, if the geometric mean brightness of the frame (or frames) is above 74.04% of the dynamic range of the frame or frames (or, more generally, when an average brightness of the perceptually scaled input luminance values is above a second threshold, which may differ in other embodiments), then the frame (or frames) may be treated as a bright frame (or as bright frames). When the frame is treated as a bright frame (or when the frames are treated as bright frames), one or more slopes in one or more portions of the adjusted mapping function may be increased in the largest underrepresented segments of the perceptually scaled input luminance values that are darker than (that is, to the left-hand side in FIG. 5 and in FIG. 6) the largest segments of the perceptually scaled input luminance values. Reassigning display-relative perceptually scaled output luminance values in a bright frame (or frames) to portions of the adjusted mapping function in the largest underrepresented segments of the perceptually scaled input luminance values that are darker than the largest segments of the perceptually scaled input luminance values may also maintain overall brightness and contrast of the frame (or frames) and may therefore also preserve artistic intent in such bright frames.

In other words, in some embodiments, if the average brightness of the perceptually scaled input luminance values in the perceptually scaled input luminance values store 138 is above a second threshold, then the adjusted mapping function may be further adjusted by increasing the respective slope or slopes of at least one portion of the adjusted mapping function for at least one underrepresented segment of the of the distribution of the perceptually scaled input luminance values that is darker than one or more of the largest segments of the distribution of the perceptually scaled input luminance values.

The embodiment described above includes first and second thresholds, but alternative embodiments may apply more or fewer thresholds.

In the embodiment shown, the frame is a bright frame. Further, in the embodiment shown, the portion 152 transforms perceptually scaled input luminance values in the range 181 to display-relative perceptually scaled output luminance values in the range 180, which is smaller than the range 181. Therefore, in the embodiment shown, the portion 152 transforms an underrepresented segment of the perceptually scaled input luminance values. Further, in the embodiment shown, the portion 152 transforms perceptually scaled input luminance values that are darker (that is, to the left-hand side in FIG. 5 and in FIG. 6) than the largest segments of the perceptually scaled input luminance values. Therefore, in the embodiment shown, the slope of the portion 152 (and the slopes of some other portions of the initial mapping function 150) may be increased. As a result, referring to FIG. 17, when the slope of the portion 152 is increased, the portion 152 maps perceptually scaled input luminance values to a range of display-relative perceptually scaled output luminance values shown generally at 204 that is larger than the range of display-relative perceptually scaled output luminance values 200. Likewise, other ranges of display-relative perceptually scaled output luminance values shown generally at 206, 208, and 210 in FIG. 17 are also larger than respective ranges of display-relative perceptually scaled output luminance values shown in FIG. 15 before slopes of portions of the initial mapping function 150 were increased.

As slopes of some portions of the initial mapping function 150 are increased, slopes of some portions of the initial mapping function 150 may remain unchanged. For example, the slope of the portion 152 remains unchanged, so the portion 154 maps perceptually scaled input luminance values to a range of display-relative perceptually scaled output luminance values shown generally at 214 that is the same size as the range 194 (but shifted relative to the range 194 as a result of increasing slopes of other portions of the initial mapping function 150), the portion 186 maps perceptually scaled input luminance values to a range of display-relative perceptually scaled output luminance values shown generally at 216 that is the same size as the range 196 (but also shifted relative to the range 196 as a result of increasing slopes of other portions of the initial mapping function 150), and the portion 190 maps perceptually scaled input luminance values to a range of display-relative perceptually scaled output luminance values shown generally at 218 that is the same size as the range 198 (but also shifted relative to the range 198 as a result of increasing slopes of other portions of the initial mapping function 150).

Figure 17:
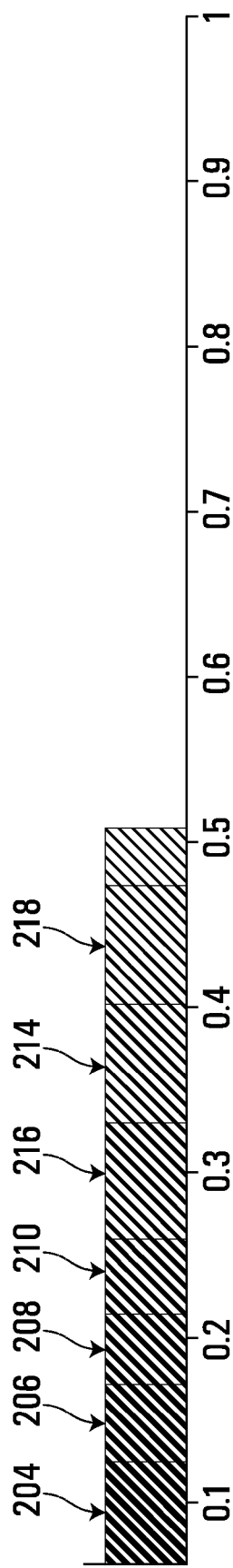
FIG. 17 illustrates display-relative perceptually scaled output luminance values transformed from the simulated or expected displayed luminance values of FIG. 12 according to the initial mapping function of FIG. 6 adjusted to reduce noise and further adjusted to expand the overall range of the display-relative perceptually scaled output luminance values.

As a result of increasing slopes of portions of the initial mapping function 150 as described above, the ranges of display-relative perceptually scaled output luminance values shown in FIG. 17 collectively range from about 0.0623 to about 0.5081 and therefore eliminate the unused range 202 and extend throughout output range of luminance values of SDR. As a result, such increases of slopes of portions of the initial mapping function 150 may increase global contrast of the display-relative perceptually scaled output luminance values and may retain the original artistic intent of the frame.

Therefore, in general, the embodiment shown may expand the overall range of the display-relative perceptually scaled output luminance values by reassigning display-relative perceptually scaled output luminance values to underrepresented segments of the perceptually scaled input luminance values, and the display-relative perceptually scaled output luminance values may be reassigned to large underrepresented segments of the perceptually scaled input luminance values that are identified according to how the perceptually scaled input luminance values in the ranges of perceptually scaled input luminance values associated with the segments relate to an average brightness of the frame or frames (such as geometric mean brightness of the frame or frames, for example). In general, such reassignment of display-relative perceptually scaled output luminance values may relatively efficiently preserve global contrast of the frame (or frames) while maintaining artistic intent and a natural appearance of the frame (or frames).

Adjustments to the initial mapping function 150 as described above result in a further-adjusted mapping function 220 as shown in FIG. 16. Like the initial mapping function 150, the further-adjusted mapping function 220 is a piece-wise linear function having a respective slope in each of the segments of the perceptually scaled input luminance values in the perceptually scaled input luminance values store 138 as described above, and is a continuous function. For example, the further-adjusted mapping function 220 includes a portion 222 in the same range of perceptually scaled input luminance values as the portion 152, a portion 224 in the same range of perceptually scaled input luminance values as the portion 154, a portion 226 in the same range of perceptually scaled input luminance values as the portion 186, and a portion 228 in the same range of perceptually scaled input luminance values as the portion 190. Following the adjustments as described above, the slope of the portion 222 is greater than the slope of the portion 152, the slope of the portion 224 is less than the slope of the portion 154, the slope of the portion 226 is less than the slope of the portion 186, and the slope of the portion 228 is less than the slope of the portion 190. Again, the adjusted mapping function in alternative embodiments may differ. For example, the adjusted mapping function in alternative embodiments may not be a piece-wise linear function, may not be continuous, or both.

As shown in FIG. 16, the further-adjusted mapping function 220 in the embodiment shown is also scaled to map perceptually scaled input luminance values in a range from about 0.0151 to 1 into respective perceptually scaled output luminance values in a range from about 0.0623 to about 0.5081, which is responsive to the dynamic range of the display device 102. Therefore, the identification of the mapping function may be responsive to characteristics of a display device, as shown at 199 in FIG. 3.

Figure 18:
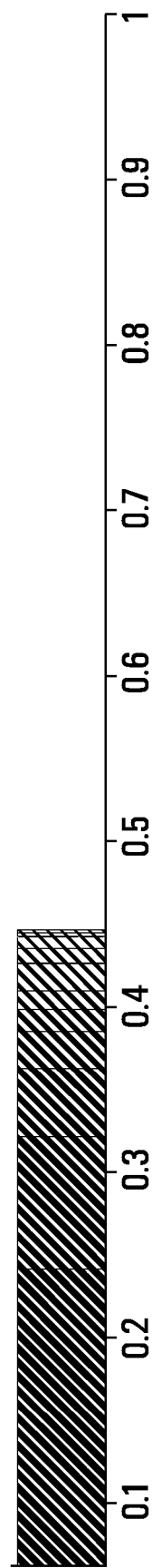
FIG. 18 illustrates display-relative perceptually scaled output luminance values according to an initial mapping function according to another embodiment.
Figure 19:
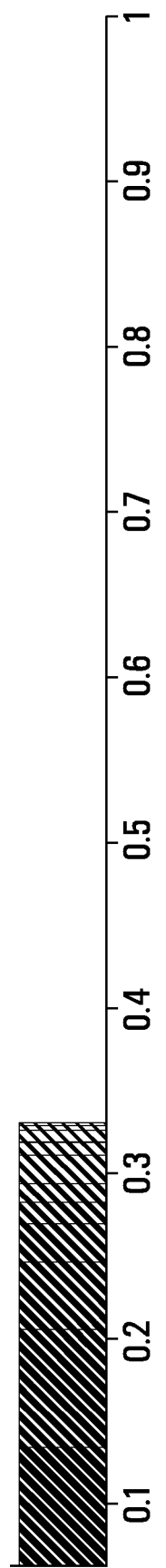
FIG. 19 illustrates display-relative perceptually scaled output luminance values according the initial mapping function of FIG. 18 adjusted to reduce noise.
Figure 20:
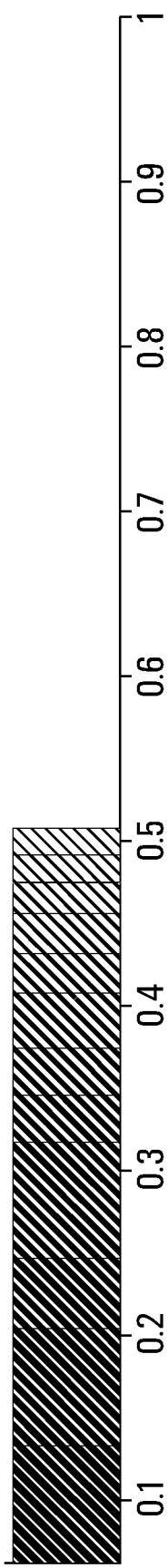
FIG. 20 illustrates display-relative perceptually scaled output luminance values according to the initial mapping function of FIG. 18 adjusted to reduce noise and further adjusted to expand the overall range of the display-relative perceptually scaled output luminance values.

As indicated above, the embodiment shown from FIG. 5 to FIG. 17 is a bright frame. However, for illustration, FIG. 18 illustrates display-relative perceptually scaled output luminance values according to an initial mapping function of perceptually scaled input luminance values of a dark frame. FIG. 19 illustrates display-relative perceptually scaled output luminance values according to the initial mapping function of FIG. 18 adjusted to reduce noise as described above. FIG. 20 illustrates display-relative perceptually scaled output luminance values according to the initial mapping function of FIG. 18 further adjusted to expand the overall range of the display-relative perceptually scaled output luminance values as described above.

Figure 21:
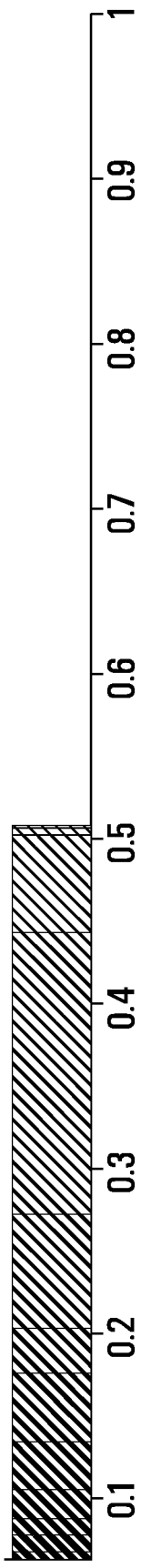
FIG. 21 illustrates display-relative perceptually scaled output luminance values according to an initial mapping function according to another embodiment.
Figure 22:
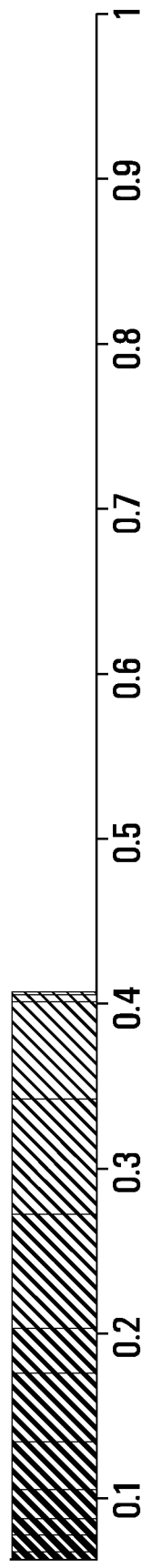
FIG. 22 illustrates display-relative perceptually scaled output luminance values according to the initial mapping function of FIG. 21 adjusted to reduce noise.
Figure 23:
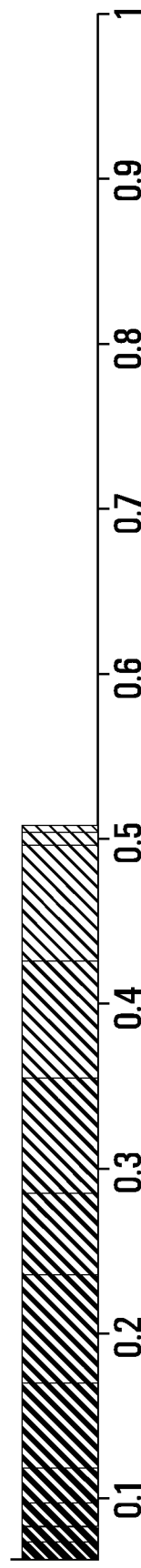
FIG. 23 illustrates display-relative perceptually scaled output luminance values according to the initial mapping function of FIG. 21 adjusted to reduce noise and further adjusted to expand the overall range of the display-relative perceptually scaled output luminance values.

For further illustration, FIG. 21 illustrates display-relative perceptually scaled output luminance values according to an initial mapping function of perceptually scaled input luminance values of an intermediate frame. FIG. 22 illustrates display-relative perceptually scaled output luminance values according to the initial mapping function of FIG. 21 adjusted to reduce noise as described above. FIG. 23 illustrates display-relative perceptually scaled output luminance values according to the initial mapping function of FIG. 21 further adjusted to expand the overall range of the display-relative perceptually scaled output luminance values as described above.

For clarity, the foregoing examples involve first determining an initial mapping function and then adjusting the initial mapping function. However, in some embodiments, adjusted mapping functions may be determined without necessarily first determining an initial mapping function and then adjusting the initial mapping function. Rather, in some embodiments, mapping functions may be defined in various different ways (for example, by various different parameters and calculations) that define transformations such as those described herein, for example, and mapping functions may be identified or adjusted in various different ways that do not necessarily involve first determining an initial mapping function and then adjusting the initial mapping function.

As indicated above, the tone mapping program codes 132 may be executed once for a respective single frame of video or for more than one frame represented by the one or more input signals received at the input signal interface 110 from the signal source 112. However, in some cases, the adjusted mapping function of one or more frames may differ sufficiently from the adjusted mapping function of one or more preceding frames to introduce flicker between the frames.

In general, if an average variation, an average variance, or another statistical metric (such as a geometric mean variation according to Equation 1, for example) of perceptually scaled input luminance values between immediately successive sets of one or more frames is less than a threshold (such as about eight 10-bit PQ codewords, for example), then a scene change between the sets of one or more frames is unlikely, and the adjusted mapping function may be filtered accordingly to reduce flickering.

Therefore, referring back to FIG. 4, after block 192, the tone mapping program codes 132 may continue at block 230, which includes codes that, when executed by the microprocessor 118, cause the processor circuit 116 to determine whether an average variation, an average variance, or another statistical metric (the geometric mean variation in the embodiment shown, although alternative embodiments may differ) of perceptually scaled input luminance values between immediately successive sets of one or more frames is less than a threshold (eight 10-bit PQ codewords in the embodiment shown, although alternative embodiments may differ).

If at block 230 the average variation, the average variance, or the other statistical metric of perceptually scaled input luminance values between immediately successive sets of one or more frames is less than the threshold, then the tone mapping program codes 132 may continue at block 232, which includes codes that, when executed by the microprocessor 118, cause the processor circuit 116 to filter the adjusted mapping function defined by codes in the mapping function store 148 and to store codes defining the filtered adjusted mapping function in the mapping function store 148. In the embodiment shown, if the geometric mean variation of perceptually scaled input luminance values between immediately successive sets of one or more frames is less than eight 10-bit PQ codewords, then the codes at block 232 cause the processor circuit 116 to apply a temporal 7-tap low pass infinite impulse response ("IIR") filter with a cut-off frequency of 0.5 Hertz ("Hz") or more generally a cut-off frequency below a detection threshold of temporal changes for human observers. However, filters in alternative embodiments may differ.

In general, if an average variation, an average variance, or another statistical metric (such as a geometric mean variation, for example) of perceptually scaled input luminance values between immediately successive sets of one or more frames is at least a threshold (such as at least about 28 10-bit PQ codewords, for example), then a scene change between the sets of one or more frames is likely, and filtering the adjusted mapping function to reduce flickering is likely unnecessary.

However, in general, if an average variation, an average variance, or another statistical metric (such as a geometric mean variation, for example) of perceptually scaled input luminance values between immediately successive sets of one or more frames is within a range (such as between about eight 10-bit PQ codewords and about 28 10-bit PQ codewords, for example), then the average variation, the average variance, or the other statistical metric may be due to a scene change, motion, content post processing in the video represented by the one or more input signals received at the input signal interface 110 from the signal source 112, or grading in the video represented by the one or more input signals received at the input signal interface 110 from the signal source 112, for example. Therefore, when the average variation, the average variance, or the other statistical metric (such as a geometric mean variation, for example) of perceptually scaled input luminance values between immediately successive sets of one or more frames is within such a range, the adjusted mapping function may be filtered accordingly to reduce flickering, but the filter may have a lower filter order, a larger cutoff frequency, or both a lower filter order and a larger cutoff frequency than the filter applied when a scene change between the sets of one or more frames is unlikely (such as the filter applied at block 232, for example). Such a lower filter order, larger cutoff frequency, or both may be a trade-off between avoiding to significantly smooth scene changes while reducing an amount of noticeable flickering caused by other sources of brightness variations.

Therefore, if at block 230 the average variation, the average variance, or the other statistical metric of perceptually scaled input luminance values between immediately successive sets of one or more frames is at least the threshold, then the tone mapping program codes 132 may continue at block 234, which includes codes that, when executed by the microprocessor 118, cause the processor circuit 116 to determine whether the average variation, the average variance, or the other statistical metric (the geometric mean variation in the embodiment shown, although alternative embodiments may differ) of perceptually scaled input luminance values between immediately successive sets of one or more frames is within a range (at least eight 10-bit PQ codewords and less than 28 10-bit PQ codewords in the embodiment shown, although alternative embodiments may differ).

If at block 234 the average variation, the average variance, or the other statistical metric of perceptually scaled input luminance values between immediately successive sets of one or more frames is within the range, then the tone mapping program codes 132 may continue at block 236, which includes codes that, when executed by the microprocessor 118, cause the processor circuit 116 to filter the adjusted mapping function defined by codes in the mapping function store 148 and to store codes defining the filtered adjusted mapping function in the mapping function store 148. In the embodiment shown, if the geometric mean variation of perceptually scaled input luminance values between immediately successive sets of one or more frames is at least eight 10-bit PQ codewords and less than 28 10-bit PQ codewords, then the codes at block 236 cause the processor circuit 116 to apply a temporal 3-tap low pass UR filter with a cut-off frequency of 2 Hz. As indicated above, the 3-tap low pass UR filter applied at block 236 has a lower filter order than the 7-tap low pass IIR filter applied at block 232.

In general, the codes at blocks 230 and 234 may detect visual discontinuity artifacts introduced by tone mapping, and the codes at blocks 232 and 236 may absorb such visual discontinuity artifacts (as shown at 237 in FIG. 3) by smoothing brightness differences caused by different successive adjusted mapping functions, for example according to a temporal low-pass filter such as those described herein.

Further, if at block 230 the average variation, the average variance, or the other statistical metric of perceptually scaled input luminance values between immediately successive sets of one or more frames is at least the threshold, and if at block 234 the average variation, the average variance, or the other statistical metric of perceptually scaled input luminance values between immediately successive sets of one or more frames is not within the range, then the codes at blocks 230 and 234 may have effectively detected a scene change, in which case the adjusted mapping function remains unchanged to preserve the scene change.

After block 232, after block 236, or if at block 234 the average variation, the average variance, or the other statistical metric of perceptually scaled input luminance values between immediately successive sets of one or more frames is not within the range, the tone mapping program codes 132 may continue at block 238, which includes codes that, when executed by the microprocessor 118, cause the processor circuit 116 to transform the perceptually scaled input luminance values in the perceptually scaled input luminance values store 138 into respective perceptually scaled output luminance values according to the mapping function defined by codes in the mapping function store 148 (as adjusted and possibly filtered as described above), and to store the perceptually scaled output luminance values in a perceptually scaled output luminance values store 240 (shown in FIG. 2) in the storage memory 122.

After block 238, the tone mapping program codes 132 may continue at block 242, which includes codes that, when executed by the microprocessor 118, cause the processor circuit 116 to transform (by applying a PQ transform function as shown at 243 in FIG. 3, for example) the perceptually scaled output luminance values in the perceptually scaled output luminance values store 240 into respective output luminance values, and to store the output luminance values in an output luminance values store 244 (shown in FIG. 2) in the storage memory 122. The tone mapping program codes 132 may then end.

As indicated above, the initial mapping function 150 is responsive to a perceptually scaled distribution of the input luminance values in the input luminance values store 130 because the initial mapping function 150 transforms relatively large segments of perceptually scaled input luminance values to relatively large ranges of perceptually scaled output luminance values, and therefore may prioritize ranges of perceptually scaled output luminance values that are transformed from input luminance values in ranges that are particularly important to the human visual system in one or more particular frames. Even after adjustment and any filtering as described above, the mapping function defined by codes in the mapping function store 148 still transforms input luminance values in ranges that (according to a perceptually scaled distribution of the input luminance values) include a relatively large number of pixels and are therefore particularly important to the human visual system into ranges of perceptually scaled output luminance values that are larger than ranges of perceptually scaled output luminance values that are transformed from input luminance values in ranges that (according to a perceptually scaled distribution of the input luminance values) include a relatively small number of pixels and are therefore not as important to the human visual system. Therefore, after adjustment and any filtering as described above, the mapping function defined by codes in the mapping function store 148 is still responsive to a perceptually scaled distribution of the input luminance values in the input luminance values store 130.

After tone mapping, the processor circuit 116 may then produce one or more output signals representing the output luminance values in the output luminance values store 244. Therefore, the program memory 120 may also include output signal production codes 246 that, when executed by the microprocessor 118, cause the processor circuit 116 to cause the output signal interface 114 to produce one or more output signals representing at least the output luminance values in the output luminance values store 244 (and, in some embodiments, representing other video information such as color, sound, or both color and sound) and to transmit the one or more output signals to the input signal interface 106. The output signal production codes 246 may cause the processor circuit 116 to apply normalization (shown at 249 in FIG. 3), color restoration (shown at 251 in FIG. 3), and gamma decoding (such as BT.1886 gamma decoding or inverse BT.1886 gamma encoding shown at 253 in FIG. 3, for example) to produce the one or more output signals (shown at 255 in FIG. 3).

The embodiment shown involves color restoration (shown at 251 in FIG. 3) after the PQ transform function (shown at 243 in FIG. 3). As a result, in the embodiment shown, color restoration is in a physical-intensity domain and may involve, for pixels of the one or more output signals (shown at 255 in FIG. 3), determining a red output signal component $R_O$, a green output signal component $G_O$, and a blue output signal component $B_O$ according to $$R_O = \frac{L_O}{L_I} R_I,$$

$$G_O = \frac{L_O}{L_I} G_I, \text{ and}$$

$$B_O = \frac{L_O}{L_I} B_I,$$

where $R_I$, $G_I$, and $B_I$ are red, green, and blue components respectively of the pixel in the one or more input signals (as shown at 127 in FIG. 3) received at the input signal interface 110 from the signal source 112, $L_I$ is the input luminance value of the pixel identified (as shown at 129 in FIG. 3) in response to the one or more input signals received at the input signal interface 110 from the signal source 112, and $L_O$ is the output luminance value of the pixel following the transform at block 242 (shown at 243 in FIG. 3) and following normalization (shown at 249 in FIG. 3).

Alternative embodiments may involve different color spaces. For example, in a YCbCr color space, color restoration in a physical-intensity domain may involve, for pixels of the one or more output signals (shown at 255 in FIG. 3), determining an output signal component $C_{b,O}$ of a blue-difference component and an output signal component $C_{r,O}$ of a red-difference component according to $$C_{b,O} = \frac{L_O}{L_I} C_{b,I} \text{ and}$$

$$C_{r,O} = \frac{L_O}{L_I} C_{r,I}.$$

Still other embodiments may involve other color spaces.

Further, in alternative embodiments, color restoration may be in a perceptual domain. In such embodiments, color restoration may involve, for pixels of the one or more output signals (shown at 255 in FIG. 3), determining a red perceptual-domain output signal component $R_O'$, a green perceptual-domain output signal component $G_O'$, and a blue perceptual-domain output signal component $B_O'$ according to $$R_O' = \frac{L_{PO}}{L_{PI}} R_I',$$

$$G_O' = \frac{L_{PO}}{L_{PI}} G_I', \text{ and}$$

$$B_O' = \frac{L_{PO}}{L_{PI}} B_I',$$

where $R_I'$, $G_I'$, and $B_I'$ are red, green, and blue components respectively of the pixel in the one or more input signals (as shown at 127 in FIG. 3) received at the input signal interface 110 from the signal source 112 but transformed into the perceptual domain, $L_{PI}$ is the perceptually scaled input luminance value of the pixel identified at block 136 (as shown at 137 in FIG. 3), and $L_{PO}$ is the output luminance value of the pixel following the transform at block 238 (shown as the luminance value before 243 in FIG. 3). The perceptual-domain output signal components $R_O'$, $G_O'$, $B_O'$ may then be transformed to output signal components $R_O$, $G_O$, and $B_O$ for pixels of the one or more output signals (shown at 255 in FIG. 3) in a transformation such as the transformation described above in block 242 or as shown at 243 in FIG. 3, for example.

Again, alternative embodiments may involve different color spaces.

In other words, in some embodiments, color restoration may be in a physical-intensity domain in which output color values (such as $R_O$, $G_O$, $B_O$, $C_{b,O}$ or $C_{r,O}$, for example) may be identified according to input color values (such as $R_I$, $G_I$, $B_I$, $C_{b,I}$ or $C_{r,I}$, for example) and according to $$\frac{L_O}{L_I},$$

namely according to ratio of a physical output luminance value to a physical input luminance value. Alternatively, in some embodiments, color restoration may be in a perceptual domain in which output color values (such as $R_O'$, $G_O'$, or $B_O'$, for example) may be identified according to input color values (such as $R_I'$, $G_I'$, or $B_I'$, for example) and according to $$\frac{L_{PO}}{L_{PI}},$$

namely according to ratio of a perceptually scaled output luminance value to a perceptually scaled input luminance value.

In the embodiment shown, color restoration involves multiplying input color components by $$\frac{L_O}{L_I}$$

or by $$\frac{L_{PO}}{L_{PI}},$$

but in alternative embodiments, color restoration may be according to such ratios in other ways. For example, color restoration in alternative embodiments may include factors in addition to $$\frac{L_O}{L_I} \text{ or } \frac{L_{PO}}{L_{PI}},$$

or may involve modifications of $$\frac{L_O}{L_I} \text{ or } \frac{L_{PO}}{L_{PI}}.$$

As a result, the one or more output signals produced by the output signal production codes 246 represent the output luminance values in the output luminance values store 244 but do not necessarily encode the output luminance values in the output luminance values store 244 directly. Rather, the output luminance values in the output luminance values store 244 may be represented in the one or more output signals by other encoding, such as encoding of intensities of additive colors such as red, green, and blue or of intensities in other color spaces, for example, and such intensities of such additive colors may represent the output luminance values in the output luminance values store 244. Therefore, the one or more output signals produced by the output signal production codes 246 may represent the output luminance values in the output luminance values store 244 without necessarily encoding output luminance values directly.

The embodiments shown in FIG. 1 to FIG. 23 are examples only, and alternative embodiments may differ. For example, alternative embodiments may differ from a set-top box, and in some embodiments, a camera, one or more video editing devices, or one or more other devices may embody tone mapping as described herein. Further, alternative embodiments may involve tone mapping of different input signals that may not necessarily be signals of HDR video. As another example, output signals of alternative embodiments may not necessarily be signals of SDR video. In general, tone mapping as described above may be applied to various different embodiments in which an input range of luminance values is larger than an output range of luminance values.

Figure 24:
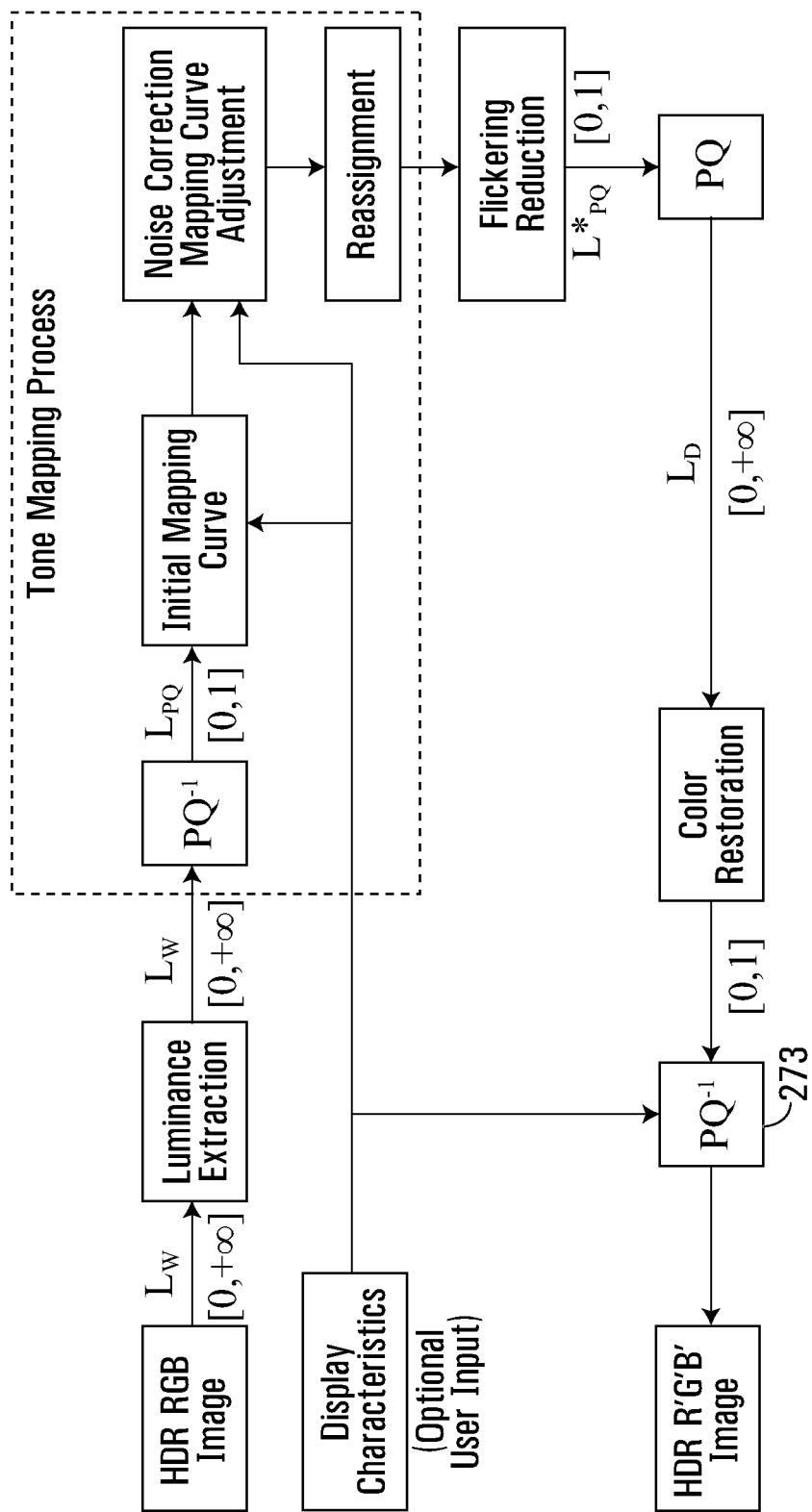
FIG. 24 illustrates operation of a processor circuit according to another embodiment.

For example, FIG. 24 illustrates operation of a processor circuit according to another embodiment. The embodiment of FIG. 24 is similar to the embodiment of FIG. 3, except that tone mapping in the embodiment of FIG. 24 transforms input luminance values in a first HDR range of luminance values into respective output luminance values in a second HDR range of luminance values smaller than the first HDR range of luminance values. For example, in the embodiment of FIG. 24, the first HDR range of the input luminance values may be from 0.005 nits to 10,000 nits, and the second HDR range of the output luminance values may be from 0.01 nits to 4,000 nits, although alternative embodiments may differ.

In the embodiment of FIG. 24, the input luminance values and the output luminance values are both in HDR ranges, so luminance values do not have to be converted between HDR and SDR values as described above. Further, when the input luminance values and the output luminance values are both in HDR ranges, simulation of how luminance values will actually be displayed may be omitted, and normalization (shown at 249 in FIG. 3) may be omitted. Further, gamma decoding (shown at 253 in FIG. 3) may be replaced with a transformation to perceptually scaled luminance values (such as an inverse PQ transform function, for example) as shown at 273 in FIG. 24.

In general, as FIG. 24 illustrates in just one example, tone mapping as described above is not limited to the types of input and output signals as described above, and is not limited to the ranges of input and output luminance values as described above. Rather, tone mapping as described above may be applied in various different embodiments having different types of input signals, different types of output signals, different ranges of input luminance values, different ranges of output luminance values, or different color spaces, or two or more thereof. In such different embodiments, the input signal processing program codes 126 may be adapted for different types of input signals or different color spaces, the output signal production codes 246 may be adapted for different types of output signals or different color spaces, and functions such as those described above may be adapted for different ranges of input and output luminance values.

Figure 25:
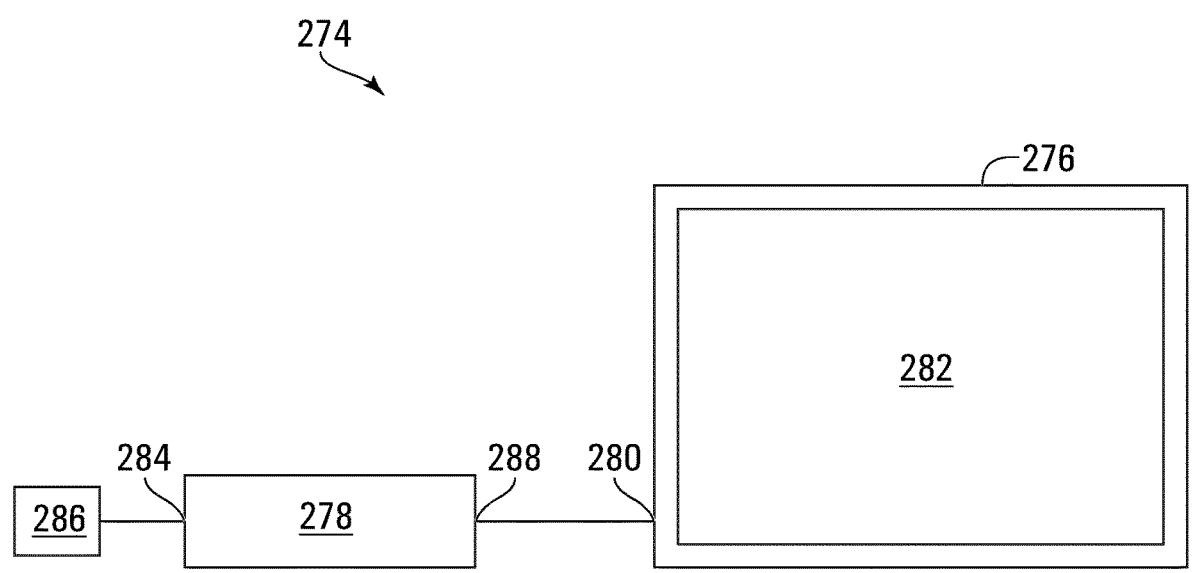
FIG. 25 illustrates a display system according to another embodiment.

Referring to FIG. 25, a display system according to another embodiment is shown generally at 274 and includes a display device 276 and a set-top box 278. In the embodiment shown, the display device 276 is a television including an input signal interface 280 and a display screen 282. In general, the display device 276 is configured to cause the display screen 282 to display images according to input signals received at the input signal interface 280. However, alternative embodiments may vary. For example, alternative embodiments may include one or more display devices that may differ from the display device 276 and that may include a projector, for example. Further, although the display device 276 and the set-top box 278 are separate devices in the embodiment shown, alternative embodiments may vary. For example, in alternative embodiments, the display device 276 and the set-top box 278 may be integrated into one device, or alternative embodiments may include one, two, or more than two devices that may function as described herein.

The set-top box 278 includes an input signal interface 284 that may receive one or more input signals from a signal source 286 from a television programming broadcasting or distribution service, for example. Further, the set-top box 278 includes an output signal interface 288 that may produce one or more output signals and transmit the one or more output signals to the input signal interface 280. In the embodiment shown, the one or more signals may be transmitted through one or more wires from the signal source 286 to the input signal interface 284 and from the output signal interface 288 to the input signal interface 280. However, alternative embodiments may differ. For example, in some embodiments, the signal source 286 may transmit the one or more output signals wirelessly (by radio signals, by satellite, or otherwise). Also, in some embodiments, the output signal interface 288 may transmit signals wirelessly to the input signal interface 280.

Figure 26:
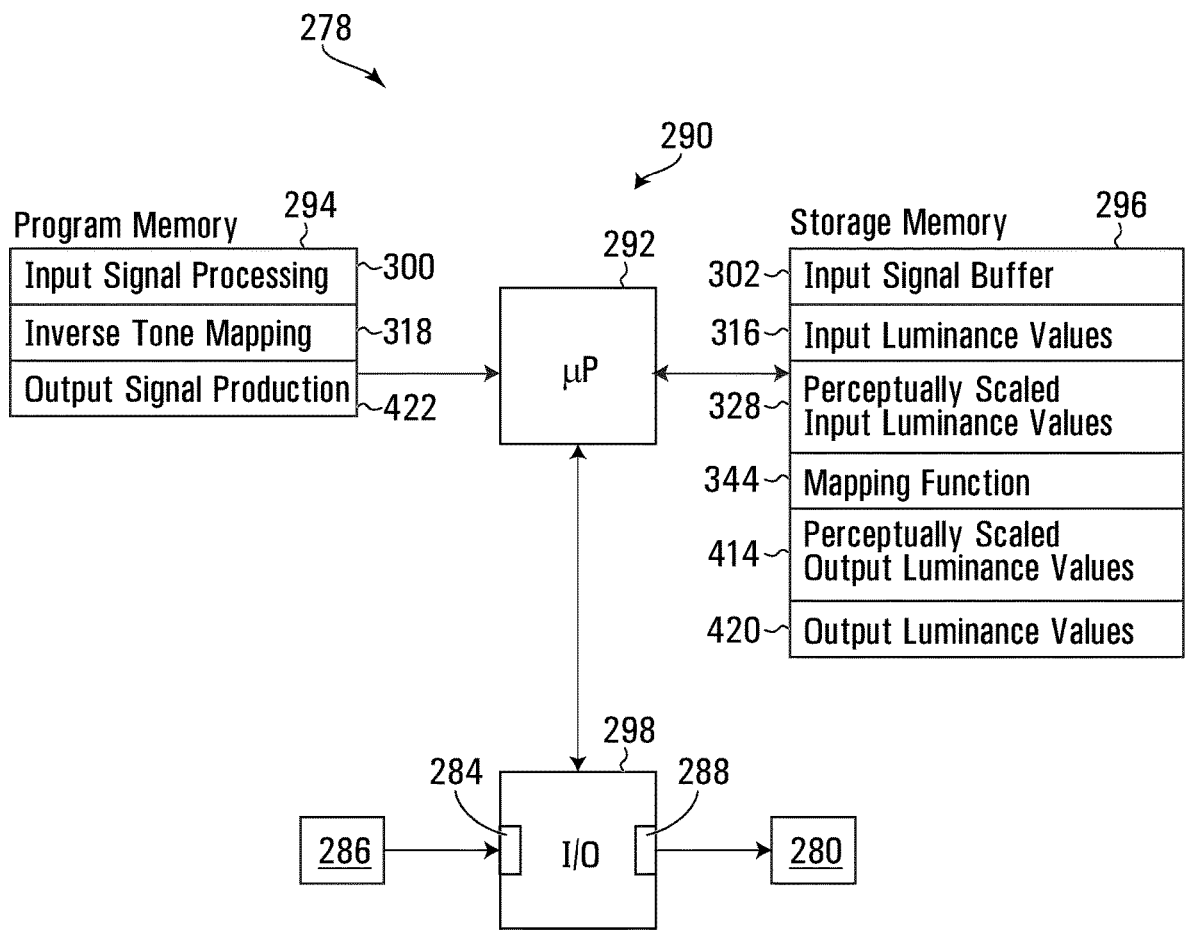
FIG. 26 illustrates a processor circuit of a set-top box of the display system of FIG. 25.

Referring to FIG. 26, the set-top box 278 includes a processor circuit shown generally at 290. The processor circuit 290 includes a microprocessor 292. The processor circuit 290 also includes a program memory 294, a storage memory 296, and an I/O interface 298, all in communication with the microprocessor 292. In general, the program memory 294 stores program codes that, when executed by the microprocessor 292, cause the processor circuit 290 to implement functions of the set-top box 278 as described herein, for example. Further, in general, the storage memory 296 includes stores for storing storage codes as described herein for example. The program memory 294 and the storage memory 298 may be implemented in one or more of the same or different computer-readable storage media, which in various embodiments may include one or more of a ROM, a RAM, a HDD, other computer-readable or computer-writable storage media, or a combination of one or more thereof, for example.

The I/O module 298 includes the input signal interface 284 and the output signal interface 288 and, in general, may include various signal interfaces, ADCs, receivers, transmitters, and/or other circuitry to receive, produce, and transmit signals as described herein, for example.

The processor circuit 290 is an example only, and set-top boxes according to other embodiments may vary. For example, in alternative embodiments, the set-top box 278 may include different hardware, different software, or both different hardware and different software. Further, alternative embodiments may include more than one microprocessor or one or more alternatives to the processor circuit 290. For example, alternative embodiments may include discrete logic circuits, an FPGA, a graphics processor, or an ASIC, or combinations of two or more thereof. In such alternative embodiments, functions of the program codes in the program memory 294 may be implemented in such circuitry or in other circuitry, for example.

In the embodiment shown, the signal source 286 transmits one or more video signals representing video frames in SDR, but the display device 276 is capable of displaying video on the display screen 282 in HDR. Therefore, functions of the set-top box 278 in the embodiment shown include inverse tone mapping so that the one or more output signals produced by the output signal interface 288 and transmitted to the input signal interface 280 represent, at least, output luminance values in an output range of luminance values that is larger than an input range of luminance values represented by the one or more input signals received at the input signal interface 284 from the signal source 286.

Figure 27:
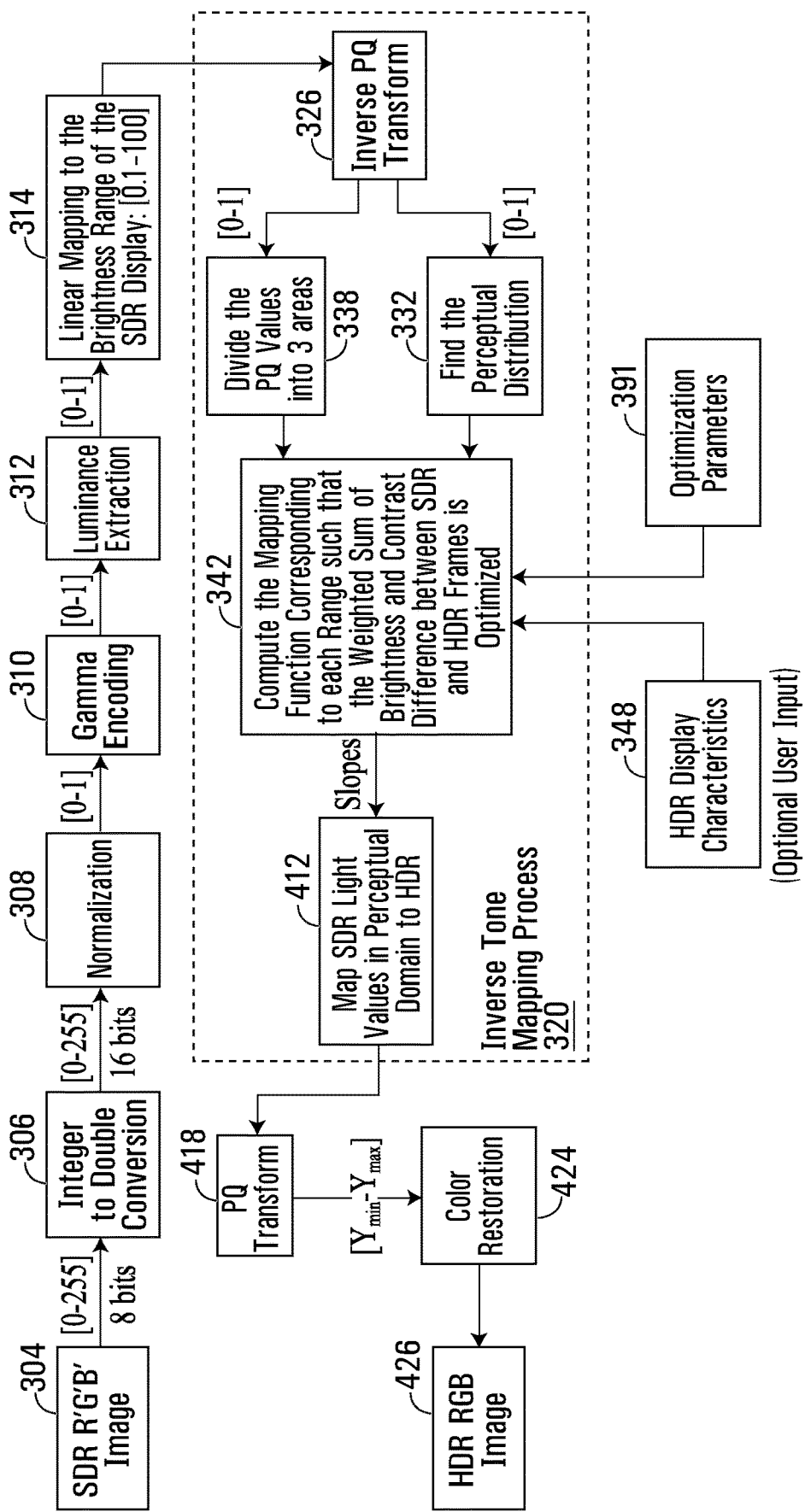
FIG. 27 illustrates operation of the processor circuit of FIG. 26.

FIG. 27 is an illustration of operation of the processor circuit 290, although alternative embodiments may differ.

As shown in FIG. 26, the program memory 294 may include input signal processing program codes 300 that, when executed by the microprocessor 292, cause the processor circuit 290 to receive, at the input signal interface 284, the one or more input signals from the signal source 286. In general, the input signal processing program codes 300 cause the processor circuit 290 to manage an input signal buffer 302 in the storage memory 296 to buffer data representing pixels of sequential frames of video represented by the one or more input signals received at the input signal interface 284 from the signal source 286. An example of such a frame of video is shown at 304 in FIG. 27. In the example of FIG. 27, the frame of video 304 is a frame of SDR video in an RGB color space, although alternative embodiments may differ. For example, in alternative embodiments, the frame of video 304 may not necessarily be SDR, may include a different color space (such as a YUV color space or an ICtCp color space, for example), or both.

As shown in FIG. 27, the one or more input signals received at the input signal interface 284 from the signal source 286 may encode frames of video in eight-bit integers having values ranging from 0 to 255, and the eight-bit values ranging from 0 to 255 may be transformed (as shown at 306 in FIG. 27) into respective 16-bit values ranging from 0 to 255, the 16-bit values may be normalized (as shown at 308 in FIG. 27) into respective normalized values ranging from 0 to 1, the normalized values may be gamma encoded (as shown at 310 in FIG. 27) into respective gamma-encoded values, luminance values ranging from 0 to 1 may be extracted (as shown at 312 in FIG. 27) from respective gamma-encoded values, and the luminance values ranging from 0 to 1 may be transformed (as shown at 314 in FIG. 27) into respective luminance values in the input range of luminance values represented by the one or more input signals received at the input signal interface 284 from the signal source 286. In the embodiment shown, the signal source 286 transmits one or more video signals representing video frames in SDR in a range from 0.1 nits to 100 nits, so the luminance values ranging from 0 to 1 may be transformed into respective luminance values in the range from 0.1 nits to 100 nits. Luminance values of pixels of frames of the video in response to the one or more input signals received at the input signal interface 284 from the signal source 286 may be stored in an input luminance values store 316 (shown in FIG. 26) in the storage memory 296.

However, alternative embodiments may differ. For example, in alternative embodiments, the one or more input signals received at the input signal interface 284 from the signal source 286 may be encoded differently, may have a different input range of luminance values, may use a different color space, or two or more thereof. Further, alternative embodiments may include input signal processing program codes, which may extract input luminance values in other ways.

The one or more input signals received at the input signal interface 284 from the signal source 286 do not necessarily encode the input luminance values in the input luminance values store 316 directly. Rather, the input luminance values in the input luminance values store 316 may be represented in the one or more input signals received at the input signal interface 284 from the signal source 286 by other encoding, such as encoding of intensities of additive colors such as red, green, and blue or of intensities in other color spaces, for example, and the input luminance values in the input luminance values store 316 may be determined from such intensities of such additive colors. Therefore, the one or more input signals received at the input signal interface 284 from the signal source 286 may represent the input luminance values in the input luminance values store 316 without necessarily encoding the input luminance values directly.

Further, the input luminance values in the input luminance values store 316 are not necessarily identical to input luminance values represented by the one or more input signals received at the input signal interface 110 from the signal source 112. For example, input luminance values represented by the one or more input signals received at the input signal interface 284 from the signal source 286 may be filtered or otherwise processed, and the input luminance values in the input luminance values store 316 may reflect such filtering or other processing.

The input luminance values in the input luminance values store 316 may represent physical intensities of light and may therefore be described as physically linear as described above.

Figure 28:
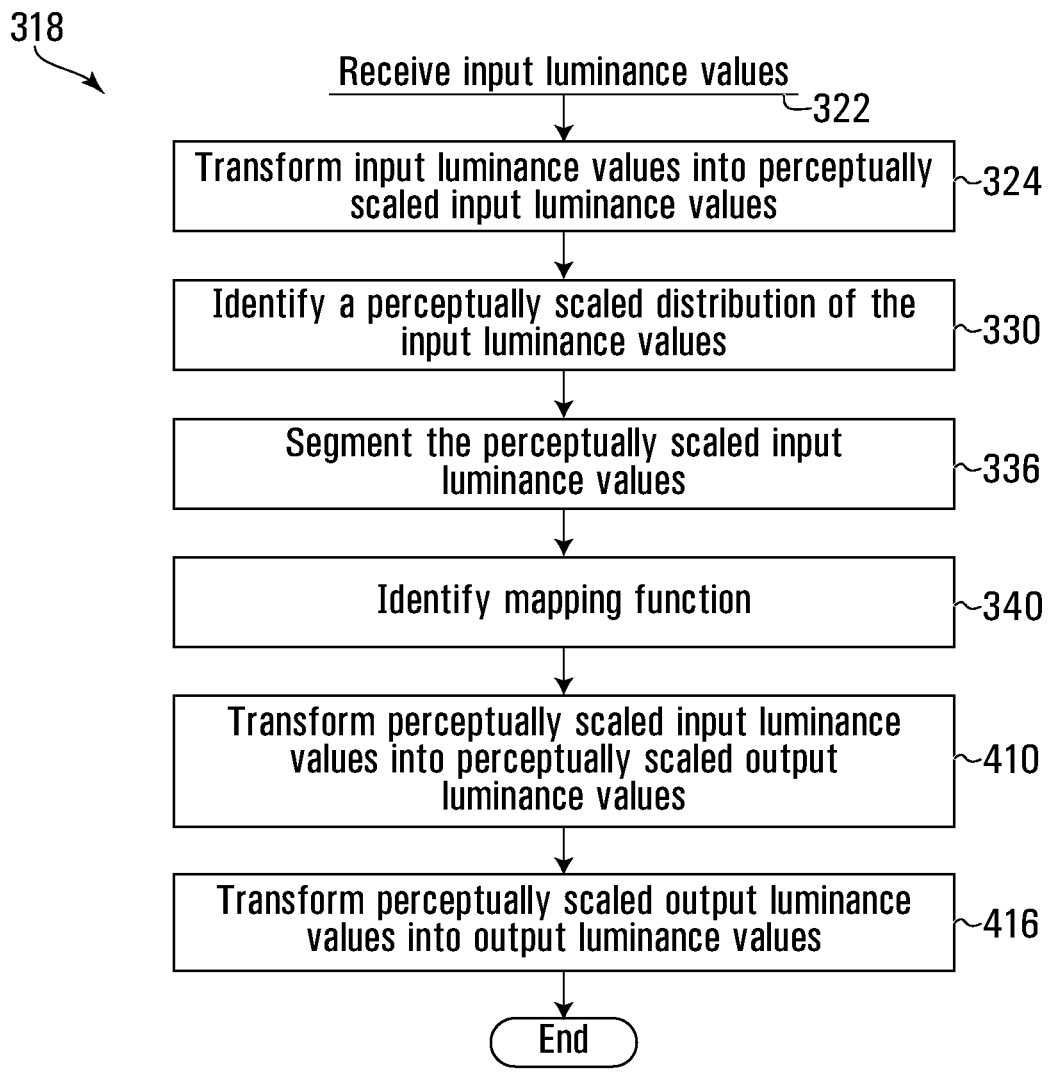
FIG. 28 illustrates inverse tone mapping program codes in a program memory in the processor circuit of FIG. 26.

As also shown in FIG. 26, the program memory 294 may also include inverse tone mapping program codes 318. Referring to FIG. 28, the inverse tone mapping program codes 318 are illustrated schematically and generally include blocks of code that, when executed by the microprocessor 292, cause the processor circuit 290 to transform (as shown at 320 in FIG. 27) the input luminance values in the input luminance values store 316 into respective output luminance values in an output range of luminance values different from the input range of luminance values. As indicated above, in the embodiment shown, the output luminance values are in an output range of luminance values of HDR, which is larger than the input range of luminance values, although alternative embodiments may differ.

In the embodiment shown, the inverse tone mapping program codes 318 may be executed once for a respective single frame of video represented by the one or more input signals received at the input signal interface 284 from the signal source 286. However, alternative embodiments may differ. For example, in some embodiments, the inverse tone mapping program codes 318 may be executed once for more than one frame, such as a plurality of successive frames, for example.

The inverse tone mapping program codes 318 begin at 322 in response to receiving the input luminance values from the input luminance values store 316 of pixels of the frame (or frames) of video. The inverse tone mapping program codes 318 may continue at block 324, which includes codes that, when executed by the microprocessor 292, cause the processor circuit 290 to transform (as shown at 326 in FIG. 27) the input luminance values from the input luminance values store 316 into respective perceptually scaled input luminance values, and to store the perceptually scaled input luminance values in a perceptually scaled input luminance values store 328 (shown in FIG. 26) in the storage memory 296. In the embodiment shown, the codes at block 324 include codes of an inverse PQ transform function as described above, although alternative embodiments may differ and may, for example, transform input luminance values into respective perceptually scaled input luminance values in one or more other ways. For example, in some embodiments, transforming input luminance values into respective perceptually scaled input luminance values may involve one or more other non-logarithmic and non-gamma perceptual transform functions.

After block 324, the inverse tone mapping program codes 318 may continue at block 330, which includes codes that, when executed by the microprocessor 292, cause the processor circuit 290 to identify a perceptually scaled distribution of the input luminance values of the frame (or frames) represented by the one or more input signals received at the input signal interface 284 from the signal source 286. In the embodiment shown, the codes at block 330 cause the processor circuit 290 to identify (as shown at 332 in FIG. 27) a distribution of the perceptually scaled input luminance values of the frame (or frames) in the perceptually scaled input luminance values store 328.

Figure 29:
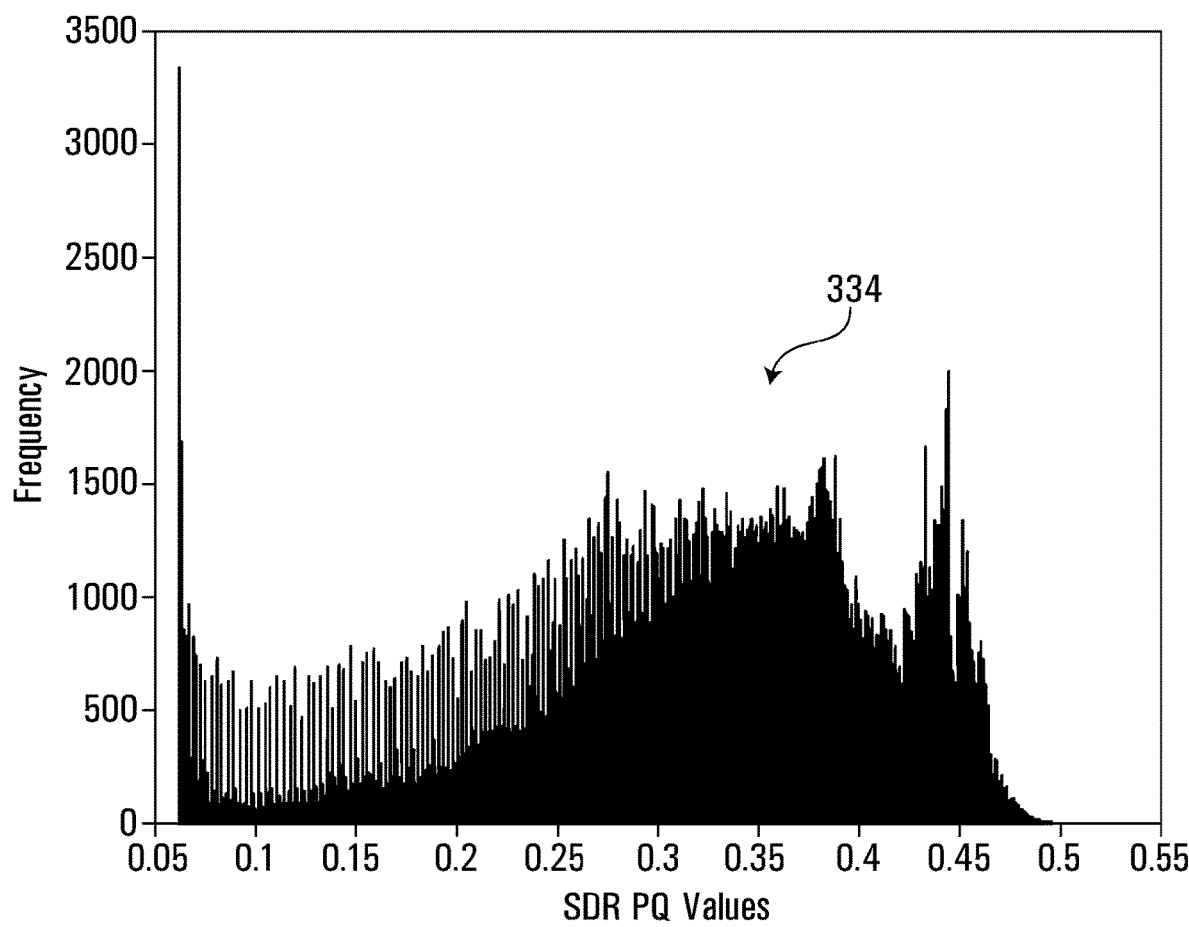
FIG. 29 illustrates a perceptually scaled distribution of a plurality of input luminance values according to one embodiment.

In one example, a histogram (or, more generally, a distribution) of the perceptually scaled input luminance values of the frame (or frames) in the perceptually scaled input luminance values store 328 is shown generally at 334 in FIG. 29. As indicated above, in the embodiment shown, the input range of luminance values range from 0.1 nits to 100 nits, and the range from 0.1 nits to 100 nits is perceptually scaled to a range of perceptually scaled input luminance values from about 0.0623 (also identified herein as $X_{min}$) to about 0.5081 (also identified herein as $X_{max}$). Therefore, as shown in FIG. 29, the perceptually scaled input luminance values in the perceptually scaled input luminance values store 328 may range from about 0.0623 to about 0.5081, although alternative embodiments may differ. In each of a plurality of the ranges of the perceptually scaled input luminance values, the histogram 334 includes a bar representing a number of pixels in the frame (or frames) having a perceptually scaled input luminance value in the range of perceptually scaled input luminance values.

In the embodiment shown, perceptually scaled luminance values are in a PQ domain, but alternative embodiments may differ. For example, alternative embodiments may identify perceptually scaled output luminance values by transforms that are not necessarily PQ, so the range of perceptually scaled output luminance values may also vary for different transforms, for example.

In general, the histogram 330 is a perceptually scaled distribution of the input luminance values of the frame (or frames) represented by the one or more input signals received at the input signal interface 284 from the signal source 286. The histogram 330 is a visual representation for illustration only, and embodiments such as those described herein do not necessarily produce any histograms or other visual representations. Further, in alternative embodiments, a perceptually scaled distribution of the input luminance values of the frame (or frames) represented by the one or more input signals received at the input signal interface 284 from the signal source 286 may be determined in other ways. In alternative embodiments, a perceptually scaled distribution of the input luminance values of the frame (or frames) may be determined in other ways.

Referring back to FIG. 28, after block 330, the inverse tone mapping program codes 318 may continue at block 336, which includes codes that, when executed by the microprocessor 292, cause the processor circuit 290 to segment (as shown at 338 in FIG. 27) the perceptually scaled input luminance values of the frame (or frames) in the perceptually scaled input luminance values store 328 into at least two segments.

In the embodiment shown, the codes block 336 cause the processor circuit 290 to segment the perceptually scaled input luminance values of the frame (or frames) in the perceptually scaled input luminance values store 328 into three segments, namely a dark segment, an intermediate segment, and a bright segment. However, alternative embodiments may include more or fewer segments. In general, such segments may relate to principal ranges of brightness as perceived by the human visual system.

Also, in the embodiment shown, the dark segment may be a segment in which perceptually scaled input luminance values in the perceptually scaled input luminance values store 328 are between about 0.0623 and about 0.1217, which are transformed from 0.1 nits and 0.5 nits respectively. Also, in the embodiment shown, the intermediate segment may be a segment in which perceptually scaled input luminance values in the perceptually scaled input luminance values store 328 are between about 0.1217 and about 0.3962, which are transformed from 0.5 nits and 30 nits respectively. Also, in the embodiment shown, the bright segment may be a segment in which perceptually scaled input luminance values in the perceptually scaled input luminance values store 328 are between about 0.3962 and about 0.5081, which are transformed from 30 nits and 100 nits respectively. However, segments in alternative embodiments may differ. For example, alternative embodiments may include two, three, or more than three segments. As another example, ranges of alternative embodiments may differ.

After block 336, the inverse tone mapping program codes 318 may continue at block 340, which includes codes that, when executed by the microprocessor 292, cause the processor circuit 290 to identify a mapping function (as shown at 342 in FIG. 27) and to store codes defining the mapping function in a mapping function store 344 (shown in FIG. 26) in the storage memory 296. In the embodiment shown, the mapping function defined by codes in the mapping function store 344 defines a transformation of perceptually scaled input luminance values in the perceptually scaled input luminance values store 328 into respective perceptually scaled output luminance values. By defining transformations of perceptually scaled luminance values, mapping functions in the embodiment shown may be defined in ranges that are more likely to be relevant to the human visual system than mapping functions that do not define transformations of perceptually scaled luminance values.

In general, the mapping function defined by codes in the mapping function store 344 may be a piece-wise linear function that is continuous, that is monotonically increasing or monotonically non-decreasing, and that has a respective portion having a respective slope in each of the segments of the perceptually scaled input luminance values identified at block 336. In general, such a piece-wise linear function may be relatively simple, may provide acceptable results (for example by providing acceptable control over mapping), and may be implemented with relatively low computational cost. However, the mapping function defined by codes in the mapping function store 344 in alternative embodiments may differ. For example, the mapping function in alternative embodiments may not be a piece-wise linear function, may not be continuous, or both. As one example, the mapping function defined by codes in the mapping function store 344 in alternative embodiments may include a polynomial function, an exponential function, or may include a combination two or more of linear, polynomial, and exponential functions, for example.

Further, the mapping function defined by codes in the mapping function store 344 may be referred to as a global tone mapping function because the mapping function defined by codes in the mapping function store 344 may be applied to all pixels in a frame (or frames), and not to any specific spatially limited regions of the pixels in one or more frames. However, alternative embodiments may differ, and mapping functions in alternative embodiments need not be global tone mapping functions but could, for example, apply local tone mapping functions to some but not all of the pixels in one or more frames.

Because the codes at block 336 cause the processor circuit 290 to identify three segments, the codes in the mapping function store 344 may define the mapping function as $$L_{PO} = \begin{cases} s_1 L_{PI} + a_1 & \text{if} \quad L_{PI} \leq X_1 \\ s_2 L_{PI} + a_2 & \text{if} \quad X_1 < L_{PI} \leq X_2 \\ s_3 L_{PI} + a_3 & \text{if} \quad L_{PI} > X_2 \end{cases} \quad \text{(Eq. 2)}$$

where $L_{PI}$ is a perceptually scaled input luminance value, $L_{PO}$ is a respective perceptually scaled output luminance value transformed according to the mapping function from $L_{PI}$, $X_1$ is a threshold between the first and second of the three segments (0.1217 in the embodiment shown, although alternative embodiments may differ), $X_2$ is a threshold between the second and third of the three segments (0.3962 in the embodiment shown, although alternative embodiments may differ), $s_1$, $s_2$, and $s_3$ are slopes of the mapping function in the first, second, and third segments respectively, and $a_1$, $a_2$, and $a_3$ are intercepts. The slopes $s_1$, $s_2$, and $s_3$ may be identified as described below, and the intercepts $a_1$, $a_2$, and $a_3$ may be identified to define a continuous function that transforms perceptually scaled input luminance values into respective perceptually scaled output luminance values in the output range of luminance values when perceptually scaled. However, the mapping function in alternative embodiments may differ. For example, the mapping function in alternative embodiments may not be a piece-wise linear function, may not be continuous, or both. Further, the mapping function in alternative embodiments may not necessarily be defined by thresholds.

Figure 30:
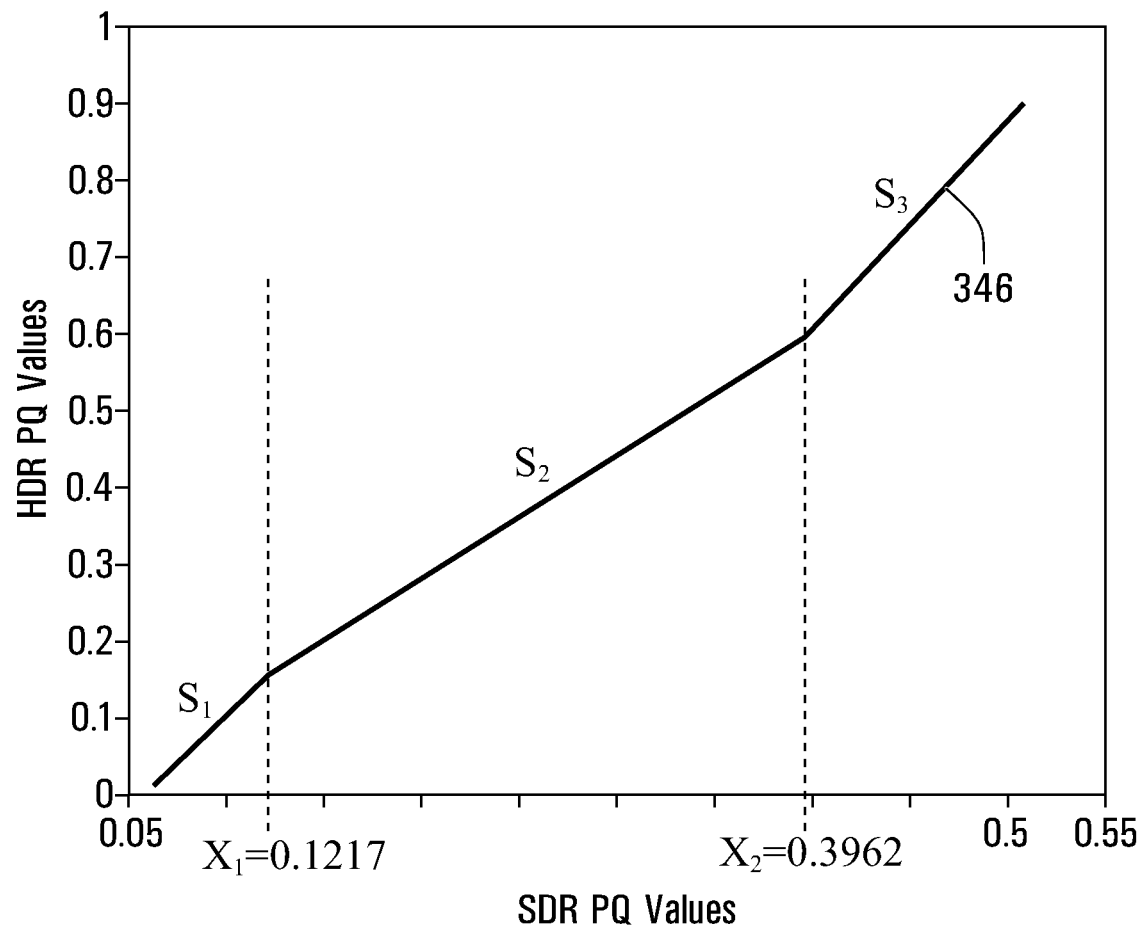
FIG. 30 illustrates an initial mapping function according to the perceptually scaled distribution of the plurality of input luminance values of FIG. 29.

An example of such a mapping function is shown at 346 in FIG. 30. As indicated above, in the embodiment shown, the output luminance values are in an output range of luminance values of HDR, and as shown in FIG. 30, the output luminance values in the embodiment shown, when perceptually scaled, range from about 0.0151 to about 0.9026. Therefore, in the embodiment shown, the slopes $s_1$, $s_2$, and $s_3$ and the intercepts $a_1$, $a_2$, and $a_3$ may be identified to define a continuous function and to cause the mapping function to define a transformation of perceptually scaled input luminance values in the perceptually scaled input luminance values store 328 into respective perceptually scaled output luminance values in the range from about 0.0151 to about 0.9026. Therefore, the identification of the mapping function may be responsive to characteristics of a display device (such as the dynamic range of the display device, which determines the output range of luminance values in the embodiment shown) as shown at 348 in FIG. 27. However, alternative embodiments may differ and may, for example, include a different range of respective perceptually scaled input luminance values, a different range of respective perceptually scaled output luminance values, or both. Also, as indicated above, the mapping function in alternative embodiments may not be a piece-wise linear function, may not be continuous, or both.

In the embodiment shown, the slopes $s_1$, $s_2$, and $s_3$ and the intercepts $a_1$, $a_2$, and $a_3$ may be identified to maximize a contrast difference between the perceptually scaled input luminance values and the perceptually scaled output luminance values, to maximize a brightness difference between the perceptually scaled input luminance values and the perceptually scaled output luminance values, or to maximize a weighted sum of a contrast difference and a brightness difference between the perceptually scaled input luminance values and the perceptually scaled output luminance values.

According to Equation 2, in the $k^{th}$ segment of the perceptually scaled input luminance values, $C_{PO,k}=s_k C_{PI,k}$ where $C_{PI,k}$ is a perceptually scaled contrast in the perceptually scaled input luminance values in the $k^{th}$ segment of the perceptually scaled input luminance values and $C_{PO,k}$ is a perceptually scaled contrast in the perceptually scaled output luminance values in the $k^{th}$ segment of the perceptually scaled input luminance values.

Maximizing a contrast difference between the perceptually scaled input luminance values and the perceptually scaled output luminance values may be expressed as maximizing $$E\{\|C_{PO,k} - C_{PI,k}\|_2^2\} = F_C(s_1, s_2, s_3) = \sum_k (s_k - 1)^2 C_{PI,k}^2 p_k \quad \text{(Eq. 3)}$$

where $\|\,\|_2$ is a second norm, E is an expectation operator, and $p_k$ is the number of pixels in the $k^{th}$ segment of the perceptually scaled input luminance values as a proportion of the total number of pixels in the frame (or frames).

In the embodiment shown, k=3, in which case Equation 3 becomes $$F_C(s_1, s_2, s_3) = (s_1-1)^2 \delta_1^2 p_1 + (s_2-1)^2 \delta_2^2 p_2 + (s_3-1)^2 \delta_3^2 p_3 \quad \text{(Eq. 4)}$$

where $\delta_1 = X_1 - X_{min}$, $\delta_2 = X_2 - X_1$, $\delta_3 = X_{max} - X_2$. As indicated above, in the embodiment shown, $X_{min}=0.0623$, $X_1=0.1217$, $X_2=0.3962$, and $X_{max}=0.5081$, although alternative embodiments may differ.

To maximize a contrast difference between the perceptually scaled input luminance values and the perceptually scaled output luminance values, Equation 4 may be maximized by identifying $$\arg\max_{s_1, s_2, s_3} F_C(s_1, s_2, s_3)$$

where $s_k \geq 1$ for all k (so that perceptually scaled input luminance values in each of the ranges of perceptually scaled input luminance values are transformed into respective ranges of perceptually scaled output luminance values that are at least as large as the respective ranges of perceptually scaled input luminance values), $$\sum_k s_k \delta_k \leq R_{PO}$$

(where $R_{PO}$ is the output range of perceptually scaled output luminance values, which is about 0.9026−0.0151=0.8875 in the embodiment shown, although alternative embodiments may differ) in order to ensure that the perceptually scaled input luminance values are transformed to respective perceptually scaled output luminance values within the output range of perceptually scaled output luminance values, and the intercepts $a_1$, $a_2$, and $a_3$ are identified to cause the mapping function to be continuous and to transform the perceptually scaled input luminance values into the output range of perceptually scaled output luminance values. Also, as indicated above, the mapping function in alternative embodiments may not be a piece-wise linear function, may not be continuous, or both. In such embodiments, other functions may be identified by maximizing a contrast difference, for example.

Figure 31:
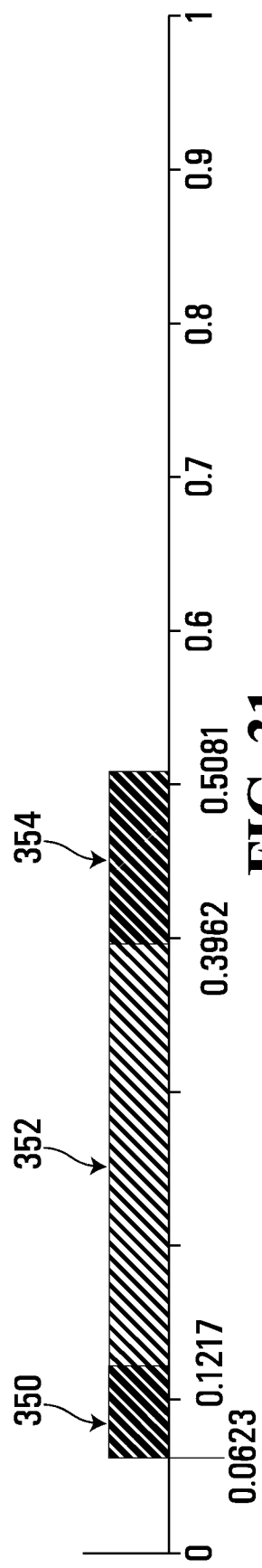
FIG. 31 illustrates ranges of perceptually scaled input luminance values according to one embodiment.

FIG. 31 to FIG. 34 illustrate examples of transformations according to mapping functions identified to maximize a contrast difference between the perceptually scaled input luminance values and the perceptually scaled output luminance values as described above. FIG. 31 illustrates a range shown generally at 350 of perceptually scaled input luminance values from $X_{min}$ (about 0.0623 in the embodiment shown) to $X_1$ (about 0.1217 in the embodiment shown), a range shown generally at 352 of perceptually scaled input luminance values from $X_1$ to $X_2$ (about 0.3962 in the embodiment shown), and a range shown generally at 354 of perceptually scaled input luminance values from $X_2$ to $X_{max}$ (about 0.5081 in the embodiment shown).

Figure 32:
FIG. 32, FIG. 33, and FIG. 34 illustrate ranges of perceptually scaled output luminance values transformed from the ranges of perceptually scaled input luminance values of FIG. 31 according to mapping functions identified to maximize a contrast difference between the perceptually scaled input luminance values and the perceptually scaled output luminance values.

Referring to FIG. 31 and FIG. 32, when a mapping function is identified to maximize a contrast difference between the perceptually scaled input luminance values and the perceptually scaled output luminance values as described above for a relatively dark frame (or frames), the mapping function transforms the perceptually scaled input luminance values in the range 350 to a range shown generally at 356 of perceptually scaled output luminance values (which is from about 0.0151 to about 0.5162 in the embodiment shown), transforms the perceptually scaled input luminance values in the range 352 to a range shown generally at 358 of perceptually scaled output luminance values (which is from about 0.5162 to about 0.7907 in the embodiment shown), and transforms the perceptually scaled input luminance values in the range 354 to a range shown generally at 360 of perceptually scaled output luminance values (which is from about 0.7907 to about 0.9026 in the embodiment shown).

Figure 33:
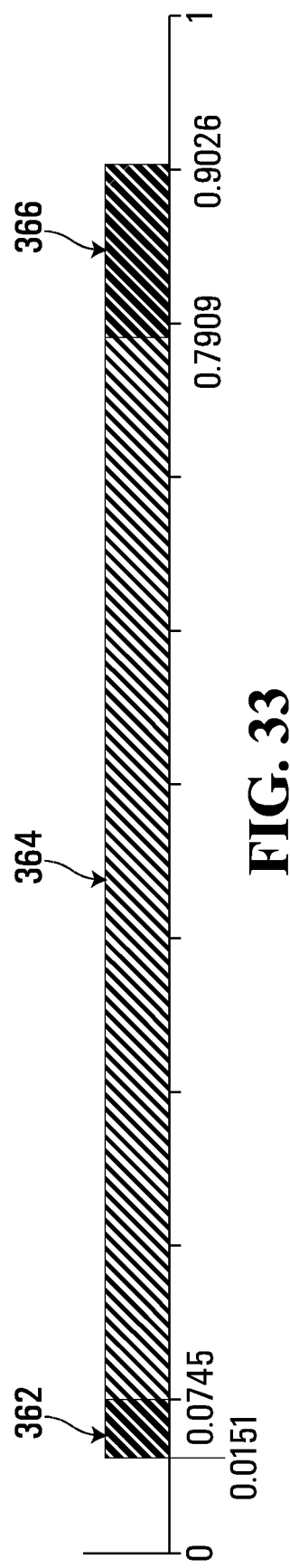

Referring to FIG. 31 and FIG. 33, when a mapping function is identified to maximize a contrast difference between the perceptually scaled input luminance values and the perceptually scaled output luminance values as described above for an intermediate frame (or frames), the mapping function transforms the perceptually scaled input luminance values in the range 350 to a range shown generally at 362 of perceptually scaled output luminance values (which is from about 0.0151 to about 0.0745 in the embodiment shown), transforms the perceptually scaled input luminance values in the range 352 to a range shown generally at 364 of perceptually scaled output luminance values (which is from about 0.0745 to about 0.7909 in the embodiment shown), and transforms the perceptually scaled input luminance values in the range 354 to a range shown generally at 366 of perceptually scaled output luminance values (which is which is from about 0.7909 to about 0.9026 in the embodiment shown).

Figure 34:
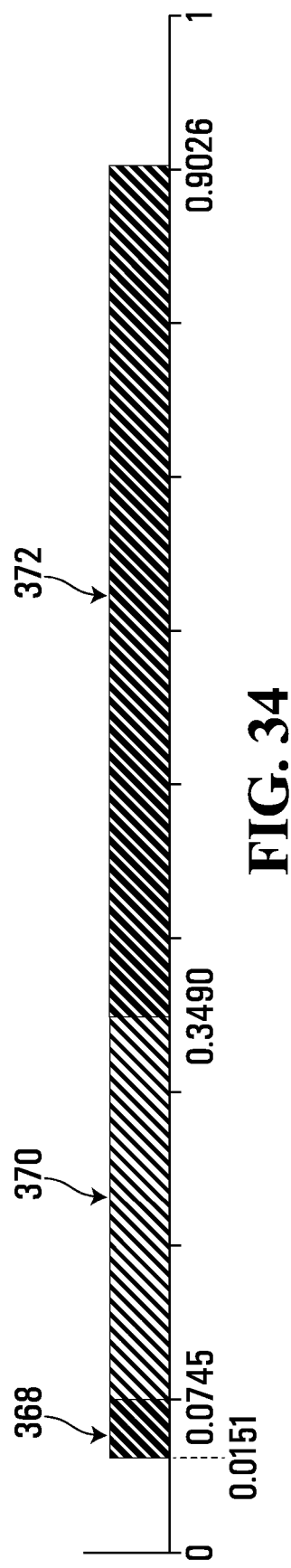

Referring to FIG. 31 and FIG. 34, when a mapping function is identified to maximize a contrast difference between the perceptually scaled input luminance values and the perceptually scaled output luminance values as described above for a frame that is relatively bright (or for frames that are relatively bright), the mapping function transforms the perceptually scaled input luminance values in the range 350 to a range shown generally at 368 of perceptually scaled output luminance values (which is from about 0.0151 to about 0.0745 in the embodiment shown), transforms the perceptually scaled input luminance values in the range 352 to a range shown generally at 370 of perceptually scaled output luminance values (which is from about 0.0745 to about 0.3490 in the embodiment shown), and transforms the perceptually scaled input luminance values in the range 354 to a range shown generally at 372 of perceptually scaled output luminance values (which is which is from about 0.3490 to about 0.9026 in the embodiment shown).

The ranges shown in FIG. 31 to FIG. 34 are examples only, and alternative embodiments may differ.

In general, FIG. 31 to FIG. 34 illustrate that, when a mapping function is identified to maximize a contrast difference between the perceptually scaled input luminance values and the perceptually scaled output luminance values as described above, for a relatively dark frame (or for frames that are relatively dark), the mapping function will transform the dark range of perceptually scaled input luminance values to a relatively large range of perceptually scaled output luminance values, and for a relatively bright frame (or for frames that are relatively bright), the mapping function will transform the bright range of perceptually scaled input luminance values to a relatively large range of perceptually scaled output luminance values. As a result, when a mapping function is identified to maximize a contrast difference between the perceptually scaled input luminance values and the perceptually scaled output luminance values as described above, the mapping function is identified at least in part according to a perceptually scaled distribution of the input luminance values.

According to Equation 2, in the $k^{th}$ segment of the perceptually scaled input luminance values, $L_{PO,i}=s_k L_{PI,i}+a_k$ where $L_{PI,i}$ is an $i^{th}$ perceptually scaled brightness in the perceptually scaled input luminance values, and $L_{PO,i}$ is a respective perceptually scaled output luminance value transformed according to the mapping function from $L_{PI,i}$.

Maximizing a brightness difference between the perceptually scaled input luminance values and the perceptually scaled output luminance values may be expressed as maximizing $$E\{\|L_{PO,i} - L_{PI,i}\|_2^2\} = \qquad \text{(Eq. 4)}$$
$$F_B(s_1, s_2, s_3) = E\left\{\sum_k \sum_i ((s_k - 1)^2 L_{PI,i}^2 + a_k)^2\right\}.$$

In the embodiment shown, k=3, in which case Equation 4 becomes $$F_B(s_1, s_2, s_3) = \sum_{k=1}^{3} [(s_k - 1)^2 A_k p_k + N_k a_k^2 + 2a_k(s_k - 1)B_k p_k] \qquad \text{(Eq. 5)}$$

where $N_k$ is a number of perceptually scaled input luminance values in the $k^{th}$ segment of the perceptually scaled input luminance values, and where $$A_1 = \sum_{i=1}^{N_1} L_{PI,i}^2,$$

$$A_2 = \sum_{i=N_1+1}^{N_1+N_2} L_{PI,i}^2,$$

$$A_3 = \sum_{i=N_1+N_2+1}^{N_1+N_2+N_3} L_{PI,i}^2,$$

$$B_1 = \sum_{i=1}^{N_1} L_{PI,i},$$

$$B_2 = \sum_{i=N_1+1}^{N_1+N_2} L_{PI,i}, \text{ and}$$

$$B_3 = \sum_{i=N_1+N_2+1}^{N_1+N_2+N_3} L_{PI,i}.$$

To maximize a brightness difference between the perceptually scaled input luminance values and the perceptually scaled output luminance values, Equation 5 may be maximized by identifying $$\arg\max_{s_1, s_2, s_3} F_B(s_1, s_2, s_3)$$

again where $s_k \geq 1$ for all k, $$\sum_k s_k \delta_k \leq R_{PO},$$

and the intercepts $a_1$, $a_2$, and $a_3$ are identified to cause the mapping function to be continuous and to transform the perceptually scaled input luminance values into the output range of perceptually scaled output luminance values. Also, as indicated above, the mapping function in alternative embodiments may not be a piece-wise linear function, may not be continuous, or both. In such embodiments, other functions may be identified by maximizing a brightness difference, for example.

As indicated above, $p_k$ is the number of pixels in the $k^{th}$ segment of the perceptually scaled input luminance values as a proportion of the total number of pixels in the frame (or frames), so in other words, $p_k$ reflects a perceptually scaled distribution of the input luminance values. Because Equation 5 refers to $p_k$, and because a mapping function may be identified to maximize a brightness difference between the perceptually scaled input luminance values and the perceptually scaled output luminance values by maximizing $F_B(s_1, s_2, s_3)$, a mapping function identified to maximize a brightness difference between the perceptually scaled input luminance values and the perceptually scaled output luminance values is identified at least in part according to a perceptually scaled distribution of the input luminance values.

Figure 35:
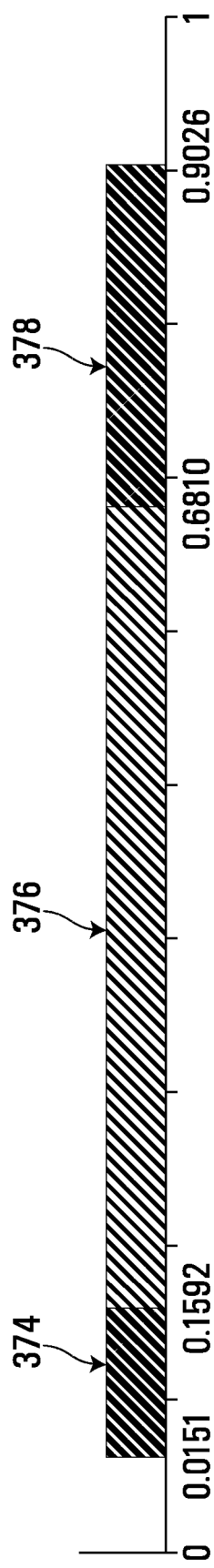
FIG. 35, FIG. 36, and FIG. 37 illustrate ranges of perceptually scaled output luminance values transformed from the ranges of perceptually scaled input luminance values of FIG. 31 according to mapping functions identified to maximize a brightness difference between the perceptually scaled input luminance values and the perceptually scaled output luminance values.
Figure 36:
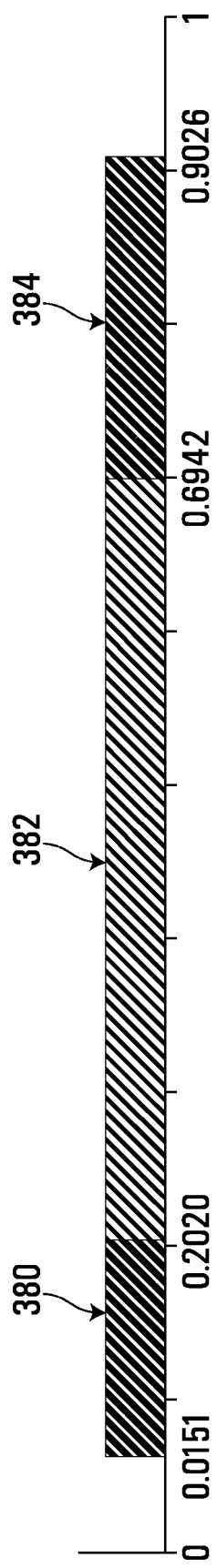
Figure 37:
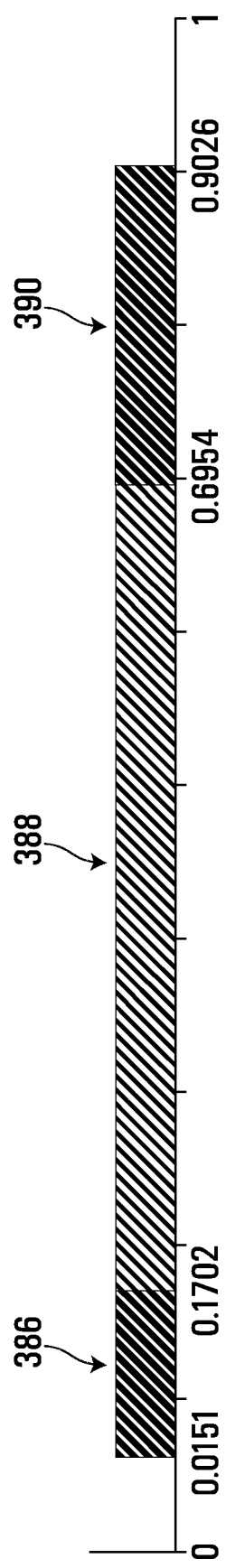

FIG. 35 to FIG. 37 illustrate examples of transformations according to mapping functions identified to maximize a brightness difference between the perceptually scaled input luminance values and the perceptually scaled output luminance values as described above.

Referring to FIG. 31 and FIG. 35, when a mapping function is identified to maximize a brightness difference between the perceptually scaled input luminance values and the perceptually scaled output luminance values as described above for a relatively dark frame (or for frames that are relatively dark), the mapping function transforms the perceptually scaled input luminance values in the range 350 to a range shown generally at 374 of perceptually scaled output luminance values (which is from about 0.0151 to about 0.1592 in the embodiment shown), transforms the perceptually scaled input luminance values in the range 352 to a range shown generally at 376 of perceptually scaled output luminance values (which is from about 0.1592 to about 0.6810 in the embodiment shown), and transforms the perceptually scaled input luminance values in the range 354 to a range shown generally at 378 of perceptually scaled output luminance values (which is from about 0.6810 to about 0.9026 in the embodiment shown).

Referring to FIG. 31 and FIG. 36, when a mapping function is identified to maximize a brightness difference between the perceptually scaled input luminance values and the perceptually scaled output luminance values as described above for an intermediate frame (or for intermediate frames), the mapping function transforms the perceptually scaled input luminance values in the range 350 to a range shown generally at 380 of perceptually scaled output luminance values (which is from about 0.0151 to about 0.2020 in the embodiment shown), transforms the perceptually scaled input luminance values in the range 352 to a range shown generally at 382 of perceptually scaled output luminance values (which is from about 0.2020 to about 0.6942 in the embodiment shown), and transforms the perceptually scaled input luminance values in the range 354 to a range shown generally at 384 of perceptually scaled output luminance values (which is from about 0.6942 to about 0.9026 in the embodiment shown).

Referring to FIG. 31 and FIG. 37, when a mapping function is identified to maximize a brightness difference between the perceptually scaled input luminance values and the perceptually scaled output luminance values as described above for a frame that is relatively bright (or for frames that are relatively bright), the mapping function transforms the perceptually scaled input luminance values in the range 350 to a range shown generally at 386 of perceptually scaled output luminance values (which is from about 0.0151 to about 0.1702 in the embodiment shown), transforms the perceptually scaled input luminance values in the range 352 to a range shown generally at 388 of perceptually scaled output luminance values (which is from about 0.1702 to about 0.6954 in the embodiment shown), and transforms the perceptually scaled input luminance values in the range 354 to a range shown generally at 390 of perceptually scaled output luminance values (which is from about 0.6954 to about 0.9026 in the embodiment shown).

The ranges shown in FIG. 35 to FIG. 37 are examples only, and alternative embodiments may differ.

Nevertheless, FIG. 32 to FIG. 37 indicate that mapping functions identified to maximize a contrast difference between the perceptually scaled input luminance values and the perceptually scaled output luminance values differ from mapping functions identified to maximize a brightness difference between the perceptually scaled input luminance values and the perceptually scaled output luminance values.

A weighted sum of a contrast difference and a brightness difference between the perceptually scaled input luminance values and the perceptually scaled output luminance values may be maximized by identifying $$\arg\max_{s_1, s_2, s_3} \{w_1 F_{C,n}(s_1, s_2, s_3) + w_2 F_{B,n}(s_1, s_2, s_3)\}$$

where $w_1$ and $w_2$ are weights such that $w_1 + w_2 = 1$, $F_{C,n}$ is $F_C$ normalized, $F_{B,n}$ is $F_B$ normalized, and again where $s_k \geq 1$ for all k, $$\sum_k s_k \delta_k \leq R_{PO},$$

and the intercepts $a_1$, $a_2$, and $a_3$ are identified to cause the mapping function to be continuous. The weights $w_1$ and $w_2$ are more generally optimization parameters as shown at 391 in FIG. 27. Also, as indicated above, the mapping function in alternative embodiments may not be a piece-wise linear function, may not be continuous, or both. In such embodiments, other functions may be identified by maximizing a weighted sum of a contrast difference and a brightness difference, for example.

Figure 38:
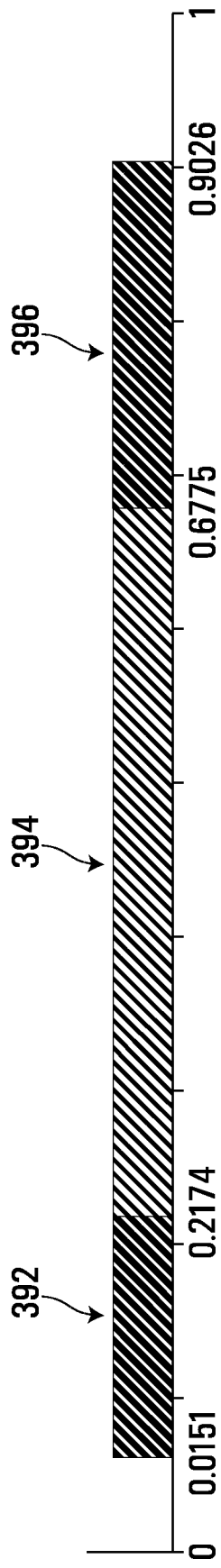
FIG. 38, FIG. 39, and FIG. 40 illustrate ranges of perceptually scaled output luminance values transformed from the ranges of perceptually scaled input luminance values of FIG. 31 according to mapping functions identified to maximize a weighted sum of a contrast difference and a brightness difference between the perceptually scaled input luminance values and the perceptually scaled output luminance values.
Figure 39:
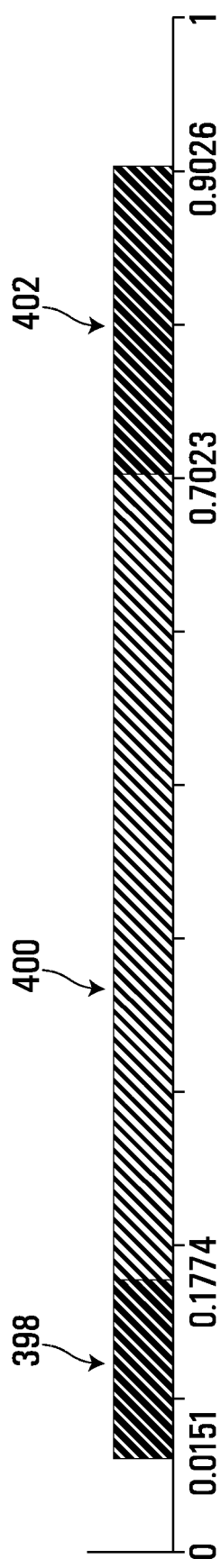
Figure 40:
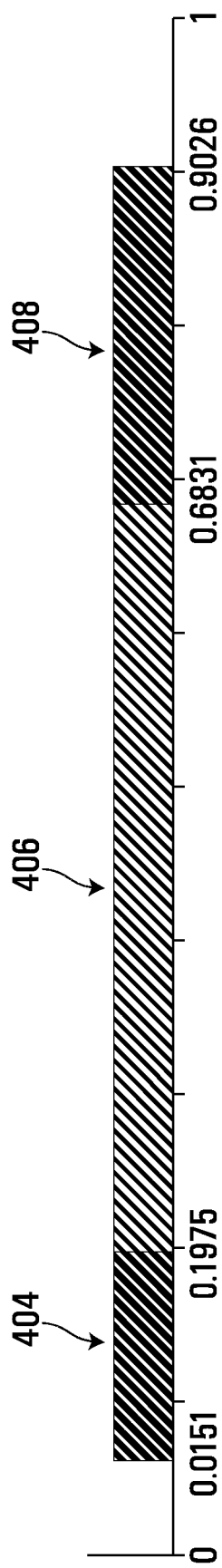

FIG. 38 to FIG. 40 illustrate examples of transformations according to mapping functions identified to maximize a weighted sum of a contrast difference and a brightness difference between the perceptually scaled input luminance values and the perceptually scaled output luminance values as described above. In the examples of FIG. 38 to FIG. 40, $w_1 = w_2 = 0.5$.

Referring to FIG. 31 and FIG. 38, when a mapping function is identified to maximize a weighted sum of a contrast difference and a brightness difference between the perceptually scaled input luminance values and the perceptually scaled output luminance values as described above for a relatively dark frame (or for frames that are relatively dark), the mapping function transforms the perceptually scaled input luminance values in the range 350 to a range shown generally at 392 of perceptually scaled output luminance values (which is from about 0.0151 to about 0.2174 in the embodiment shown), transforms the perceptually scaled input luminance values in the range 352 to a range shown generally at 394 of perceptually scaled output luminance values (which is from about 0.2174 to about 0.6775 in the embodiment shown), and transforms the perceptually scaled input luminance values in the range 354 to a range shown generally at 396 of perceptually scaled output luminance values (which is from about 0.6775 to about 0.9026 in the embodiment shown).

Referring to FIG. 31 and FIG. 39, when a mapping function is identified to maximize a weighted sum of a contrast difference and a brightness difference between the perceptually scaled input luminance values and the perceptually scaled output luminance values as described above is identified for an intermediate frame (or for intermediate frames), the mapping function transforms the perceptually scaled input luminance values in the range 350 to a range shown generally at 398 of perceptually scaled output luminance values (which is from about 0.0151 to about 0.1774 in the embodiment shown), transforms the perceptually scaled input luminance values in the range 352 to a range shown generally at 400 of perceptually scaled output luminance values (which is from about 0.1774 to about 0.7023 in the embodiment shown), and transforms the perceptually scaled input luminance values in the range 354 to a range shown generally at 402 of perceptually scaled output luminance values (which is from about 0.7023 to about 0.9026 in the embodiment shown).

Referring to FIG. 31 and FIG. 40, when a mapping function is identified to maximize a weighted sum of a contrast difference and a brightness difference between the perceptually scaled input luminance values and the perceptually scaled output luminance values as described above is identified for a frame that is relatively bright (or for frames that are relatively bright), the mapping function transforms the perceptually scaled input luminance values in the range 350 to a range shown generally at 404 of perceptually scaled output luminance values (which is from about 0.0151 to about 0.1975 in the embodiment shown), transforms the perceptually scaled input luminance values in the range 352 to a range shown generally at 406 of perceptually scaled output luminance values (which is from about 0.1975 to about 0.6831 in the embodiment shown), and transforms the perceptually scaled input luminance values in the range 354 to a range shown generally at 408 of perceptually scaled output luminance values (which is from about 0.6831 to about 0.9026 in the embodiment shown).

The ranges shown in FIG. 38 to FIG. 40 are examples only, and alternative embodiments may differ.

In general, identifying mapping functions to maximize a weighted sum of a contrast difference and a brightness difference between the perceptually scaled input luminance values and the perceptually scaled output luminance values as described above may be a trade-off between maximizing overall contrast and brightness in one or more frames of video, and may therefore maintain balance between overall contrast and brightness in such one or more frames. Such a balance may preserve artistic intent.

For example, mapping functions identified to maximize a contrast difference between the perceptually scaled input luminance values and the perceptually scaled output luminance values may have large slopes that transform ranges of perceptually scaled input luminance values into large respective ranges of perceptually scaled output luminance values (such as the ranges 356, 364, and 372, for example), and transforming ranges of perceptually scaled input luminance values into such large respective ranges of perceptually scaled output luminance values may introduce noise. However, identifying mapping functions to maximize a weighted sum of a contrast difference and a brightness difference between the perceptually scaled input luminance values and the perceptually scaled output luminance values as described above may avoid such large slopes and accordingly reduce noise while maintaining overall contrast and brightness.

As indicated above, a mapping function identified to maximize a contrast difference or a brightness difference between the perceptually scaled input luminance values and the perceptually scaled output luminance values may be identified at least in part according to a perceptually scaled distribution of the input luminance values. Therefore, when a mapping function is identified to maximize a weighted sum of a contrast difference and a brightness difference between the perceptually scaled input luminance values and the perceptually scaled output luminance values, the mapping function is also identified at least in part according to a perceptually scaled distribution of the input luminance values.

Referring back to FIG. 28, after block 340, the inverse tone mapping program codes 318 may continue at block 410, which includes codes that, when executed by the microprocessor 292, cause the processor circuit 290 to transform (as shown at 412 in FIG. 27) the perceptually scaled input luminance values in the perceptually scaled input luminance values store 328 into respective perceptually scaled output luminance values according to the mapping function defined by codes in the mapping function store 344, and to store the perceptually scaled output luminance values in a perceptually scaled output luminance values store 414 (shown in FIG. 26) in the storage memory 296.

After block 410, the inverse tone mapping program codes 318 may continue at block 416, which includes codes that, when executed by the microprocessor 292, cause the processor circuit 290 to transform (by applying a PQ transform function as shown at 418 in FIG. 27, for example) the perceptually scaled output luminance values in the perceptually scaled output luminance values store 414 into respective output luminance values, and to store the output luminance values in an output luminance values store 420 (shown in FIG. 26) in the storage memory 296. As shown in FIG. 27, the output luminance values in the output luminance values store 420 may be in a range from $Y_{min}$ to $Y_{max}$, which may be a range of luminance values of the display device 276. In other words, $Y_{min}$ and $Y_{max}$ in FIG. 27 may represent the minimum and maximum brightness values respectively of the display device 276, such as minimum and maximum HDR brightness values in the embodiment shown, or other brightness values in other embodiments. The inverse tone mapping program codes 318 may then end.

After inverse tone mapping, the processor circuit 290 may then produce one or more output signals representing the output luminance values in the output luminance values store 420. Therefore, the program memory 294 may also include output signal production codes 422 that, when executed by the microprocessor 292, cause the processor circuit 290 to cause the output signal interface 288 to produce one or more output signals representing at least the output luminance values in the output luminance values store 420 (and, in some embodiments, representing other video information such as color, sound, or both color and sound) and to transmit the one or more output signals to the input signal interface 280. The output signal production codes 422 may cause the processor circuit 290 to apply color restoration (shown at 424 in FIG. 27) to produce the one or more output signals (shown at 426 in FIG. 27).

The embodiment shown involves color restoration (shown at 424 in FIG. 27) after the PQ transform function (shown at 418 in FIG. 27). As a result, in the embodiment shown, color restoration is in a physical-intensity domain and may involve, for pixels of the one or more output signals (shown at 426 in FIG. 27), determining a red output signal component $R_O$, a green output signal component $G_O$, and a blue output signal component $B_O$ according to $$R_O = \frac{L_O}{L_I} R_I,$$

$$G_O = \frac{L_O}{L_I} G_I, \text{ and}$$

$$B_O = \frac{L_O}{L_I} B_I,$$

where $R_I$, $G_I$, and $B_I$ are red, green, and blue components respectively of the pixel in the one or more input signals (as shown at 304 in FIG. 27) received at the input signal interface 284 from the signal source 286, $L_I$ is the input luminance value of the pixel identified (as shown at 312 in FIG. 27) in response to the one or more input signals received at the input signal interface 284 from the signal source 286, and $L_O$ is the output luminance value of the pixel following the transform at block 416 (shown at 418 in FIG. 27).

Alternative embodiments may involve different color spaces. For example, in a YCbCr color space, color restoration in a physical-intensity domain may involve, for pixels of the one or more output signals (shown at 426 in FIG. 27), determining an output signal component $C_{b,O}$ of a blue-difference component and an output signal component $C_{r,O}$ of a red-difference component according to $$C_{b,O} = \frac{L_O}{L_I} C_{b,I} \text{ and}$$

$$C_{r,O} = \frac{L_O}{L_I} C_{r,I}.$$

Still other embodiments may involve other color spaces.

Figure 42:
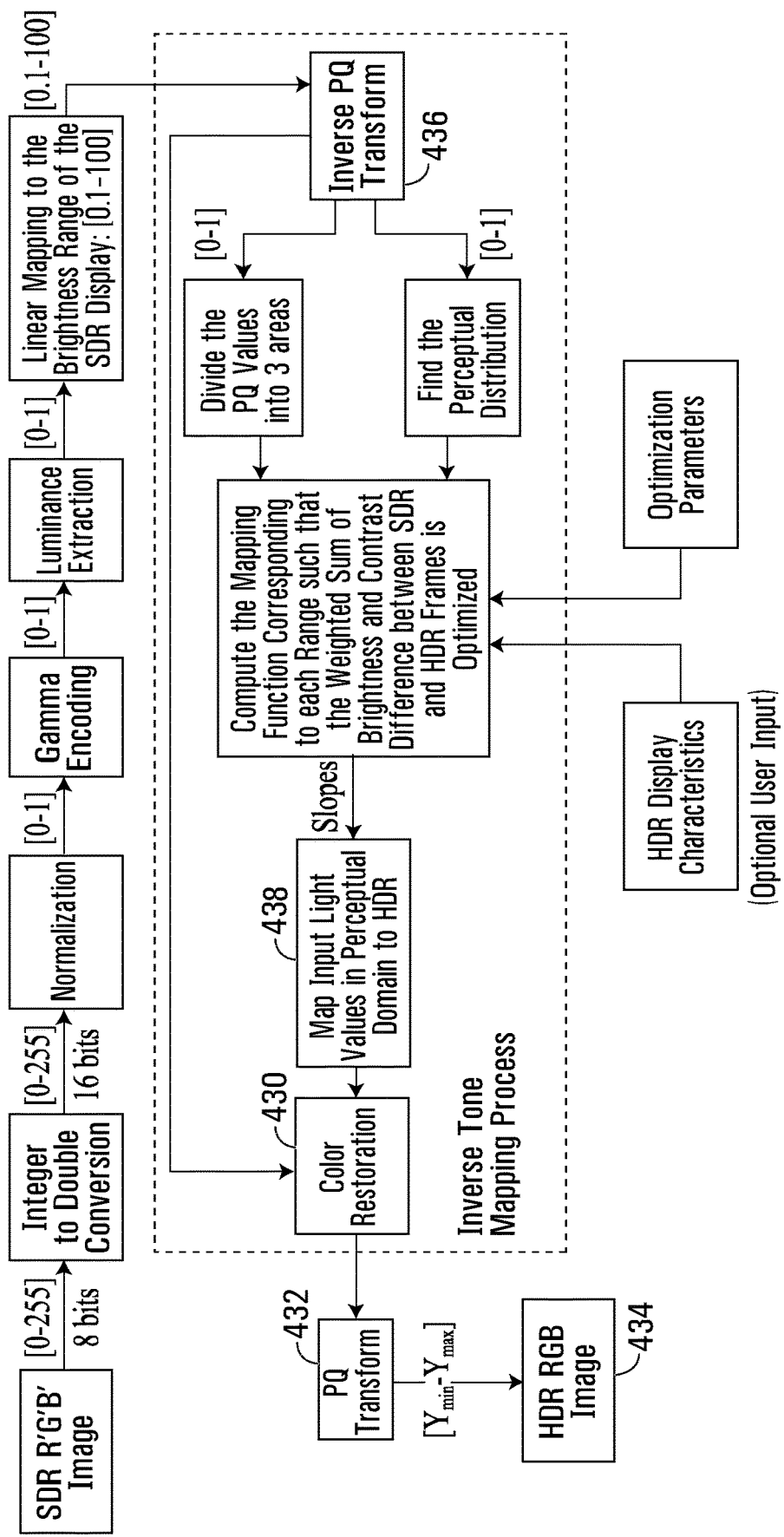
FIG. 42 illustrates operation of a processor circuit according to another embodiment.

Further, in alternative embodiments, color restoration may be in a perceptual domain. FIG. 42 is an illustration of operation of a processor circuit according to such an embodiment. In such an embodiment, color restoration (shown at 430 in FIG. 42) may be before the PQ transform function (shown at 432 in FIG. 42), and color restoration may involve, for pixels of the one or more output signals (shown at 434 in FIG. 42), determining a red perceptual-domain output signal component $R_O$, a green perceptual-domain output signal component $G_O$, and a blue perceptual-domain output signal component $B_O$ according to $$R'_O = \frac{L_{PO}}{L_{PI}} R'_I,$$

$$G'_O = \frac{L_{PO}}{L_{PI}} G'_I, \text{ and}$$

$$B'_O = \frac{L_{PO}}{L_{PI}} B'_I,$$

where $R_I'$, $G_I'$, and $B_I'$ are red, green, and blue components respectively of the pixel in the one or more input signals (as shown at 304 in FIG. 27) received at the input signal interface 284 from the signal source 286 but transformed into the perceptual domain, $L_{PI}$ is the perceptually scaled input luminance value of the pixel identified at block 324 (as shown at 436 in FIGS. 42), and $L_{PO}$ is the output luminance value of the pixel following the transform at block 410 (shown at 438 in FIG. 42). The perceptual-domain output signal components $R_O'$, $G_O'$, $B_O'$ may then be transformed to output signal components $R_O$, $G_O$, and $B_O$ for pixels of the one or more output signals (shown at 434 in FIG. 3) in a transformation such as the transformation described above in block 416 or as shown at 432 in FIG. 42, for example.

Again, alternative embodiments may involve different color spaces.

In other words, in some embodiments, color restoration may be in a physical-intensity domain in which output color values (such as $R_O$, $G_O$, $B_O$, $C_{b,O}$ or $C_{r,O}$, for example) may be identified according to input color values (such as $R_I$, $G_I$, $B_I$, $C_{b,I}$ or $C_{r,I}$, for example) and according to $$\frac{L_O}{L_I},$$

namely according to ratio or a physical output luminance value to a physical input luminance value. Alternatively, in some embodiments, color restoration may be in a perceptual domain in which output color values (such as $R_O'$, $G_O'$, or $B_O'$, for example) may be identified according to input color values (such as $R_I'$, $G_I'$, or $B_I'$, for example) and according to $$\frac{L_{PO}}{L_{PI}},$$

namely according to ratio of a perceptually scaled output luminance value to a perceptually scaled input luminance value.

In the embodiment shown, color restoration involves multiplying input color components by $$\frac{L_O}{L_I}$$

or by $$\frac{L_{PO}}{L_{PI}},$$

put in alternative embodiments, color restoration may be according to such ratios in other ways. For example, color restoration in alternative embodiments may include factors in addition to $$\frac{L_O}{L_I} \text{ or } \frac{L_{PO}}{L_{PI}},$$

or may involve modifications of $$\frac{L_O}{L_I} \text{ or } \frac{L_{PO}}{L_{PI}}.$$

As a result, the one or more output signals produced by the output signal production codes 422 represent the output luminance values in the output luminance values store 420 but do not necessarily encode the output luminance values in the output luminance values store 420 directly. Rather, the output luminance values in the output luminance values store 420 may be represented in the one or more output signals by other encoding, such as encoding of intensities of additive colors such as red, green, and blue or of intensities in other color spaces, for example, and such intensities of such additive colors may represent the output luminance values in the output luminance values store 420. Therefore, the one or more output signals produced by the output signal production codes 422 may represent the output luminance values in the output luminance values store 420 without necessarily encoding output luminance values directly.

The embodiments shown in FIG. 25 to FIG. 40 are examples only, and alternative embodiments may differ. For example, alternative embodiments may differ from a set-top box, and in some embodiments, a camera, one or more video editing devices, or one or more other devices may embody inverse tone mapping as described herein. Further, alternative embodiments may involve inverse tone mapping of different input signals that may not necessarily be signals of SDR video. As another example, output signals of alternative embodiments may not necessarily be signals of HDR video. In general, inverse tone mapping as described above may be applied to various different embodiments in which an input range of luminance values is smaller than an output range of luminance values.

Figure 41:
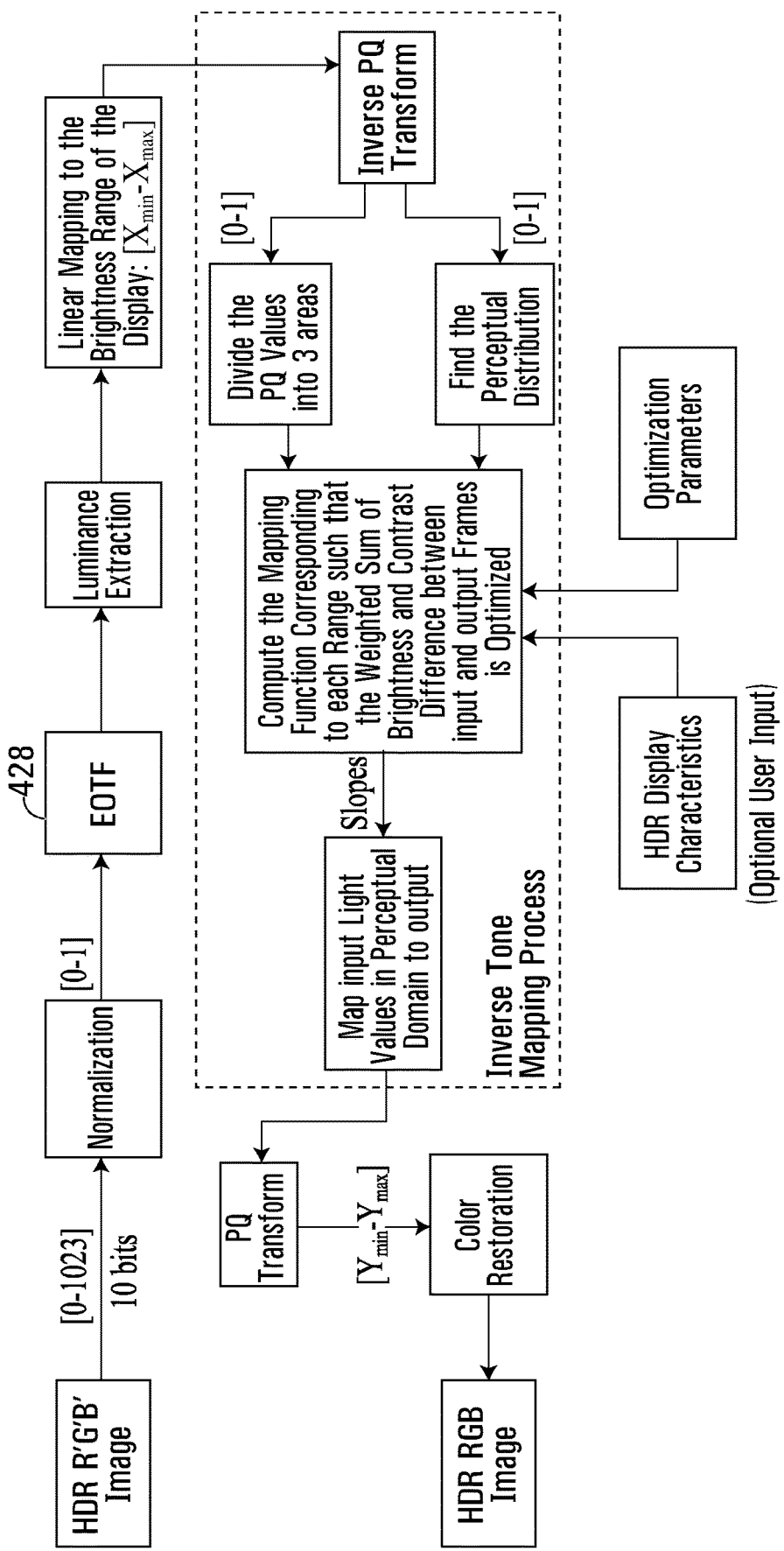
FIG. 41 illustrates operation of a processor circuit according to another embodiment.

For example, FIG. 41 illustrates operation of a processor circuit according to another embodiment. The embodiment of FIG. 41 is similar to the embodiment of FIG. 27, except that inverse tone mapping in the embodiment of FIG. 41 transforms input luminance values in a first HDR range of luminance values into respective output luminance values in a second HDR range of luminance values larger than the first HDR range of luminance values. For example, in the embodiment of FIG. 41, the first HDR range of the input luminance values may be from 0.01 nits to 2,000 nits, and the second HDR range of the output luminance values may be from 0.005 nits to 10,000 nits, although alternative embodiments may differ.

In the embodiment of FIG. 41, the input luminance values and the output luminance values are both in HDR ranges, and transformation (as shown at 306 in FIG. 27 may be omitted. Further, gamma encoding as shown at 310 in FIG. 27 may be replaced with an electro-optical transfer function ("EOTF") as shown at 428 in FIG. 41. The EOTF at 428 may be a PQ transform as described above, for example. In FIG. 41, $X_{min}$ and $X_{max}$ represent the minimum and maximum brightness values respectively in an input range of luminance values, and $Y_{min}$ and $Y_{max}$ represent the minimum and maximum brightness values respectively in an output range of luminance values. In the embodiment shown, the input range of luminance values and the output range of luminance values are both HDR luminance value ranges, but one or both of the input range of luminance values and the output range of luminance values may differ in other embodiments.

In general, as FIG. 41 illustrates in just one example, inverse tone mapping as described above is not limited to the types of input and output signals as described above, and is not limited to the ranges of input and output luminance values as described above. Rather, inverse tone mapping as described above may be applied in various different embodiments having different types of input signals, different types of output signals, different ranges of input luminance values, different ranges of output luminance values, or different color spaces, or two or more thereof. In such different embodiments, the input signal processing program codes 300 may be adapted for different types of input signals or different color spaces, the output signal production codes 422 may be adapted for different types of output signals or different color spaces, and functions such as those described above may be adapted for different ranges of input and output luminance values.

Figure 43:
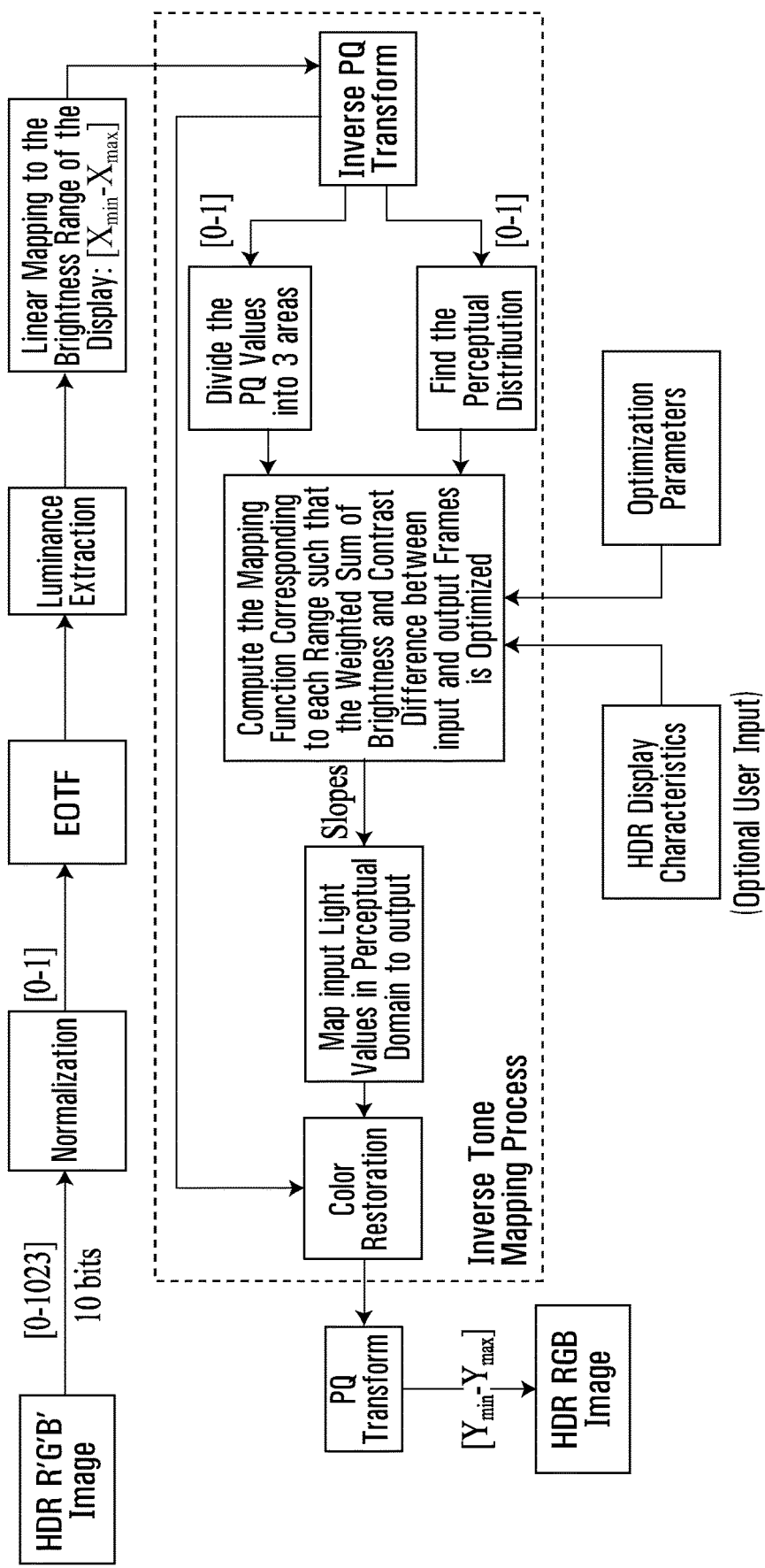
FIG. 43 illustrates operation of a processor circuit according to another embodiment.

FIG. 41 involves color restoration in a physical-intensity domain as described above with respect to FIG. 27. However, as described above with respect to FIG. 42, color restoration in alternative embodiments may be in a perceptual domain. FIG. 43 is an illustration of operation of a processor circuit according to an embodiment in which (as in FIG. 41) inverse tone mapping transforms input luminance values in a first HDR range of luminance values into respective output luminance values in a second HDR range of luminance values larger than the first HDR range of luminance values, and in which (as in FIG. 42) color restoration is in a perceptual domain.

FIG. 1 to FIG. 24 illustrate embodiments of tone mapping, and FIG. 25 to FIG. 43 illustrate embodiments of inverse tone mapping. However, tone mapping and inverse tone mapping as described herein may be combined into the same embodiments.

In general, embodiments such as those described herein may involve tone mapping, inverse tone mapping, or both according to mapping functions that are responsive to ranges of brightness as perceived by the human visual system and that may therefore produce a high quality of experience for a viewer of images displayed on a display device when compared to other tone mapping and inverse tone mapping techniques. Accordingly, embodiments such as those described herein may involve tone mapping, inverse tone mapping, or both that is responsive to how the human visual system perceives brightness.

Further, embodiments such as those described herein may involve tone mapping, inverse tone mapping, or both according to mapping functions that are updated for each frame (or for sets of more than one frame) of a video and may therefore dynamically reduce noise, reduce banding artifacts, or both in successive sets of one or more frames of video, and may for example reduce nose, reduce banding artifacts, or both below levels that human viewers may observe.

Although specific embodiments have been described and illustrated, such embodiments should be considered illustrative only and not as limiting the invention as construed according to the accompanying claims.

The invention claimed is:

1. A method of producing at least one output image signal representing, at least, a plurality of output luminance values in an output range of luminance values, the method comprising:

identifying a mapping function based at least in part on a perceptually scaled distribution of a plurality of input luminance values in an input range of luminance values different from the output range of luminance values;

transforming the plurality of input luminance values into respective perceptually scaled output luminance values according to the mapping function;

transforming the perceptually scaled output luminance values into respective ones of the plurality of output luminance values; and producing the at least one output signal representing, at least, the plurality of output luminance values.

2. The method of claim 1, further comprising: transforming the plurality of input luminance values into respective perceptually scaled input luminance values, wherein the perceptually scaled distribution of the plurality of input luminance values is a distribution of the perceptually scaled input luminance values, wherein transforming the plurality of input luminance values into the respective perceptually scaled input luminance values comprises transforming at least some of the plurality of input luminance values into perceptually linear input luminance values.

3. The method of claim 1, further comprising: transforming the plurality of input luminance values into respective perceptually scaled input luminance values, wherein the perceptually scaled distribution of the plurality of input luminance values is a distribution of the perceptually scaled input luminance values, wherein transforming the plurality of input luminance values into the respective perceptually scaled input luminance values comprises applying a non-logarithmic transform function to at least some of the plurality of input luminance values.

4. The method of claim 1, further comprising: transforming the plurality of input luminance values into respective perceptually scaled input luminance values, wherein the perceptually scaled distribution of the plurality of input luminance values is a distribution of the perceptually scaled input luminance values, wherein transforming the plurality of input luminance values into the respective perceptually scaled input luminance values comprises applying a non-gamma transform function to at least some of the plurality of input luminance values.

5. The method of claim 1, wherein the input range of luminance values is larger than the output range of luminance values.

6. The method of claim 5, wherein identifying the mapping function comprises identifying a function having slopes in respective segments of the perceptually scaled distribution of the plurality of input luminance values, wherein the slopes in the respective segments are in response to respective proportions of the perceptually scaled input luminance values that are in the respective segments.

7. The method of claim 5, wherein identifying the mapping function comprises adjusting an initial mapping function, and wherein adjusting the initial mapping function comprises adjusting the initial mapping function in response to simulated luminance values as displayed on a display device in response to simulated output luminance values transformed from the plurality of input luminance values according to the initial mapping function.

8. The method of claim 7, wherein adjusting the initial mapping function in response to the simulated luminance values comprises adjusting the initial mapping function in response to display-relative perceptually scaled output luminance values transformed from the simulated output luminance values.

9. The method of claim 7, wherein adjusting the initial mapping function comprises adjusting a first at least one portion of the initial mapping function in which the initial mapping function maps a range of perceptually scaled input luminance values to a range of perceptually scaled output luminance values that is larger than the range of perceptually scaled input luminance values, and wherein adjusting the first at least one portion of the initial mapping function comprises adjusting the first at least one portion of the initial mapping function so that the first at least one portion of the initial mapping function as adjusted maps the range of perceptually scaled input luminance values to an adjusted range of perceptually scaled output luminance values that is no larger than the range of perceptually scaled input luminance values.

10. The method of claim 7, wherein:

adjusting the initial mapping function comprises adjusting a second at least one portion of the initial mapping function in which the initial mapping function maps a range of perceptually scaled input luminance values to a range of perceptually scaled output luminance values that is smaller than the range of perceptually scaled input luminance values;

if an average brightness of the perceptually scaled input luminance values is below a first threshold, adjusting the second at least one portion of the initial mapping function comprises adjusting at least one portion of the initial mapping function that is brighter than at least one segment of the distribution of the perceptually scaled input luminance values having the greatest number of perceptually scaled input luminance values;

if the average brightness of the perceptually scaled input luminance values is above the first threshold and below a second threshold, adjusting the second at least one portion of the initial mapping function comprises adjusting at least one portion of the initial mapping function that maps a range of perceptually scaled input luminance values having a greater number of perceptually scaled input luminance values than at least one other range of perceptually scaled input luminance values; and if the average brightness of the perceptually scaled input luminance values is above the second threshold, adjusting the second at least one portion of the initial mapping function comprises adjusting at least one portion of the initial mapping function that is darker than the at least one segment of the distribution of the perceptually scaled input luminance values having the greatest number of perceptually scaled input luminance values.

11. The method of claim 5, wherein:

the plurality of input luminance values and the plurality of output luminance values are luminance values of a first at least one frame of video;

the method further comprises estimating a likelihood that the first at least one frame of video represents a scene change from a second at least one frame of video preceding the first at least one frame of video; and estimating the likelihood that the first at least one frame of video represents a scene change from the second at least one frame of video comprises determining a geometric mean brightness variation from the second at least one frame of video to the first at least one frame of video.

12. The method of claim 5, wherein:

the plurality of input luminance values and the plurality of output luminance values are luminance values of a first at least one frame of video;

the method further comprises estimating a likelihood that the first at least one frame of video represents a scene change from a second at least one frame of video preceding the first at least one frame of video;

estimating the likelihood that the first at least one frame of video represents a scene change from the second at least one frame of video comprises determining an average brightness variation from the second at least one frame of video to the first at least one frame of video; and identifying the mapping function comprises:

if the likelihood that the first at least one frame of video represents a scene change from the second at least one frame of video is below a first threshold, low-pass filtering the mapping function according to a first filter; and if the likelihood that the first at least one frame of video represents a scene change from the second at least one frame of video is at least the first threshold and below a second threshold higher than the first threshold, low-pass filtering the mapping function according to a second filter different from the first filter.

13. The method of claim 1, wherein the input range of luminance values is smaller than the output range of luminance values.

14. The method of claim 13, wherein identifying the mapping function comprises identifying the mapping function according to a plurality of brightness segments of the perceptually scaled distribution of the plurality of input luminance values, and wherein the mapping function differs in each of the plurality of brightness segments of the perceptually scaled distribution of the plurality of input luminance values.

15. The method of claim 14, wherein the mapping function comprises a piece-wise linear function having a respective slope in each of the plurality of brightness segments of the perceptually scaled distribution of a plurality of input luminance values.

16. The method of claim 13, wherein identifying the mapping function comprises maximizing a perceptually scaled contrast difference between the plurality of input luminance values and the plurality of output luminance values.

17. The method of claim 13, wherein identifying the mapping function comprises maximizing a perceptually scaled brightness difference between the plurality of input luminance values and the plurality of output luminance values.

18. The method of claim 13, wherein identifying the mapping function comprises maximizing a weighted sum of a perceptually scaled contrast difference between the plurality of input luminance values and the plurality of output luminance values and a perceptually scaled brightness difference between the plurality of input luminance values and the plurality of output luminance values.

19. The method of claim 13, wherein identifying the mapping function comprises maximizing:

a perceptually scaled contrast difference between the plurality of input luminance values and the plurality of output luminance values;

a perceptually scaled brightness difference between the plurality of input luminance values and the plurality of output luminance values; or a weighted sum of the perceptually scaled contrast difference between the plurality of input luminance values and the plurality of output luminance values and the perceptually scaled brightness difference between the plurality of input luminance values and the plurality of output luminance values.

20. The method of claim 1, wherein producing the at least one output signal comprises identifying color values for the at least one output signal.

21. The method of claim 20, wherein identifying the color values for the at least one output signal comprises identifying the color values for the at least one output signal in a physical-intensity domain.

22. The method of claim 20, wherein identifying the color values for the at least one output signal comprises identifying the color values for the at least one output signal according to ratios, applied to respective input color values that are transformed into a perceptual domain, of the perceptually scaled output luminance values to respective perceptually scaled input luminance values.

23. An apparatus for producing at least one output image signal representing, at least, a plurality of output luminance values in an output range of luminance values, the apparatus comprising at least one processor circuit operable to implement the method of claim 1.

24. An apparatus for producing at least one output image signal representing, at least, a plurality of output luminance values in an output range of luminance values, the apparatus comprising:

a means for identifying a mapping function based at least in part on a perceptually scaled distribution of a plurality of input luminance values in an input range of luminance values different from the output range of luminance values;

a means for transforming the plurality of input luminance values into respective perceptually scaled output luminance values according to the mapping function;

a means for transforming the perceptually scaled output luminance values into respective ones of the plurality of output luminance values; and a means for producing the at least one output signal representing, at least, the plurality of output luminance values.

* * * * *